US008053514B2

(12) United States Patent
Laine et al.

(10) Patent No.: US 8,053,514 B2
(45) Date of Patent: Nov. 8, 2011

(54) PROPERTIES TAILORING IN SILSESQUIOXANES

(75) Inventors: Richard M. Laine, Ann Arbor, MI (US); Santy Sulaiman, Ann Arbor, MI (US)

(73) Assignee: The Regents of the University of Michigan, Ann Arbor, MI (US)

( * ) Notice: Subject to any disclaimer, the term of this patent is extended or adjusted under 35 U.S.C. 154(b) by 0 days.

(21) Appl. No.: 12/609,708

(22) Filed: Oct. 30, 2009

(65) Prior Publication Data

US 2010/0222503 A1 Sep. 2, 2010

Related U.S. Application Data

(60) Provisional application No. 61/197,774, filed on Oct. 30, 2008.

(51) Int. Cl.
*C08L 83/00* (2006.01)
*C07F 7/08* (2006.01)
*C08G 77/00* (2006.01)

(52) U.S. Cl. ............... 524/588; 556/460; 528/12
(58) Field of Classification Search .......... 524/588; 556/460; 528/12
See application file for complete search history.

(56) References Cited

U.S. PATENT DOCUMENTS

| | | | |
|---|---|---|---|
| 5,650,474 A * | 7/1997 | Yamaya et al. | 528/12 |
| 6,770,724 B1 * | 8/2004 | Lichtenhan et al. | 528/14 |
| 6,774,202 B2 * | 8/2004 | Lee | 528/33 |
| 6,787,625 B2 * | 9/2004 | Lee | 528/33 |
| 6,927,270 B2 * | 8/2005 | Lichtenhan et al. | 528/12 |
| 6,972,312 B1 | 12/2005 | Lichtenhan et al. | |
| 2006/0083925 A1 * | 4/2006 | Laine et al. | 428/405 |
| 2008/0221262 A1 * | 9/2008 | Mabry et al. | 524/588 |

OTHER PUBLICATIONS

Bassindale et al. "A higher yielding route for T8 silsesquioxane cages and X-ray crystal structures of some novel spherosilicates" Dalton Trans. 2003, 2945-2949.*
Abe et al., "Oligo- and Polysiloxanes," Prog. Poly. Sci. 2004, vol. 29, pp. 149-182.
Anderson et al., "Structural Investigation of Encapsulated Fluoride in Polyhedral Oligomeric Silsesquioxane Cages Using Ion Mobility Mass Spectrometry and Molecular Mechanics," Chem. Mater. 2008, 20., pp. 4299-4309.
Arkles, B., "Commercial Applications of Sol-Gel-Derived Hybrid Materials," MRS Bulletin, May 2001, pp. 402-407.
Asuncion et al., "Octaalkynylsilsesquioxanes, Sea Urchin Molecular connectors for 3-D-Nanostructures," Macromolecules in press, (Published on Web Oct. 18, 2008).
Baney et al., "Silsesquioxanes," Chem. Rev., 1995, vol. 95, pp. 1409-1430.
Bassindale et al., "The reactions of dialkyl and diarylethoxysilanes with T6 silsesquioxane cages X-ray crystallographic studies of the mono-T6D1 and bis-T6D2 insertion ring expansion products," Journal of Organometallic Chemistry, 687, 2003, pp. 1-11.

(Continued)

*Primary Examiner* — Robert Loewe
(74) *Attorney, Agent, or Firm* — Harness, Dickey & Pierce, P.L.C.

(57) ABSTRACT

Fluoride catalyzed rearrangement reactions of polymeric silsesquioxanes $[RSiO_{1.5}]_n$ involve reacting at least one silsesquioxane material with a catalytic amount of an organic fluoride at a temperature ranging from about −50° C. to about 120° C. thereby forming a reaction mixture for a period ranging from 60 minutes to 48 hours. To the reaction mixture, a quenching agent is added to remove fluoride from the reaction mixture. A silsesquioxane cage compound can be isolated from the reaction mixture using a precipitation or other extraction process.

27 Claims, 49 Drawing Sheets

OTHER PUBLICATIONS

Bassindale et al., "A higher yielding route to octasilsesquioxane cages using tetrabutylammonium fluoride, Part 2: further synthetic advances, mechanistic investigations and X-ray crystal structure studies into the factors that determine cage geometry in the solid state," J. Organometallic Chem. 2004, 689, pp. 3287-3300.

Bassindale et al., "Fluoride Ion Entrapment in Octasilsesquioxane Cages as Models for Ion Entrapment in Zeolites. Further Examples, X-ray Crystal Structure Studies, and Investigations into How and Why They May Be Formed," Organometallics 2004, 23, pp. 4400-4405.

Bassindale et al., "Fluoride-Ion Encapsulation within a Silsesquioxane Cage," Angew. Chem. Int. Ed., 2003, 42, 3488-3490.

Brick et al., "Spherical, Polyfunctional Molecules Using Poly(bromooctaphenylsilsesquioxane)s as Nanoconstruction Sites," Macromol., 2005, 38, pp. 4655-4660.

Choi et al., "Organic/Inorganic Hybrid Composites from Cubic Silsesquioxanes," J. Am. Chem. Soc., 2001, vol. 123, pp. 11420-11430.

Choi et al., "Organic/Inorganic Hybrid Composites from Cubic Silsesquioxanes. Epoxy Resins of Octa(dimethylsiloxyethylcyclohexylepoxide) Silsesquioxane," Macromolecules, 2003, 36, pp. 5666-5682.

Duchateau, R., "Incompletely Condensed Silsesquioxanes: Versatile Tools in Developing Silica-Supported Olefin Polymerization Catalysts," Chem. Rev. 2002, vol. 102, pp. 3525-3542.

H.W. Ro et al., "High Modulus Spin-On Organosilicates for Nanoporous Glasses," Adv. Mater., vol. 19, pp. 705-710 (2007).

Hanssen, R.W.J.M. et al., "The Dynamic Status Quo of Polyhedral Silsesquioxane Coordination Chemistry," Eur. J. Inorg. Chem., 2004, pp. 675-683.

He et al., "Mesoporous TMOS-MTMS copolymer silica gels catalyzed by fluoride," Journal of Non-Crystalline Solids, 289, 2001, pp. 97-105.

Kim et al., "Photopatterned Nanoporous Media," Nano Lett., 2004, vol. 4, pp. 1169-1174.

Laine et al., "Perfect and nearly perfect silsesquioxane (SQs) nanoconstruction sites and Janus SQs", J Sol-Gel Sci and Technol, 46, pp. 335-347 (2008).

Laine et al., "Organic-Inorganic Nanocomposites with Completely Defined Interfacial Interactions," Adv. Mater., 2001, vol. 13, pp. 800-803.

Laine, R.M. "Nano-building blocks based on the [OSiO1.5]8 silsesquioxanes," J. Mater. Chem., 2005, V. 15, pp. 3725-3744.

Lichtenhan et al., "Silsesquioxane-siloxane copolymers from polyhedral silsesquioxanes," Macromolecules, 1993, vol. 26, pp. 2141-2142.

Lickiss et al., "Fully Condensed Polyhedral Silsesquioxanes: From Synthesis to Application," Adv. Organomet. Chem., 2008, vol. 57, pp. 1-116.

Mikoshiba et al., "Preparation of low density poly(methylsilsesquioxane)s for LSI interlayer dielectrics with low dielectric constant. Fabrication of Ångstrom size pores prepared by baking trifluoropropylsilyl copolymers," J. Mater. Chem., 1999, vol. 9, pp. 591-598.

Mirau et al., Solid-State Proton NMR Characterization of Ethylene Oxide and Propylene Oxide Random and Block Copolymer Composites with Poly(methylsilsesquioxanes), Chem. Mater., 2002, vol. 14, pp. 249-255.

Nguyen et al., "Low-Dielectric, Nanoporous Organosilicate Films Prepared via Inorganic/Organic Polymer Hybrid Templates," Chem. Mater., 1999, vol. 11, pp. 3080-3085.

Oh et al., "Anisotropic Thermal Expansion Behavior of Thin Films of Polymethylsilsesquioxane, a Spin-on-Glass Dielectric for High-Performance Integrated Circuits," Langmuir, 2004, vol. 20, pp. 6932-6939.

Phillips et al., "Developments in nanoscience: polyhedral oligomeric silsesquioxane (POSS)-polymers," Current Opinion in Solid State and Mater. Sci. 2004, vol. 8, pp. 21-29.

Rikowski et al, "Cage-rearrangement of silsesquioxanes," Polyhedron, vol. 16, No. 19, 1997, pp. 3357-3361.

Roll et al, "para-Octaiodophenylsilsesqui-oxane, [p-IC6H4SiO1.5]8, a nearly perfect nanobuilding block," ACS Nano, 2, pp. 320-326 (2008).

Sulaiman et al., "Tailoring the Global Properties of Nanocomposites. Epoxy Resins with Very Low Coefficients of Thermal Expansion," Macromolecules., 2006, vol. 39, No. 16, p. 5167- 5169.

Sulaiman et al.; "Molecules with perfect cubic symmetry as nanobuilding blocks for 3-D assemblies. Elaboration of octavinylsilsesquioxane," Chem Mater. 2008, 20, 5563-5573.

Tamaki et al., "A Polyimide Nanocomposite from Octa(aminophenyl)silsesquioxane", Chem. Mater., 2003, 15, pp. 793-797.

Tamaki et al., "Octa(aminophenyl)-silsesquioxane as a Nanoconstruction Site," J. Am. Chem. Soc., 123, pp. 12416-12417 (2001).

Voronkov et al., "Polyhedral Oligosilsesquioxanes and Their Homo Derivatives*", Top. Curr. Chem., 1982, vol. 102, pp. 199-236.

Chen et al., "New approach to nanocomposites of polyimides containing polyhedral oligomeric silsesquioxane for dielectric appliances," Elsevier, Materials Letters 58 (2004) pp. 3716-3719.

Lee, et al., "Synthetic control of molecular weight and microstructure of processible poly(methylsilsesquioxane)s for low-dielectric thin film applications," Elsevier, Polymer 42 (2001), pp. 9085-9089.

Wright, et al., "Synthesis and Thermal Curing of Aryl-Ethynyl-Terminated coPoss Imide Oligomers: New Inorganic/Organic Hybrid Resins," Amerian Chemical Society, Chem. Mater. 2003, 15, pp. 264-268.

* cited by examiner

PROPERTIES TAILORING IN SILSESQUIOXANES

CROSS REFERENCE TO RELATED APPLICATIONS

This application claims the benefit of U.S. Provisional Application 61/197,774 filed Oct. 30, 2008, the entire disclosure of which is hereby incorporated by reference.

GOVERNMENT SUPPORT

This invention was made with government support under CGE 0740108 awarded by the National Science Foundation. The Government has certain rights in the invention.

FIELD

The present disclosure relates to methods for making and tailoring silsesquioxanes having desired functionalization applicable to mechanical, photonic and electronic applications.

BACKGROUND

Polymer properties are dictated by a combination of monomer structure, chain length and processing. Monomer structure can often determine how the polymer coils, crystallizes, forms electrostatic or hydrogen bonds and of course dissolves. If the monomer unit provides extended conjugation along the polymer backbone, the polymer may offer conducting, semiconducting, emissive or light absorptive properties of use in organic electronic and photonic applications. Rigid monomers lead to polymers with excellent mechanical properties and/or liquid crystallinity. Finally monomer structure can also dictate miscibility with other polymers.

Chain length will normally dictate the glass temperature (Tg), diffusion rates, viscosities, CTEs, extents of mechanical crosslinking and for short chains, the melting temperature. Processing provides control of chain-chain interactions on a molecular scale as a means of controlling global properties through control of molecular alignment providing for example, toughness, transparency, conductivity etc. It is well recognized that specific polymer properties arise from specific types of monomers, degrees of polymerization and processing. Simply said, "One size does not fit all." There are certain types of polymer (oligomer) systems that may offer much more tailorability than others such that "One size fits many." One such system encompasses the family of compounds called silsesquioxanes (SQ) as illustrated in FIG. 1. Because of the breadth of their properties, silsesquioxanes are of considerable interest to both the academic and industrial communities, having been the subject of numerous reviews in the last 25 years.

To illustrate, random structured silsesquioxanes are often called T resins and offer a number of useful properties centered about their excellent adhesion and high temperature stability. In one form, with R as H or $CH_3$, they are used as interlayer dielectrics processed either by spin-on or vapor deposition methods. They are also called organic silicates. In other forms they are used to form molds, as clear coats for a wide variety of substrates and are a major component of silicone based caulks for example.

Polyhedral silsesquioxanes, such as the $T_8$ octasilsesquioxane "cubes" $[RSiO1.5]_8$ (FIG. 1), represent a versatile class of highly symmetrical three-dimensional organosilicon compounds with well-defined nanometer size structures. The combination of a rigid silica core and a more flexible, modifiable organic shell make these compounds useful as platforms for assembling hybrid nanocomposite materials with properties intermediate between the properties of ceramics and organics.

Silsesquioxanes have been used in recent years to: (1) model catalytic surfaces, (2) generate new catalysts and (3) novel porous media, and serve as (4) NMR standards, and (5) encapsulants. The decameric $T_{10}$ and dodecameric $T_{12}$ cages are frequently formed alongside the $T_8$ cube, albeit in lower yields, and their derivatives often exhibit chemical, thermal, and mechanical properties parallel to those of $T_8$ derivatives.

Cubic or $T_8$ silsesquioxanes are typically prepared via acid or base-catalyzed hydrolytic condensation of trifunctional organosilanes or by chemical transformation of the pendant groups on pre-existing cages. Since their initial discovery in 1946, there have been numerous studies on the synthesis of polyhedral silsesquioxanes. However, no universal preparative procedures have been established.

The R groups are selected from wide variety of aliphatic and aromatic functional groups, offering considerable potential to control the properties of any oligomeric, polymeric, and/or organic/inorganic hybrid nanocomposites that could be made from them.

In general, most of the work reported for SQs centers on monofunctional materials with seven inert R groups (typically R=iBu, cyclopentyl, cyclohexyl and occasionally phenyl) and one reactive group. There are only a few examples of difunctional octameric or heptameric partial or whole cages and even fewer examples of polymers (oligomers) that contain the SQ as part of the main chain. The reason is that isolation of these types of compounds is very difficult and there are only a few reports on their use in the production of linear polymers.

SUMMARY

Silsesquioxane compounds are illustrated in FIG. 1. A new approach to all of these materials (except ladder structures) allows one to catalytically and selectively interconvert between SQ structures at near ambient temperatures to introduce novel functionality in very specific ways to create families of nanobuilding blocks and related nanocomposite materials that offer highly tailorable properties coupled with exceptional ease of processing. The range of properties potentially accessible includes materials with excellent mechanical properties coupled with high thermal stability to materials with 3-D conducting properties potentially of use for molecular electronics and photonics.

The current teachings involve a room temperature catalytic process that allows performing the reactions shown in Schemes 1-3 usually in good to very good yields.

First, almost any polymeric silsesquioxane or "T resin" can be converted into soluble cage compounds (Scheme 1, FIG. 2).

Second, at room temperature we can promote exchange of R groups between cages to make mixed functional groups (Scheme 2, shown in FIG. 3).

Third, we are able to either trap the cage compounds as shown in Schemes 1 and 2 or return them to their polymeric structures simply by reducing the solvent contents (Scheme 3, FIG. 4). Thus, after making mixed functional groups we can then make novel resins. All of these systems are expected to have excellent high temperature stabilities >400° C. depending on the functionality. Furthermore because we can redissolve the resins, they can be recycled making them green.

Finally, we also find that by addition of Si(OR)$_4$ (e.g., Si(OEt)$_4$) as a silica source (shown in FIG. 5), we can make what appear to be functionalized silica particles whose size is dependent on the relative amounts of silica and [RSiO1.5]$_x$.

The versatility of new routes to very well defined materials offers tremendous import for making materials ranging from high temperature linear polymers to materials of fundamental importance to both photonic and electronic applications because it will be possible to tailor dielectric constants, refractive indices, and possibly ionic conductivity. The materials offer the potential to tailor mechanical properties of nanocomposites through the introduction of hard particles of perfectly defined sizes.

The present methods include reacting at least one polysilsesquioxane material, for example a T resin or a silsesquioxane cage compound with a suitable amount—in preferred embodiments a catalytic amount—of fluoride ion. Exemplary fluoride ion includes organic fluoride such as tetramethylammonium fluoride (TMAF), tetraalkylammonium fluoride (TAAF) and tetrabutylammonium fluoride (TBAF). The temperature of reaction ranges from about −50° C. to about 120° C., and reaction is advantageously carried out even at ambient conditions or at room temperature. Typical reaction temperatures include 0° C.-100° C., 10° C.-50° C., 15° C.-35° C., 20° C.-30° C., about 20° C., about 25° C., and so on.

To isolate a depolymerization reaction product and prevent re-polymerization, the fluoride ion in the reaction mixture is then quenched with a suitable quenching agent such as a metal chloride (e.g. CaCl$_2$, KCl, NaCl etc). Quenching removes fluoride from the reaction mixture, either by precipitation or by sequestering it in a form where it is no longer available to catalyze the re-polymerization reaction. After quenching, the silsesquioxane cage is isolated by solvent removal or with a compatible precipitating agent, for example an organic solvent, to isolate the cage structure from the reaction mixture.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 9:
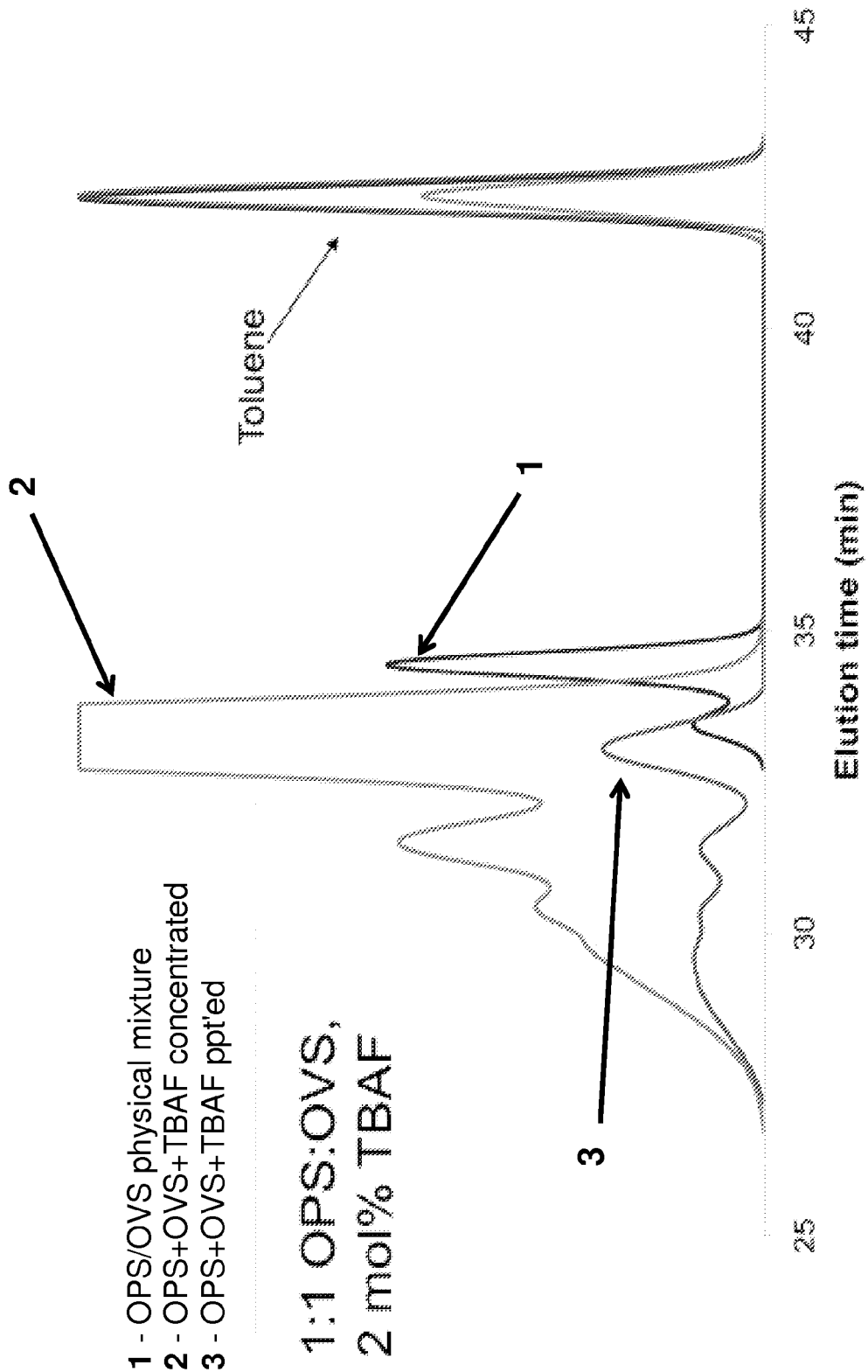

FIG. 9 shows a gel permeation chromatography (GPC) chromatogram depicting the separation of a simple mixture of OPS and OVS in THF giving the bottom GPC trace shown in blue. The elution time for OPS is approximately 33 min while that for OVS is 34.5 min. However, on concentration, the system clearly shifts to the left with a large product peak at about 33 min and other peaks at earlier times.

Figure 10:
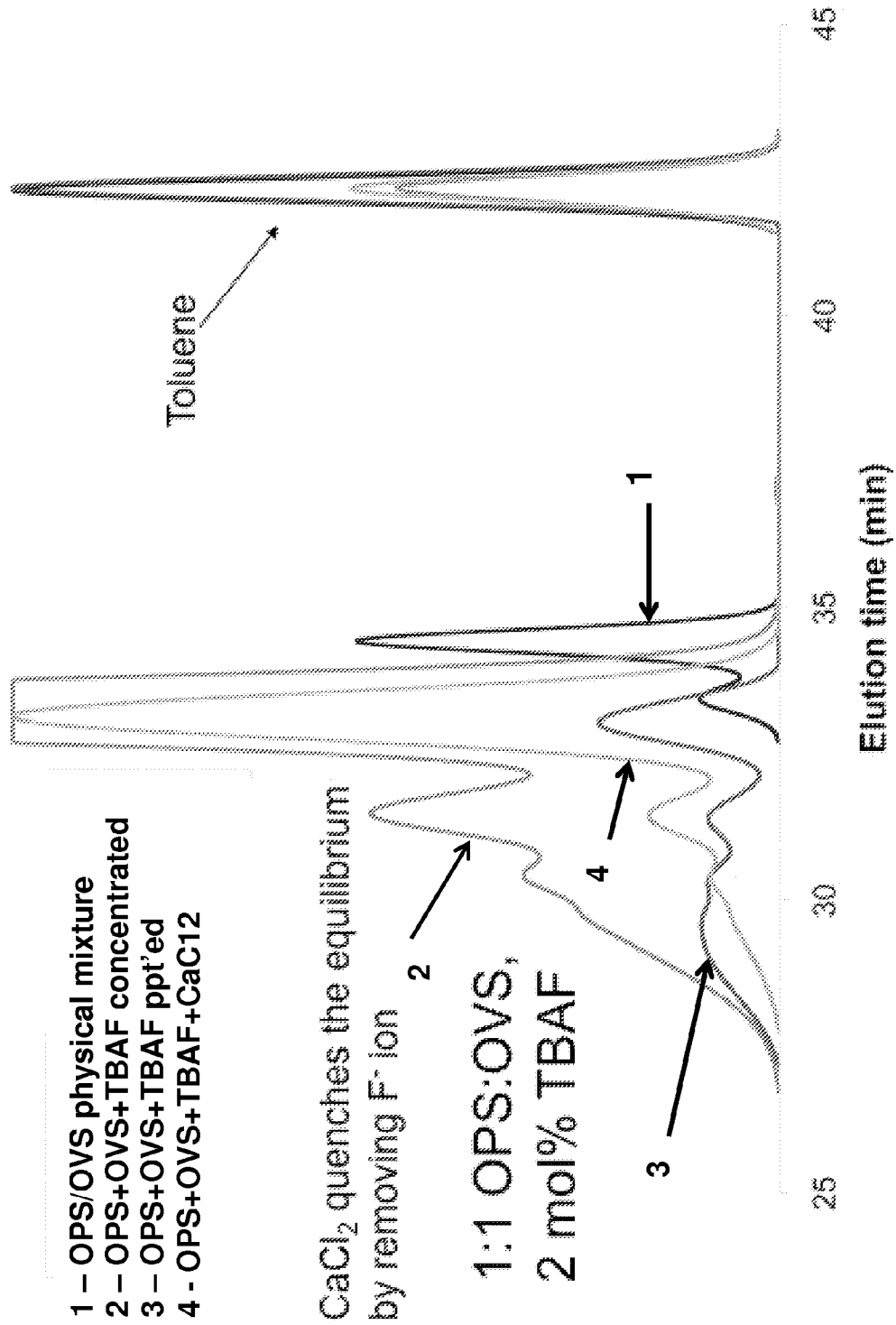

FIG. 10 shows a gel permeation chromatography (GPC) chromatogram depicting the separation of a simple mixture of OPS and OVS exchange to produce mixed-functionality octa and deca-cages in THF as shown in FIG. 9 but quenched with CaCl$_2$.

Figure 11A:
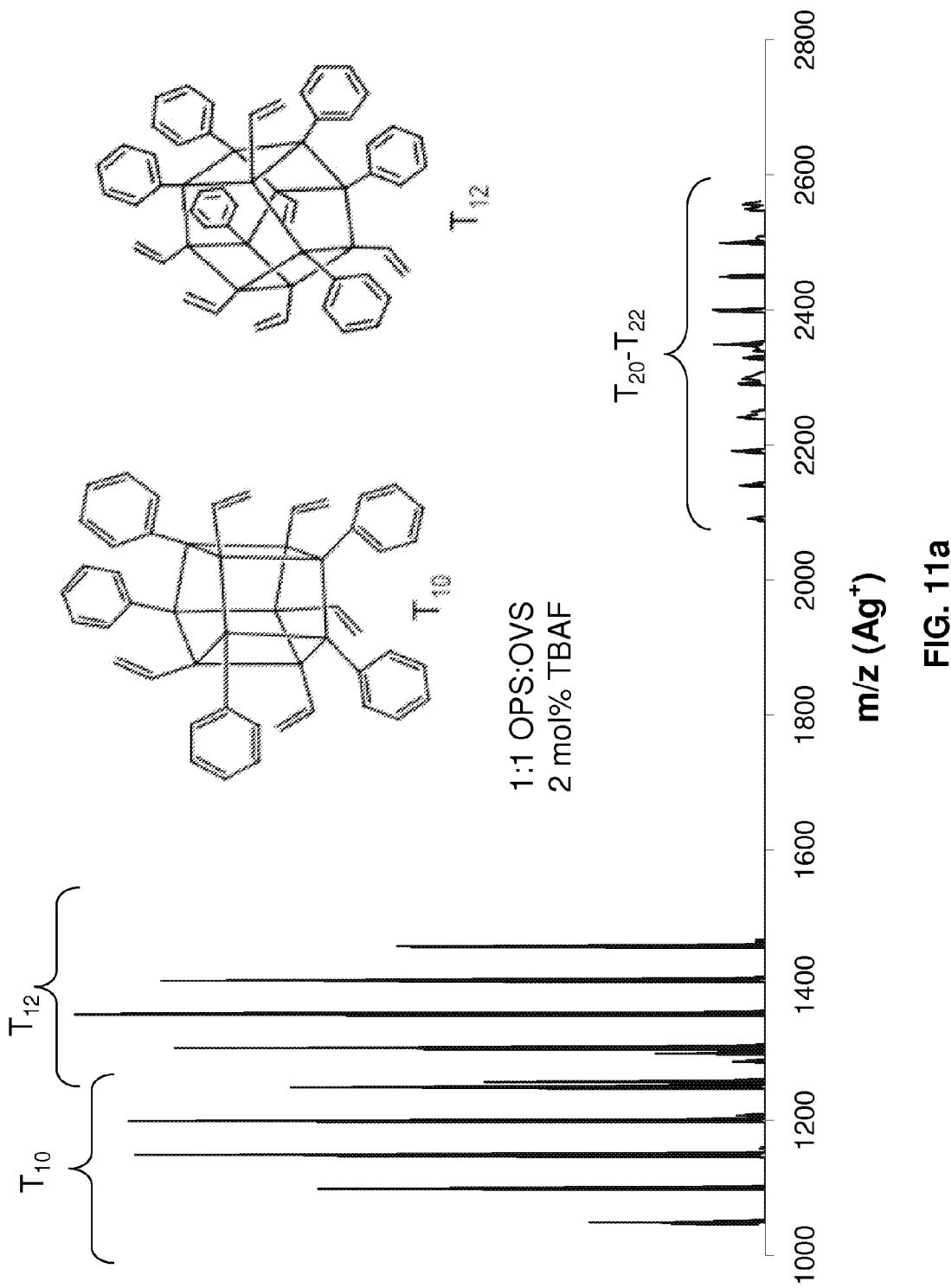
Figure 11B:
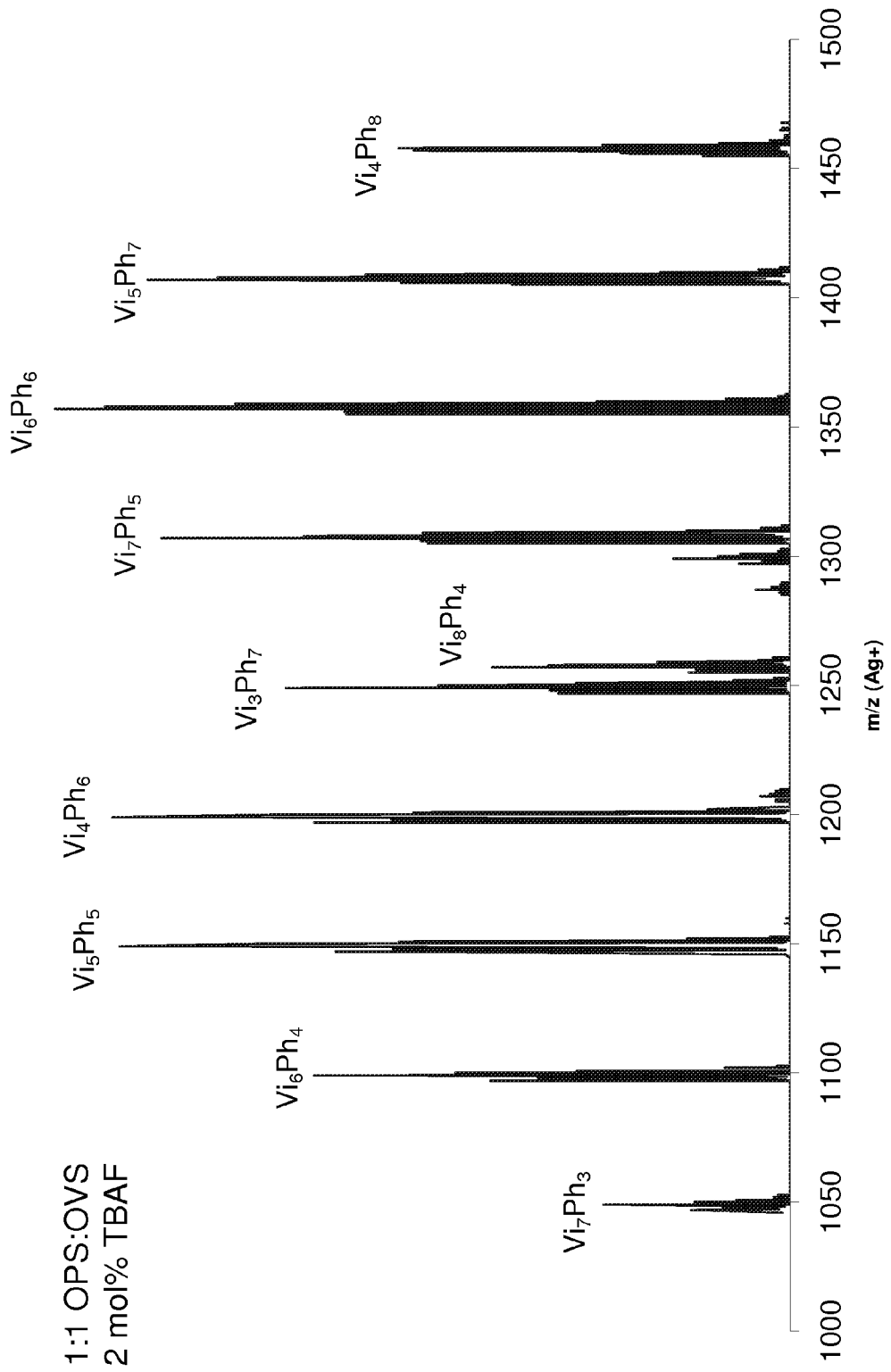

FIG. 11 shows MALDI-TOF spectrochromatogram of TBAF catalyzed OVS/OPS exchange following quenching produces mixed-functionality octa and deca-cages as shown in FIG. 10.

Figure 7:
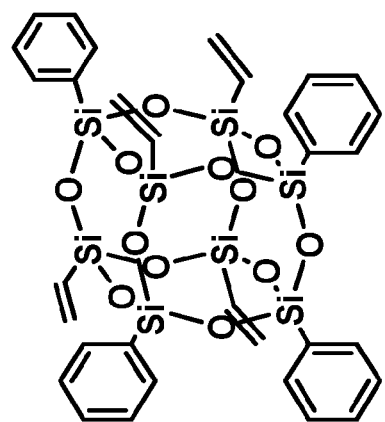
FIG. 7 shows the catalytic polymerization reaction scheme of a mixed vinyl-phenyl compound using catalytic amounts of tetrabutylammonium fluoride (TBAF) at ambient temperatures in accordance with the present technology.
Figure 7:
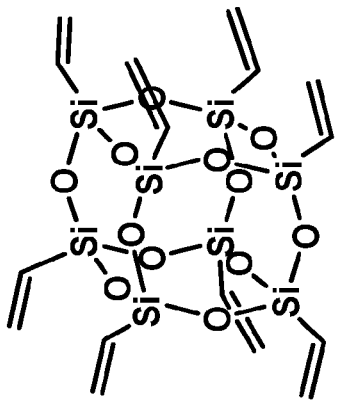
Figure 7:
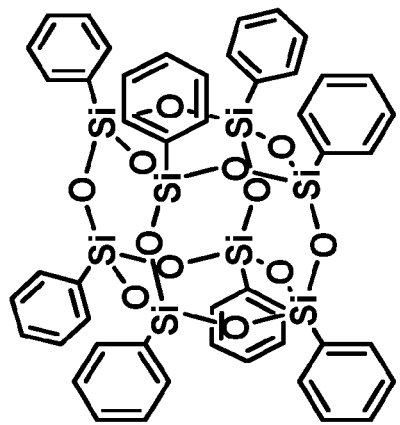
Figure 12:
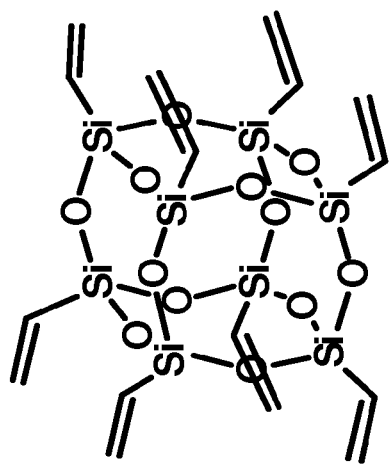
Figure 12:
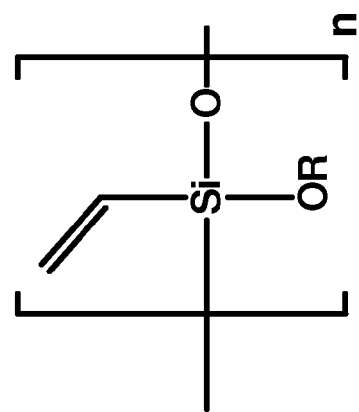

FIG. 12 shows a simplified reaction scheme for the production of highly cross-linked polymer upon concentration of the mixed-functionality octa and deca-cages obtained from the reaction scheme of FIG. 7.

Figure 13:
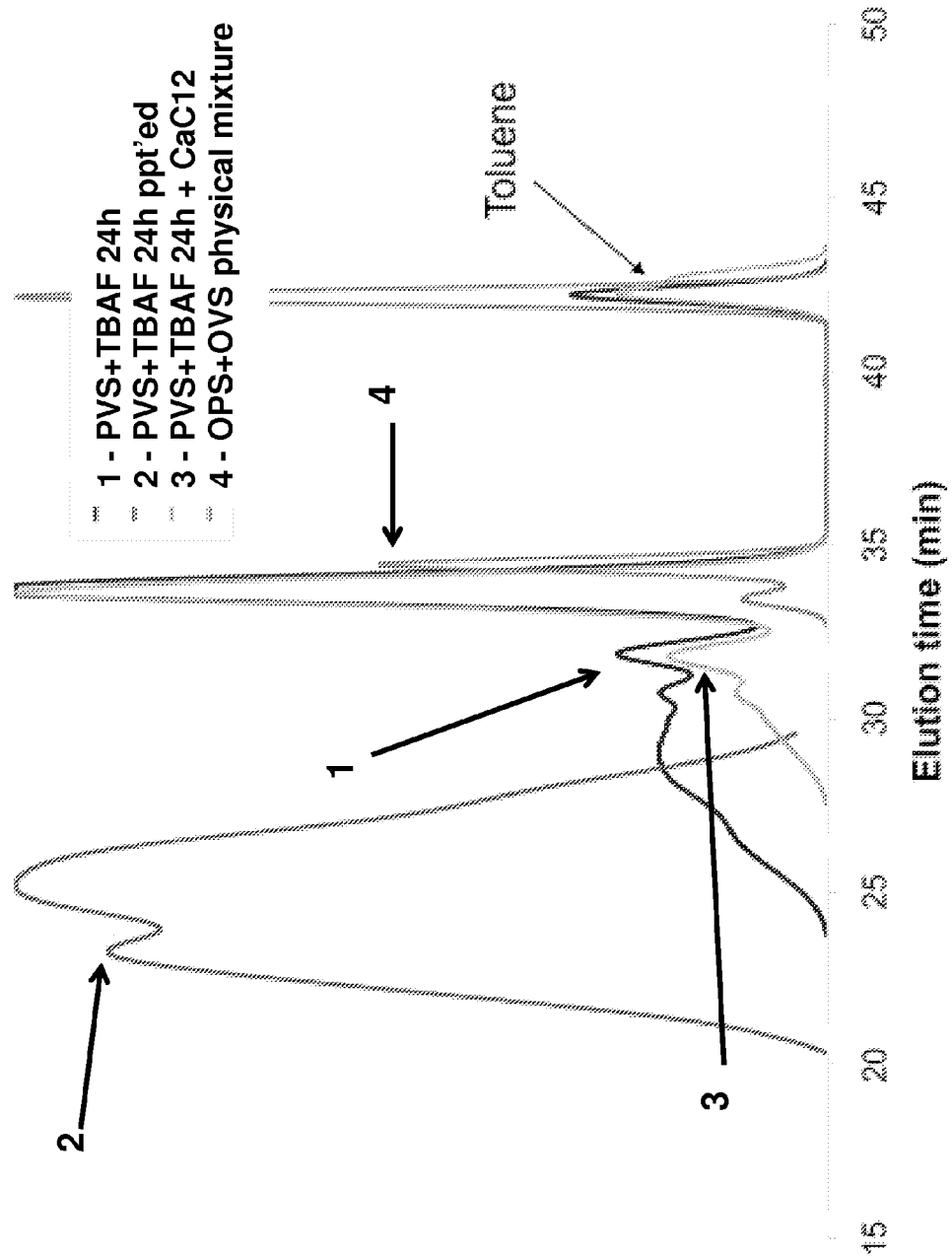

FIG. 13 shows the dissolution of polyvinylsilsesquioxane (PVS) into deca and dodeca cage compounds obtained from the reaction scheme of FIG. 12 by quenching with CaCl$_2$ and catalyzed with TBAF.

Figure 14:
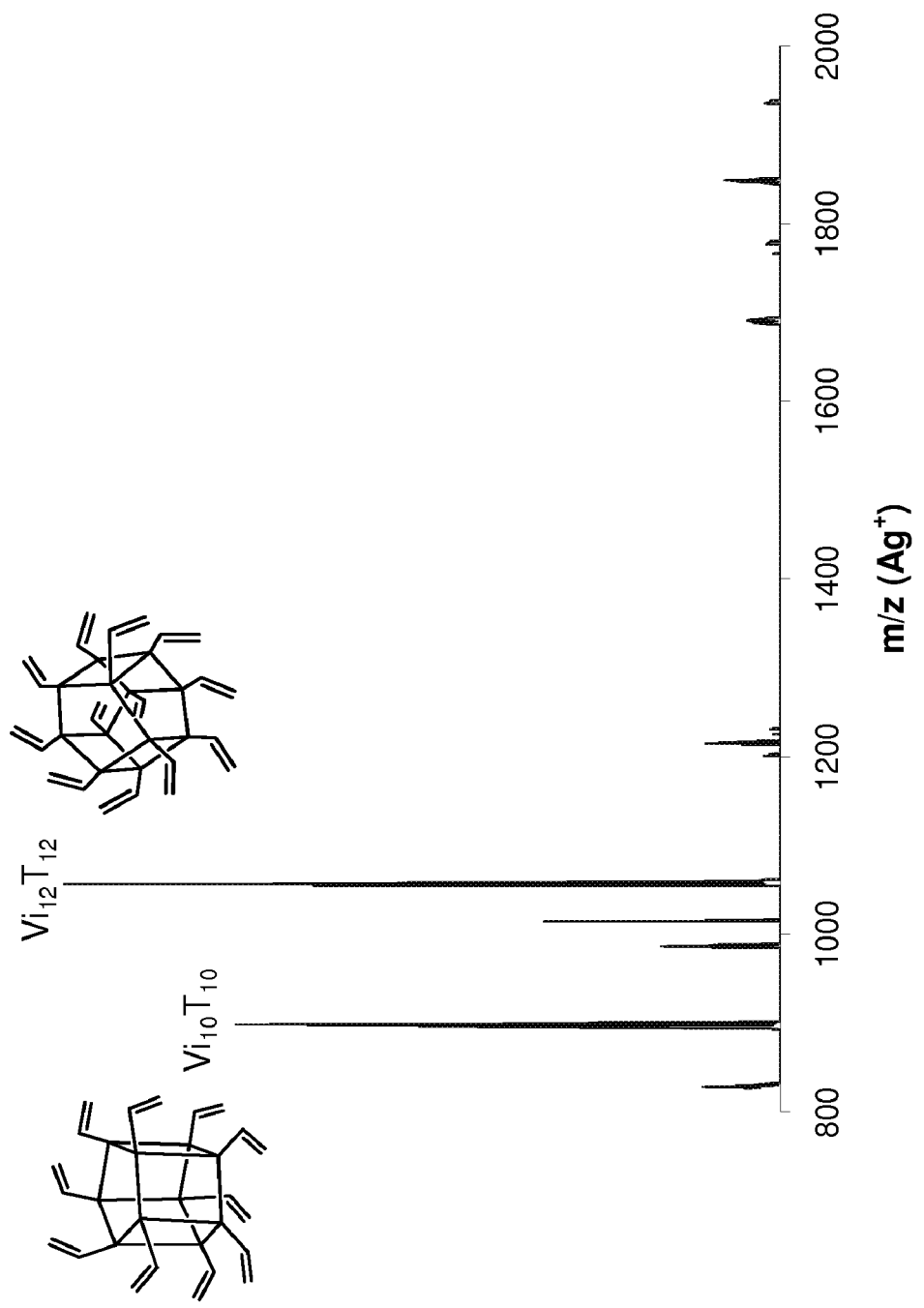

FIG. 14 shows MALDI-TOF spectrochromatogram of TBAF catalyzed dissolution of PVS after quenching with CaCl$_2$ and catalyzed with TBAF.

Figure 15A:
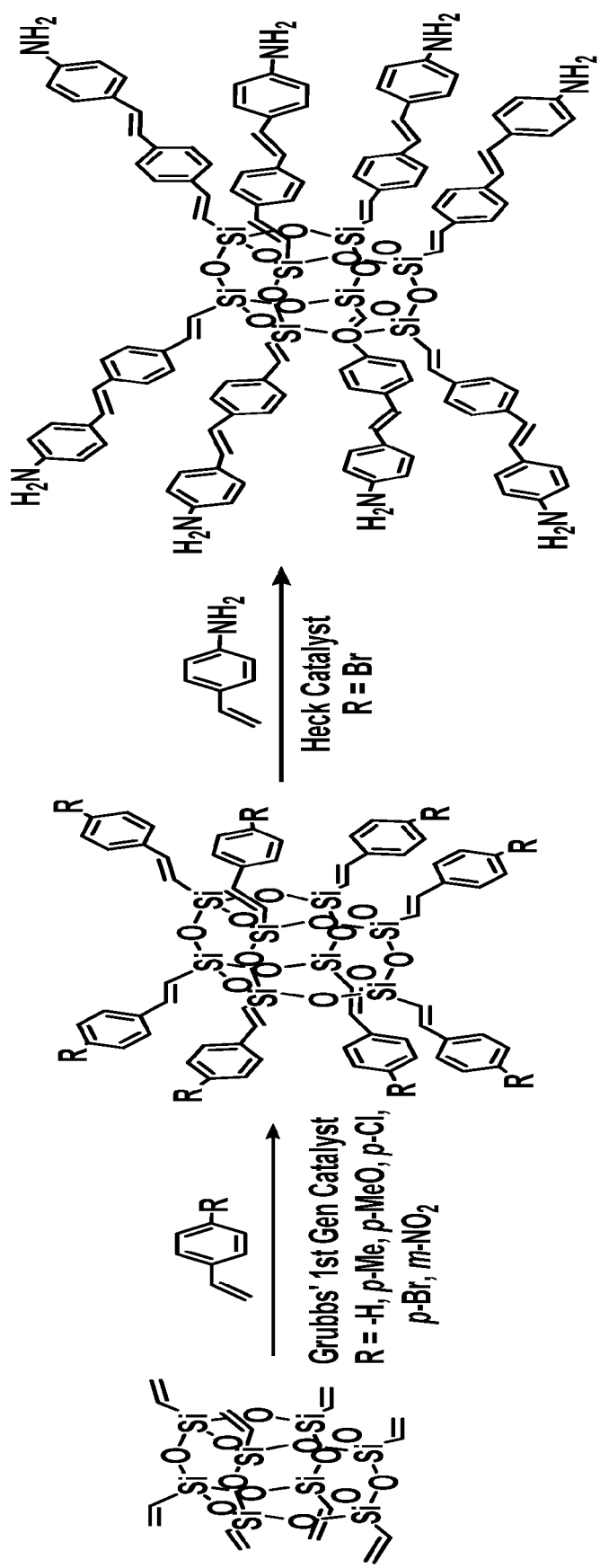

FIG. 15A shows the synthesis reaction scheme for the production of functionalized octavinylsilsesquioxane from octavinylsilsesquioxane (OVS) as a starting material.

Figure 15B:
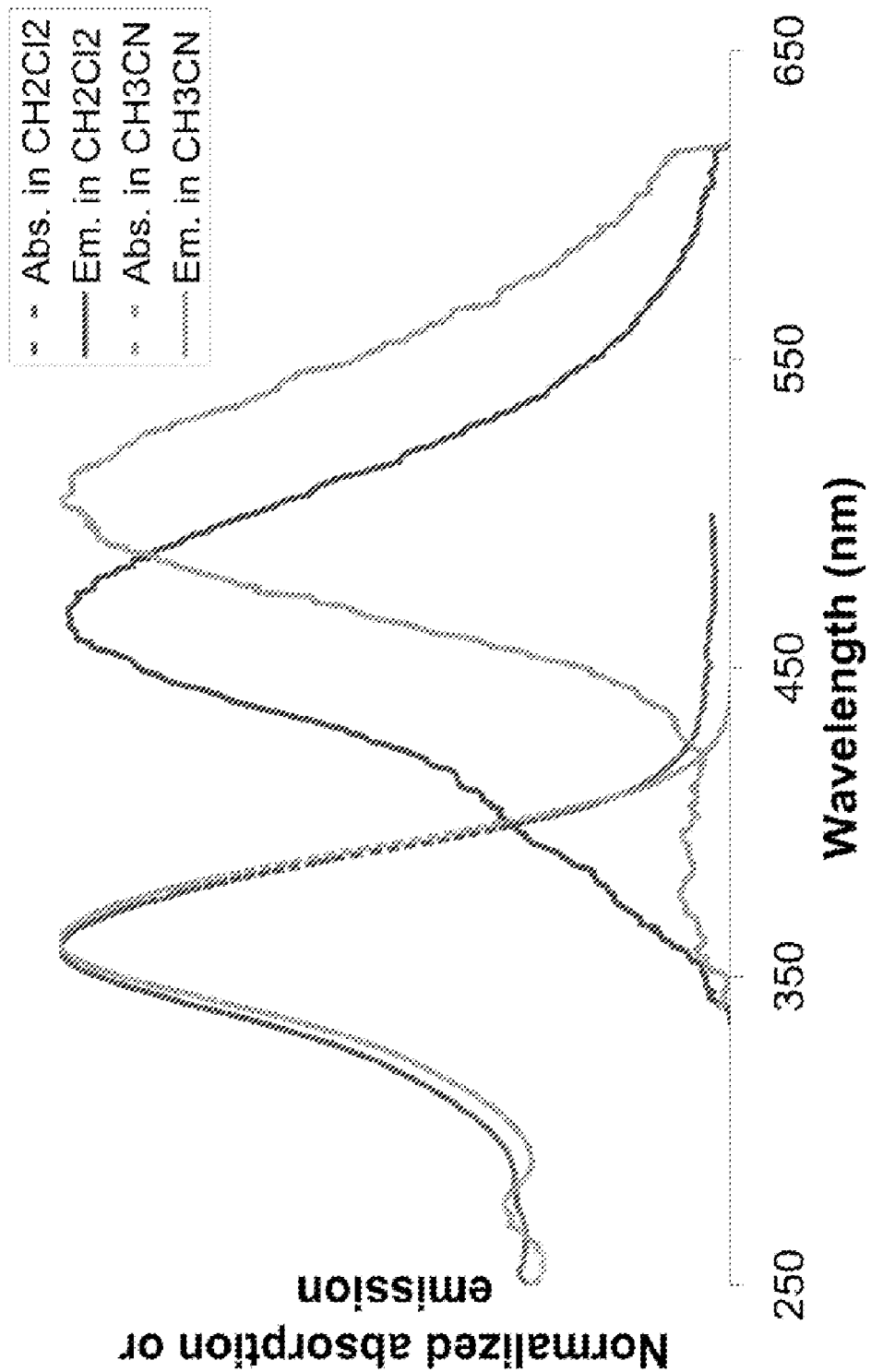

FIG. 15B shows a plot of UV-Vis absorption of the p-NH$_2$ compound from FIG. 15A is red-shifted 30 nm from the parent vinyl-stilbene but its emission is red-shifted as much as 120 nm from the parent compound and is strongly affected by polar solvents.

Figure 16:
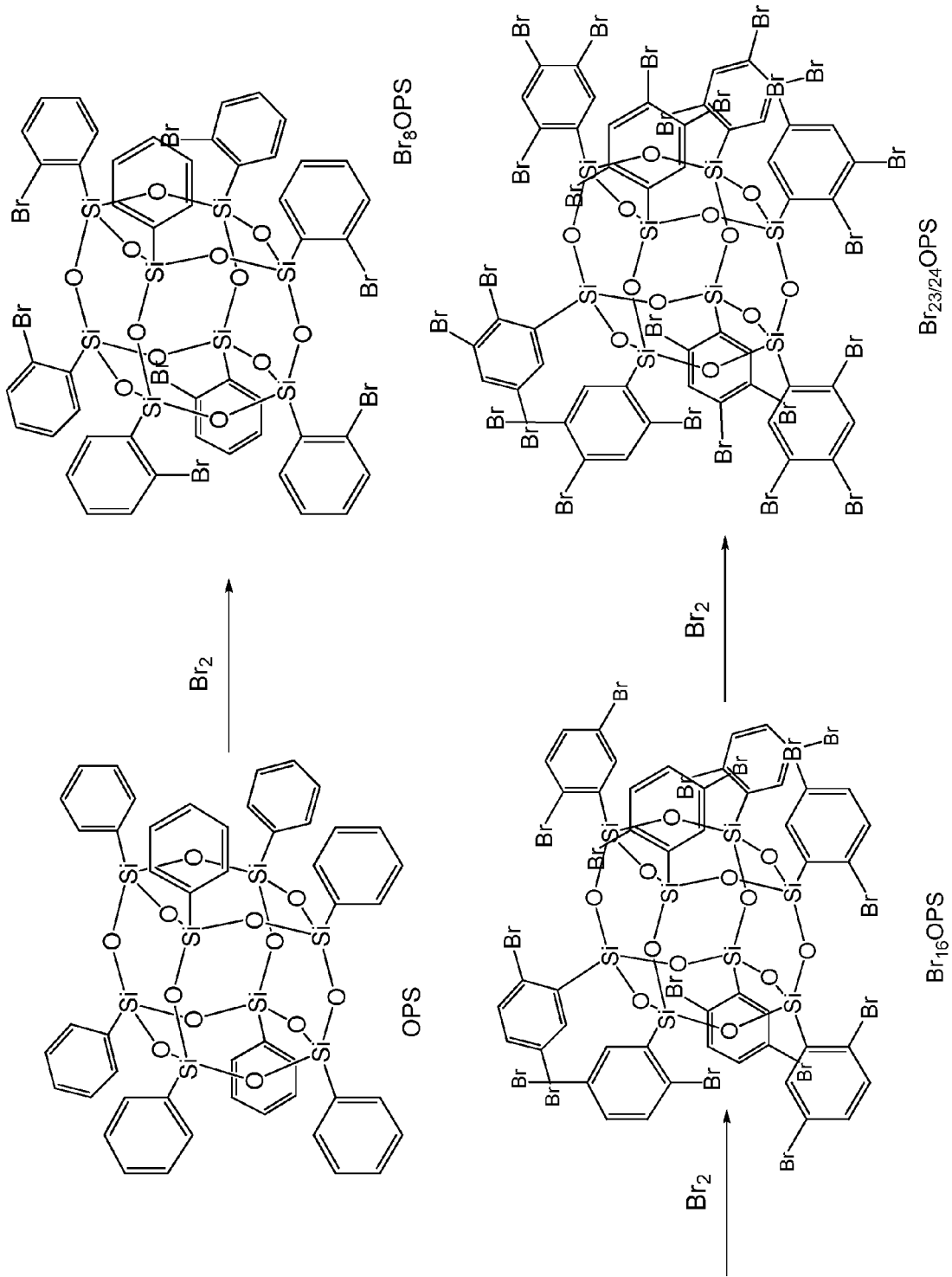

FIG. 16 shows a reaction scheme to synthesize Br$_8$OPS, Br$_{16}$OPS and $_{Br23/24}$OPS. Each compound is easily prepared by control of Br$_2$ concentrations and the use of catalysts in accordance with the present technology. Bromination of OPS to introduce 8, 16 and 24 points of attachment for functional groups. Included are the crystal structures of the Br$_{16}$ and Br$_{23/24}$ compounds.

Figure 17A:
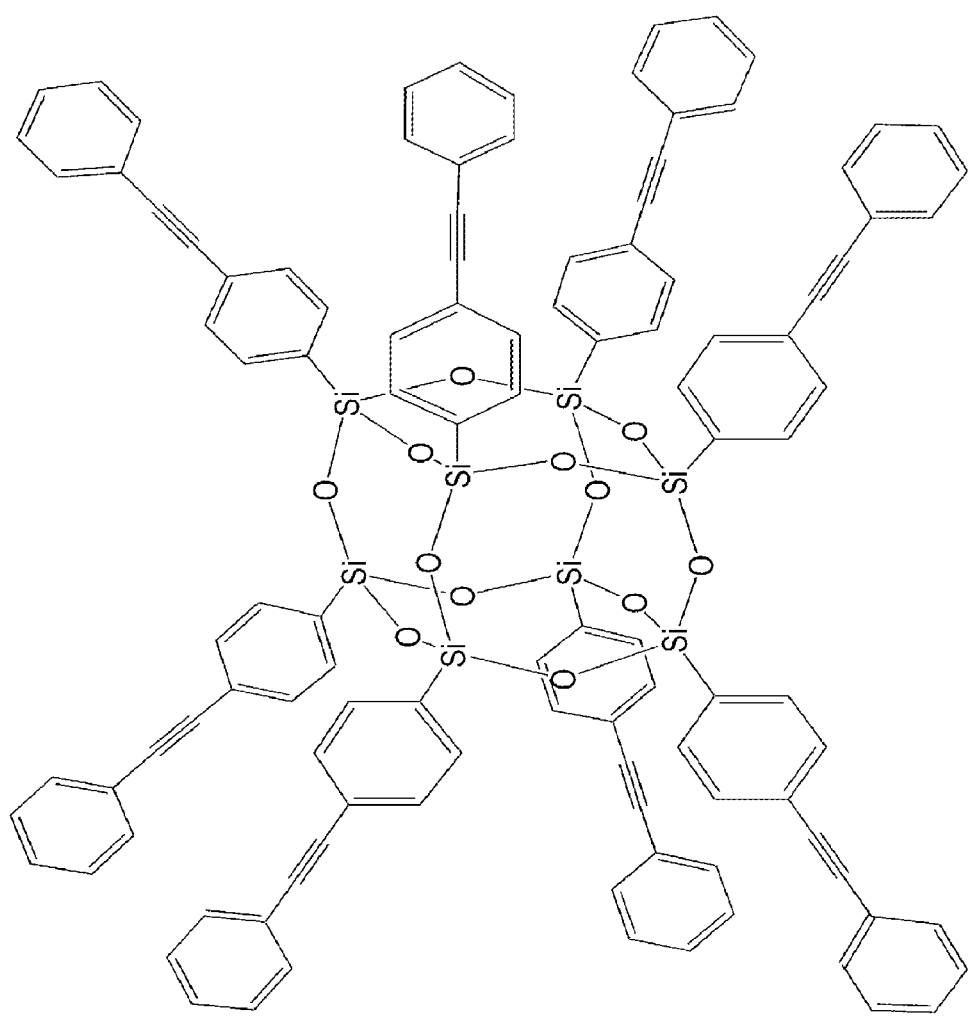
Figure 17B:
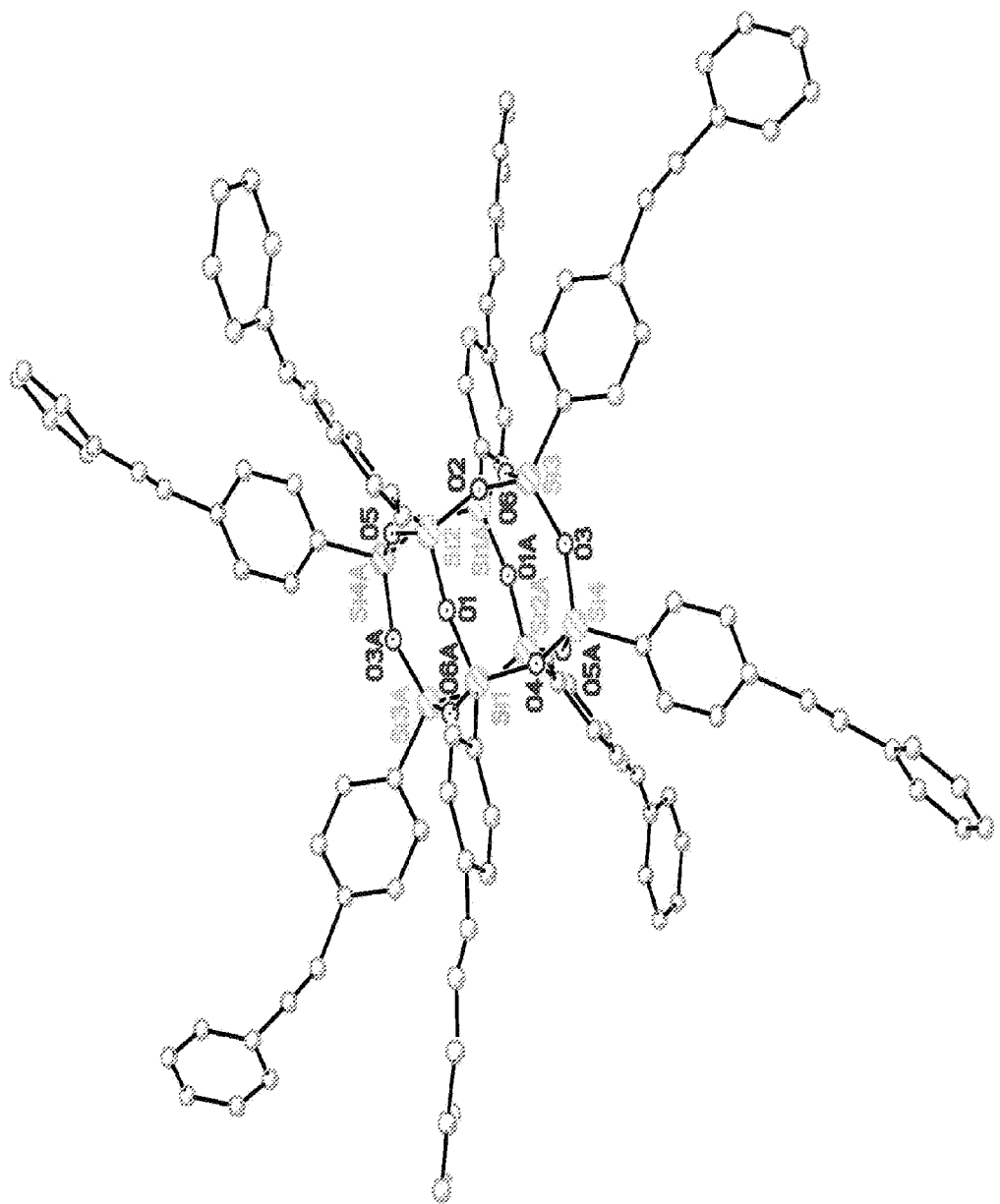

FIG. 17 shows the structure of Octadiphenylalkynesilsesquioxane in the form of a line drawing and single crystal structure.

Figure 18:
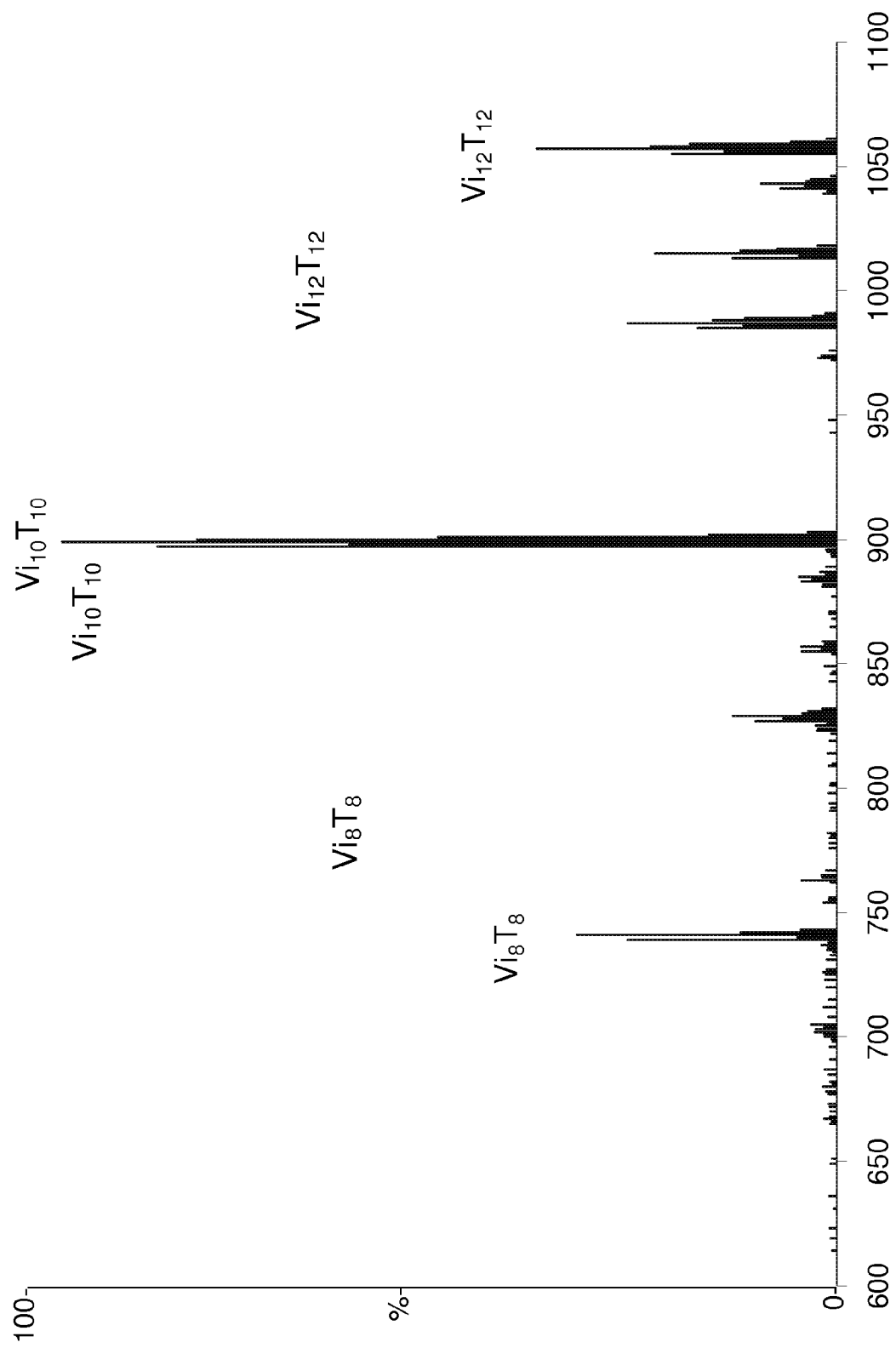

FIG. 18 shows a MALDI-TOF spectrochromatogram of TBAF catalyzed synthesis of phenyl$_x$vinyl$_{(10-x)}$T$_{10}$ from phenyl$_8$T$_8$ and vinyl$_8$T$_8$ in accordance with the present technology.

Figure 19:
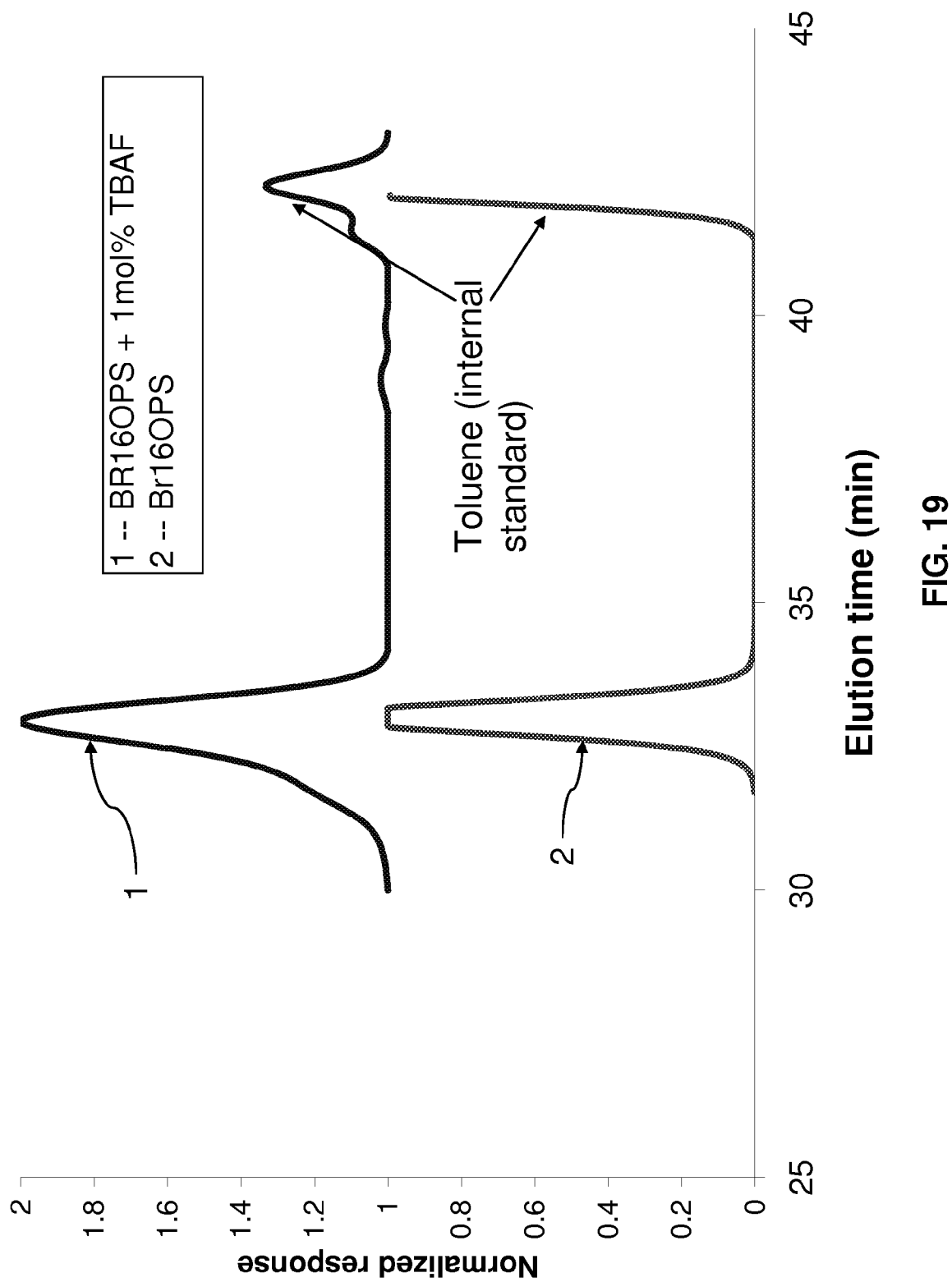

FIG. 19 shows a gel permeation chromatography (GPC) chromatogram depicting the rearrangement of Br$_{16}$OPS by tetrabutylammonium fluoride illustrating the formation of both polymer and higher cages based on the changes in retention time as expected from the first examples.

Figure 20:
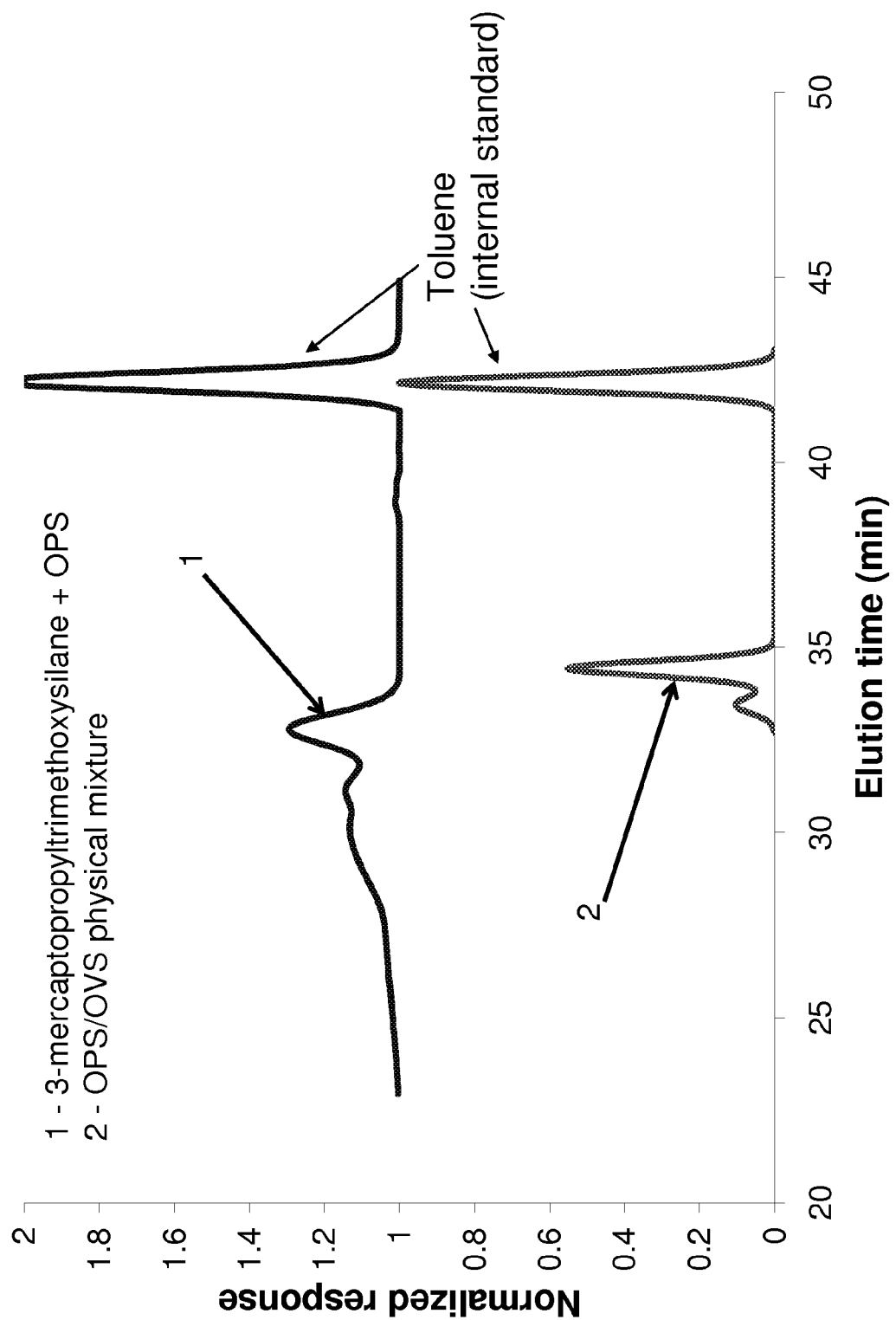

FIG. 20 shows a gel permeation chromatography (GPC) chromatogram depicting the elution profile of the synthesis products of the reaction between OPS and 3-mercaptopropyltrimethoxysilane catalyzed by 0.1 mL of 1.0M tetrabutylammonium fluoride in THF and quenched with CaCl$_2$.

Figure 21:
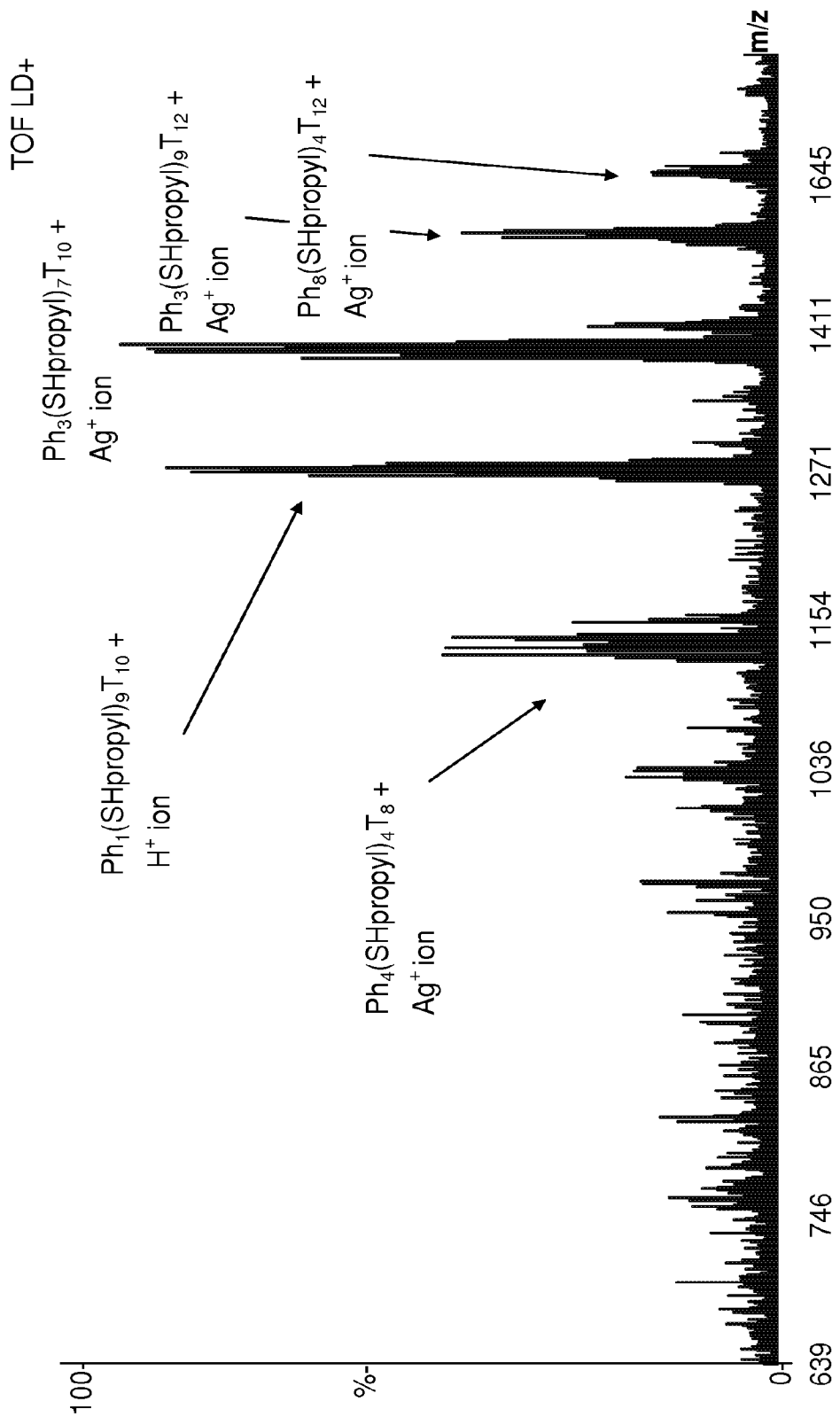

FIG. 21 shows a MALDI-TOF spectrochromatogram of TBAF catalyzed synthesis of the products formed in FIG. 20.

Figure 22:
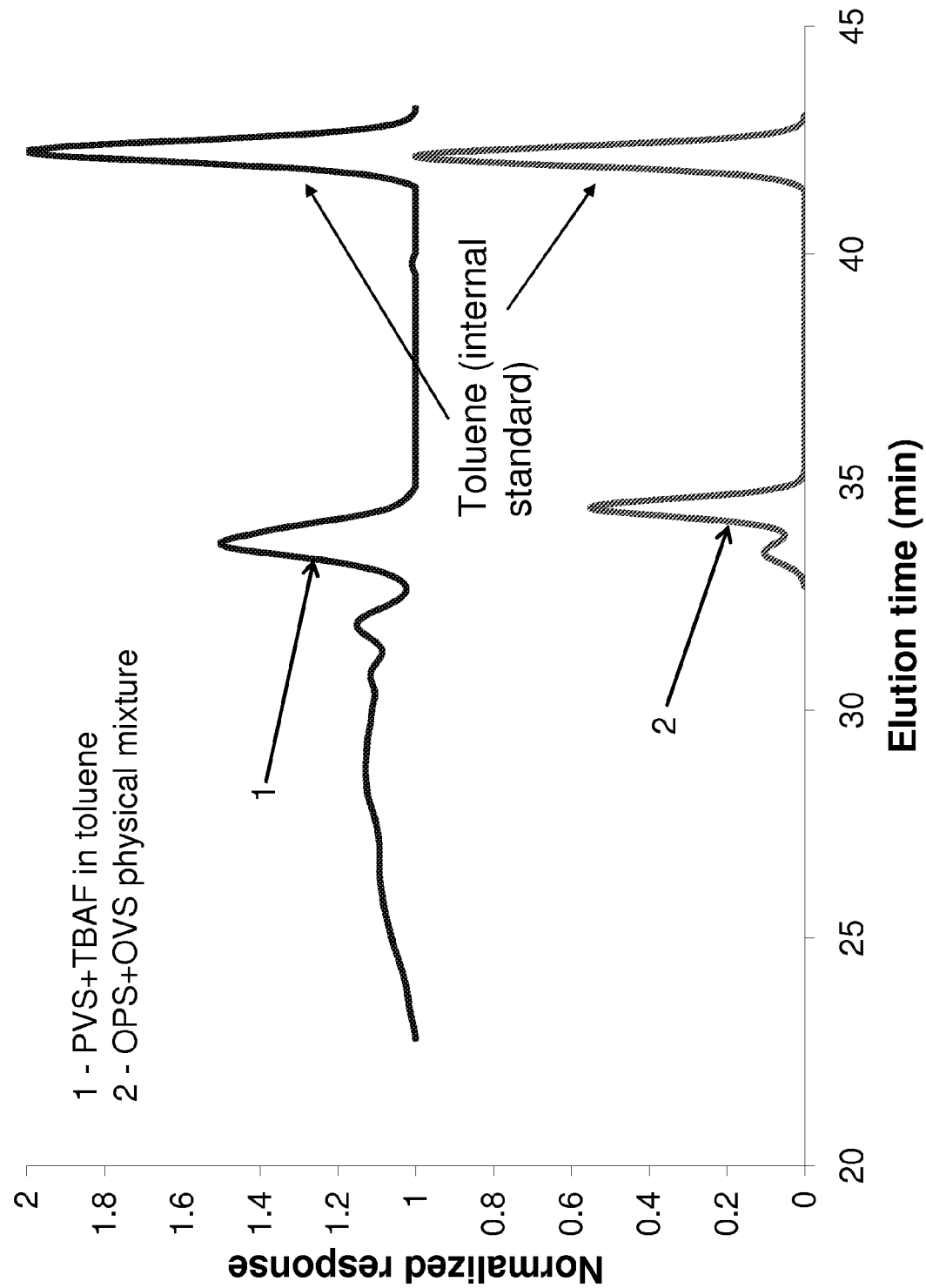

FIG. 22 shows a gel permeation chromatography (GPC) chromatogram depicting the elution profile of the vinyl$_{10}$t$_{10}$ and vinyl$_{12}$t$_{12}$ synthesized from polyvinylsilsesquioxane (PVS) with tetrabutylammonium fluoride in toluene.

Figure 23:
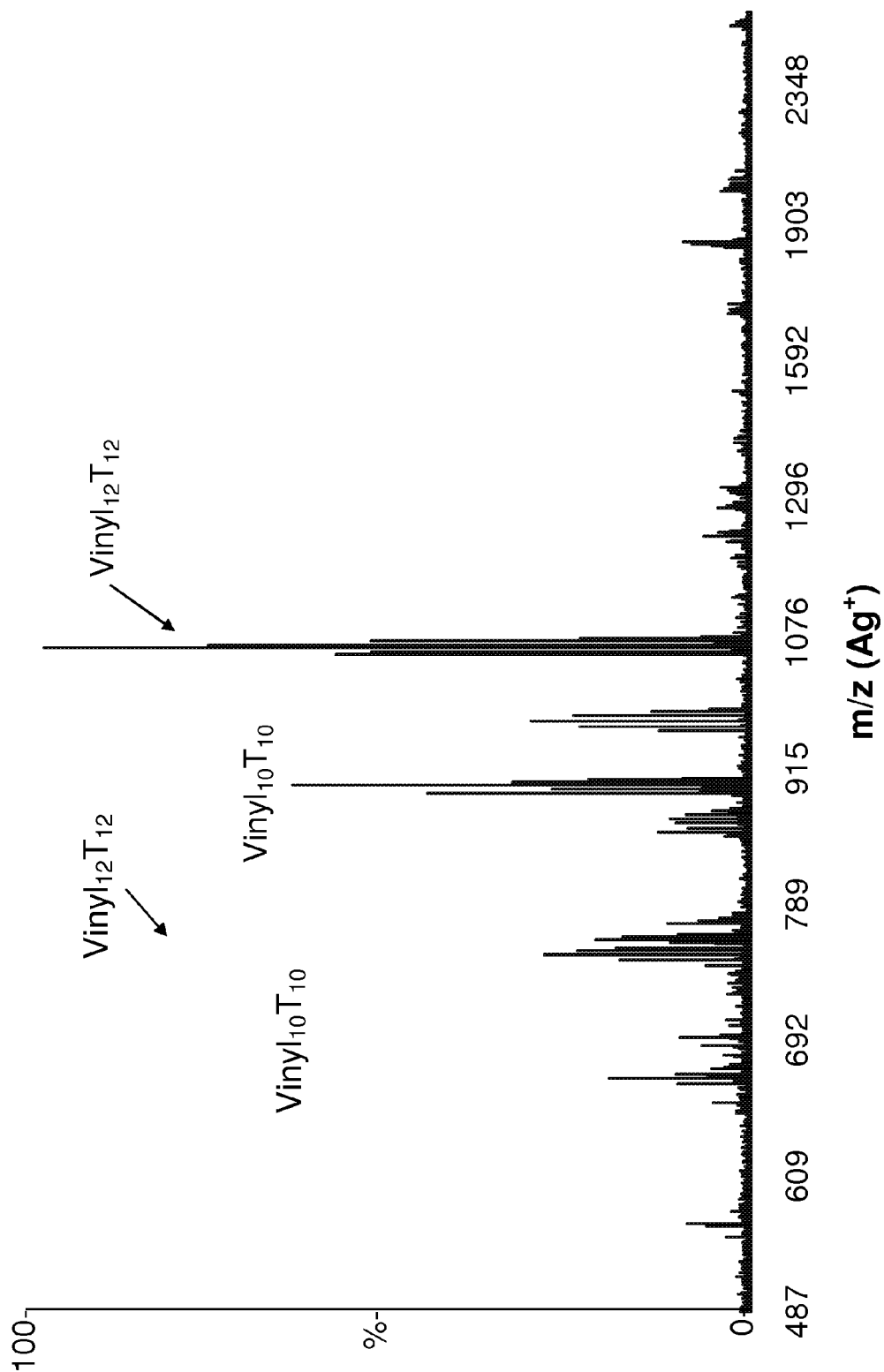

FIG. 23 shows a MALDI-TOF spectrochromatogram of TBAF catalyzed synthesis of the products formed in FIG. 22.

Figure 24:
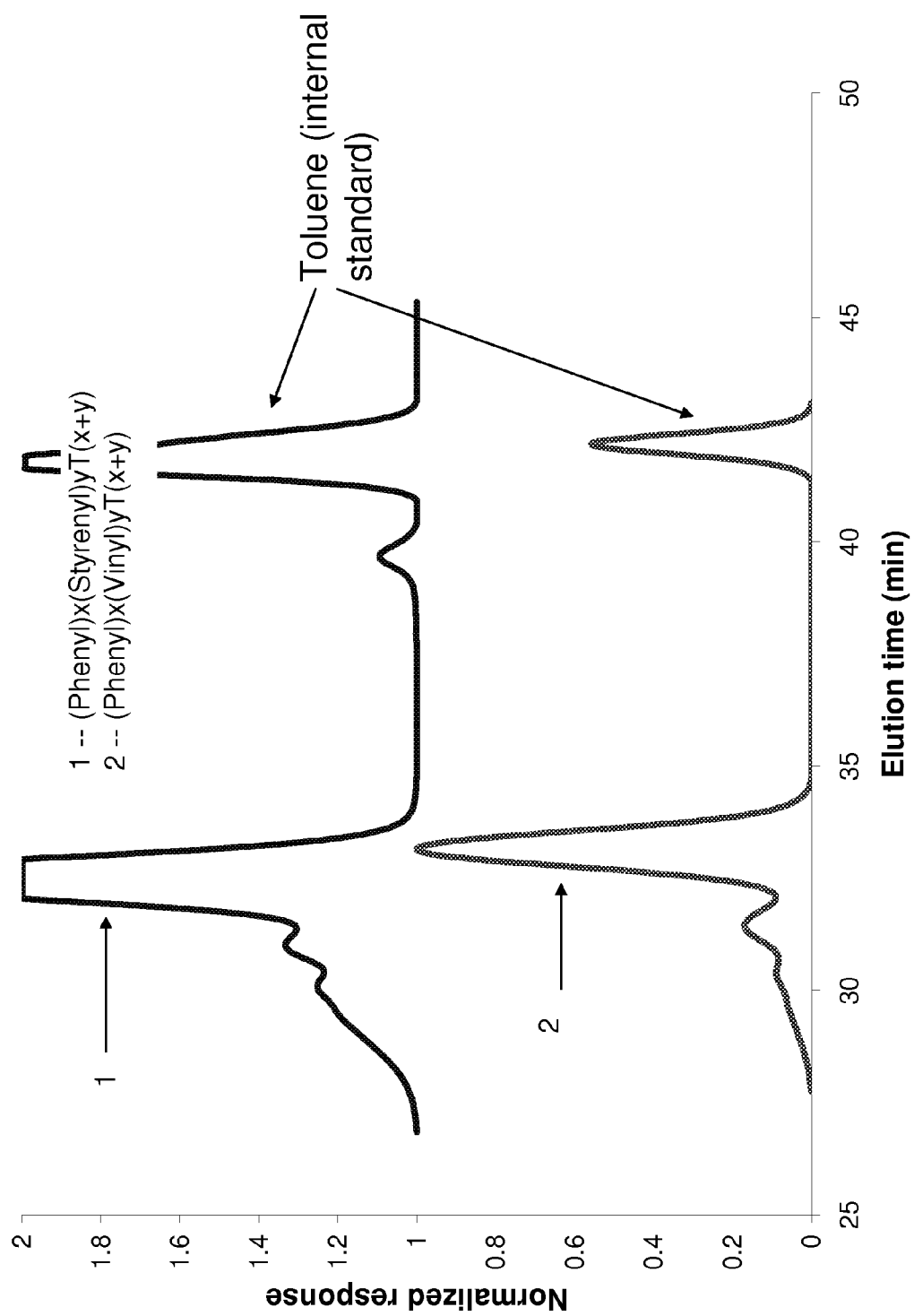

FIG. 24 shows a gel permeation chromatography (GPC) chromatogram depicting the elution of the synthesis products phenyl$_x$styrenyl$_{(10-x)}$t$_{10}$ and phenyl$_x$styrenyl$_{(12-x)}$t$_{12}$ from phenyl$_x$vinyl$_{(10-x)}$t$_{10}$ and phenyl$_x$vinyl$_{(12-x)}$t$_{12}$.

Figure 25:
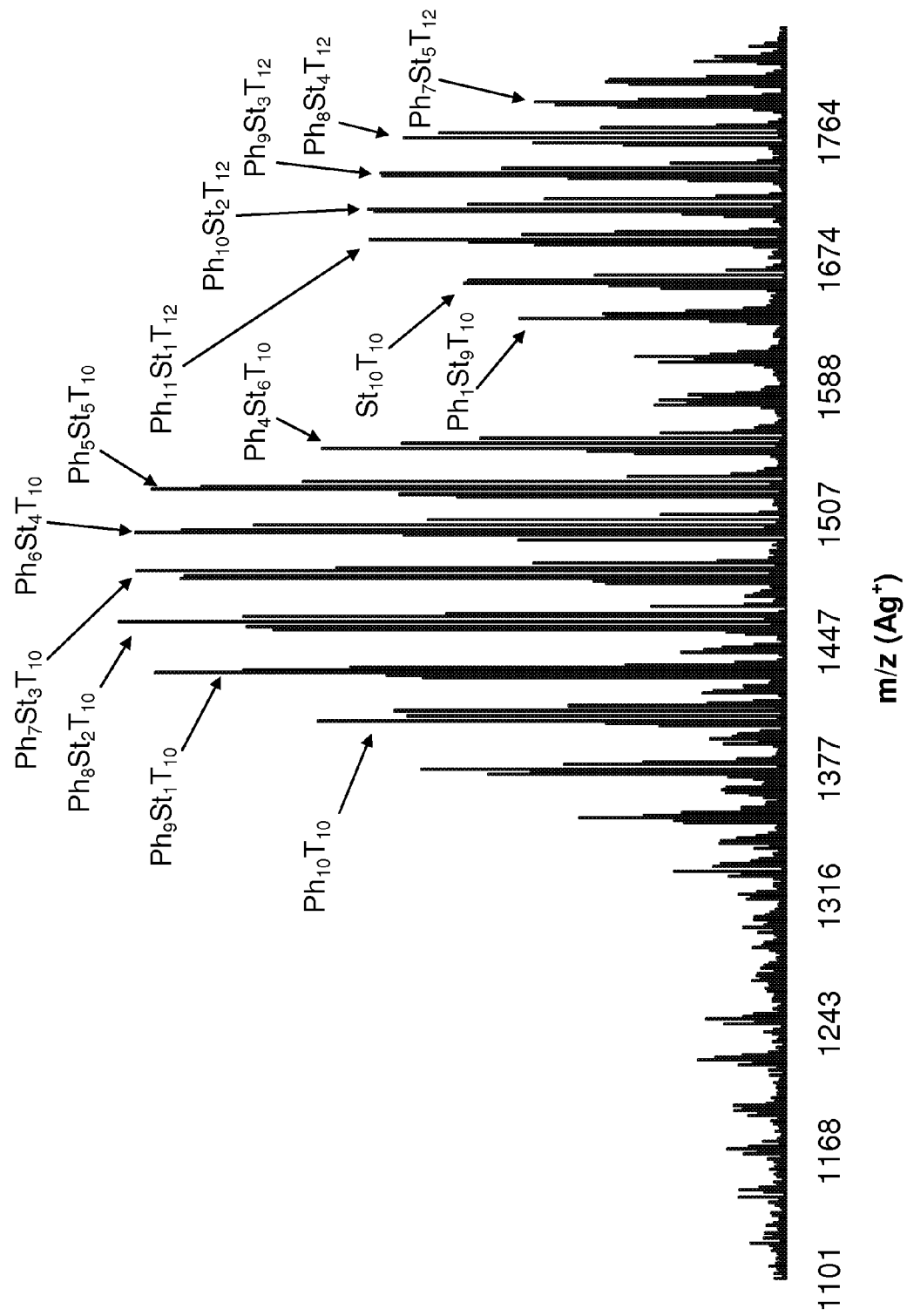

FIG. 25 shows a MALDI-TOF spectrochromatogram of the phenyl$_x$styrenyl$_{(10-x)}$t$_{10}$ and phenyl$_x$styrenyl$_{(12-x)}$t$_{12}$ mixtures formed in FIG. 24.

Figure 26:
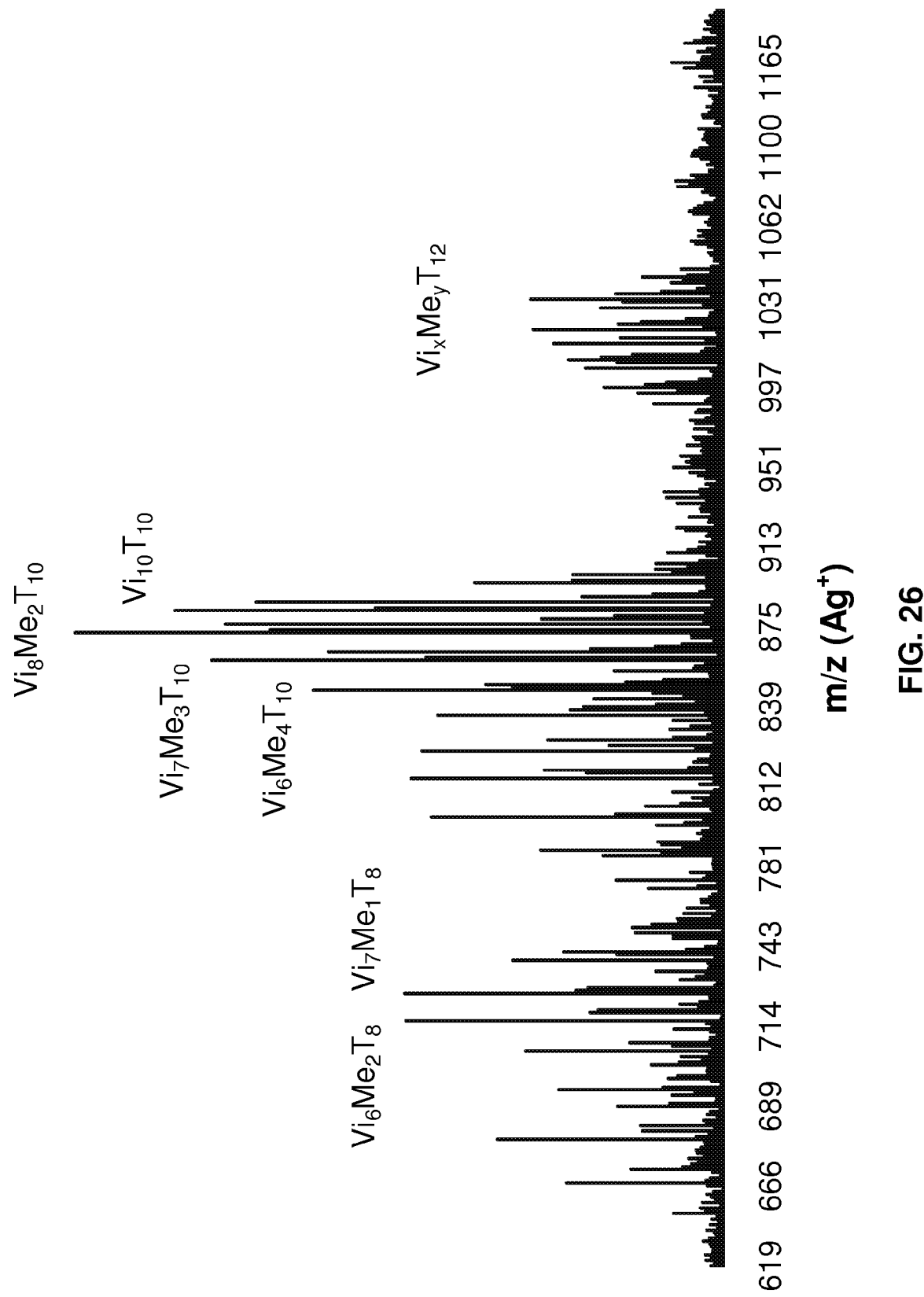

FIG. 26 shows a MALDI-TOF spectrochromatogram of methyl$_x$vinyl$_y$T$_{(x+y)}$ (x+y=8,10,12) synthesized from polymethylsiloxane and polyvinyl-siloxane catalyzed with TBAF and treated with CaCl$_2$ at room temperature.

Figure 27:
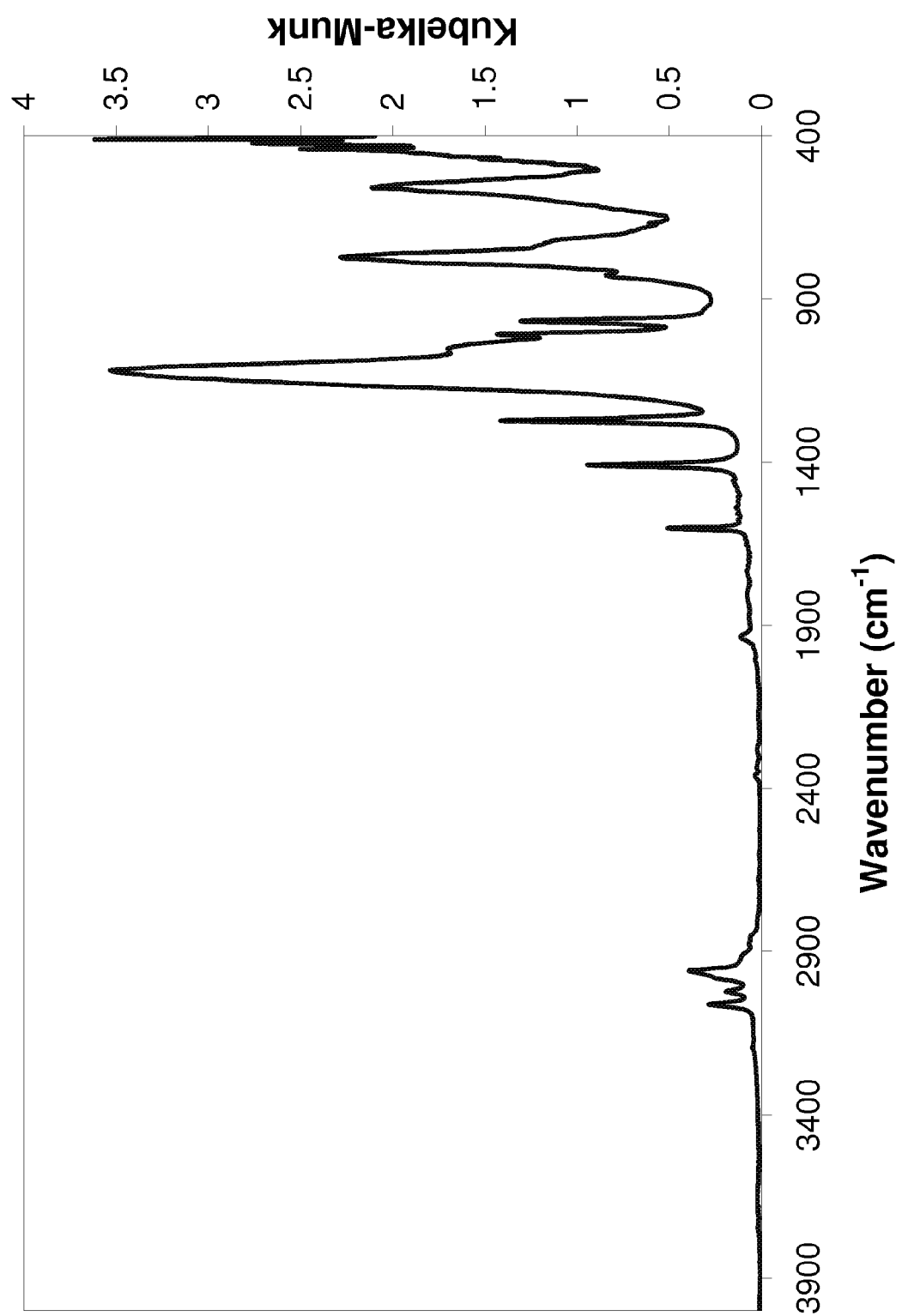

FIG. 27 shows a spectrogram of a Fourier transform-infra red (FT-IR) in KBr analysis of methyl$_x$vinyl$_y$T$_{(x+y)}$ (x+y=8, 10,12) mixtures obtained from FIG. 26.

Figure 28:
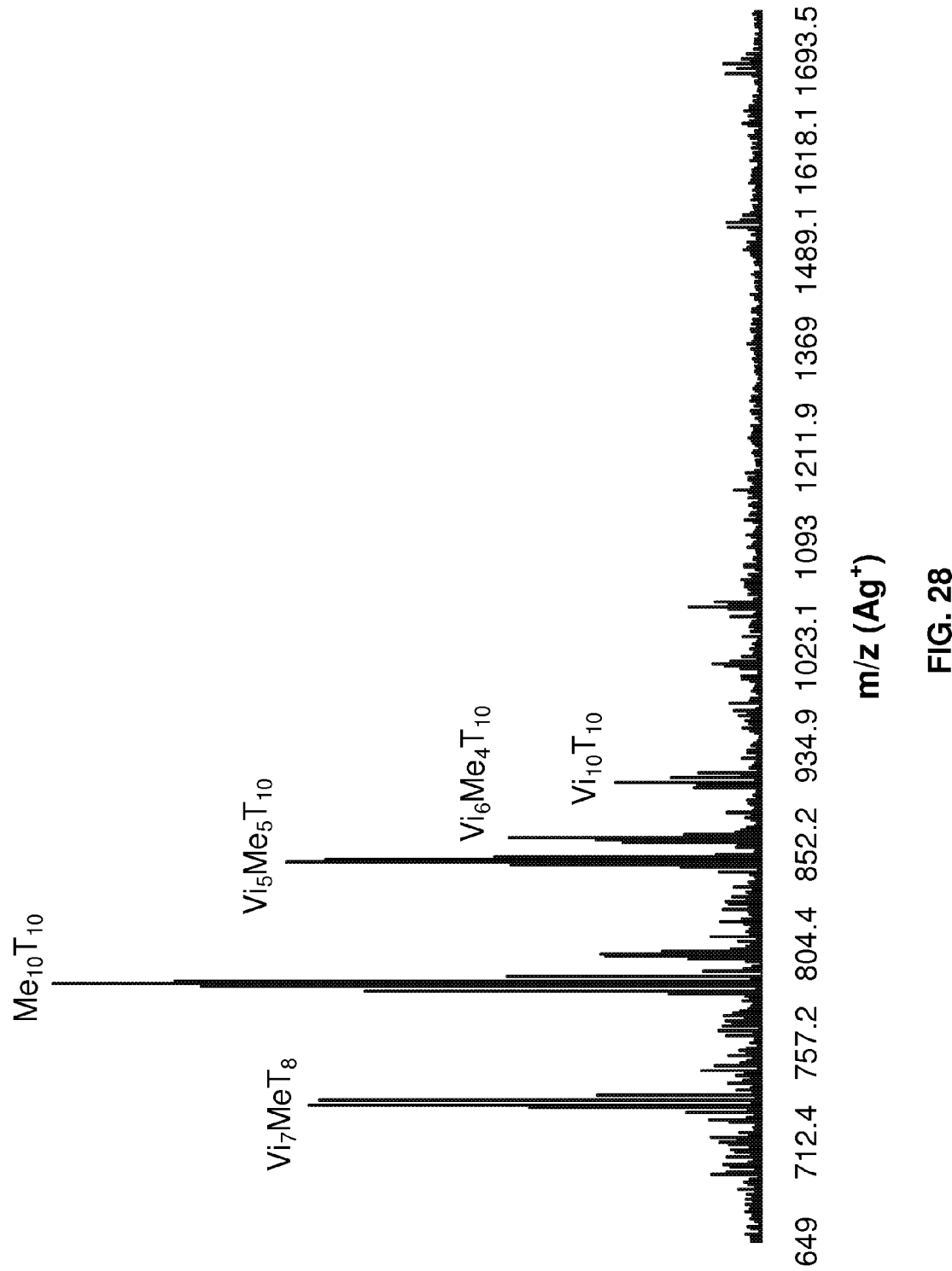

FIG. 28 shows a MALDI-TOF spectrochromatogram of methyl$_x$vinyl$_y$T$_{(x+y)}$ (x+y=8,10,12) synthesized from polymethylsiloxane and polyvinyl-siloxane catalyzed with TBAF under reflux and treated with and CaCl$_2$.

Figure 29:
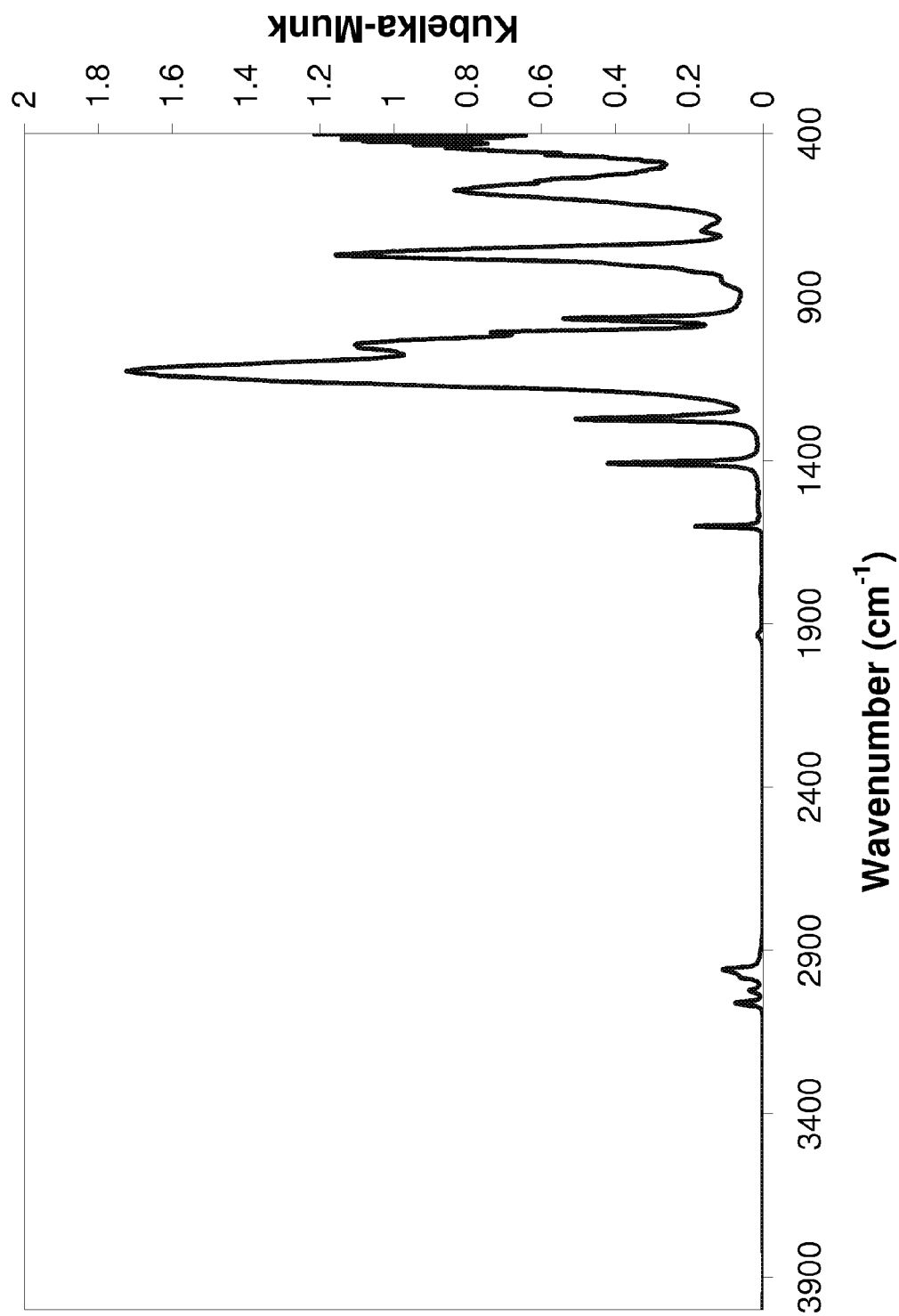

FIG. 29 shows a spectrogram of a Fourier transform-infra red (FT-IR) in KBr analysis of methyl$_x$vinyl$_y$T$_{(x+y)}$ (x+y=8, 10,12) mixtures obtained from FIG. 28.

Figure 30:
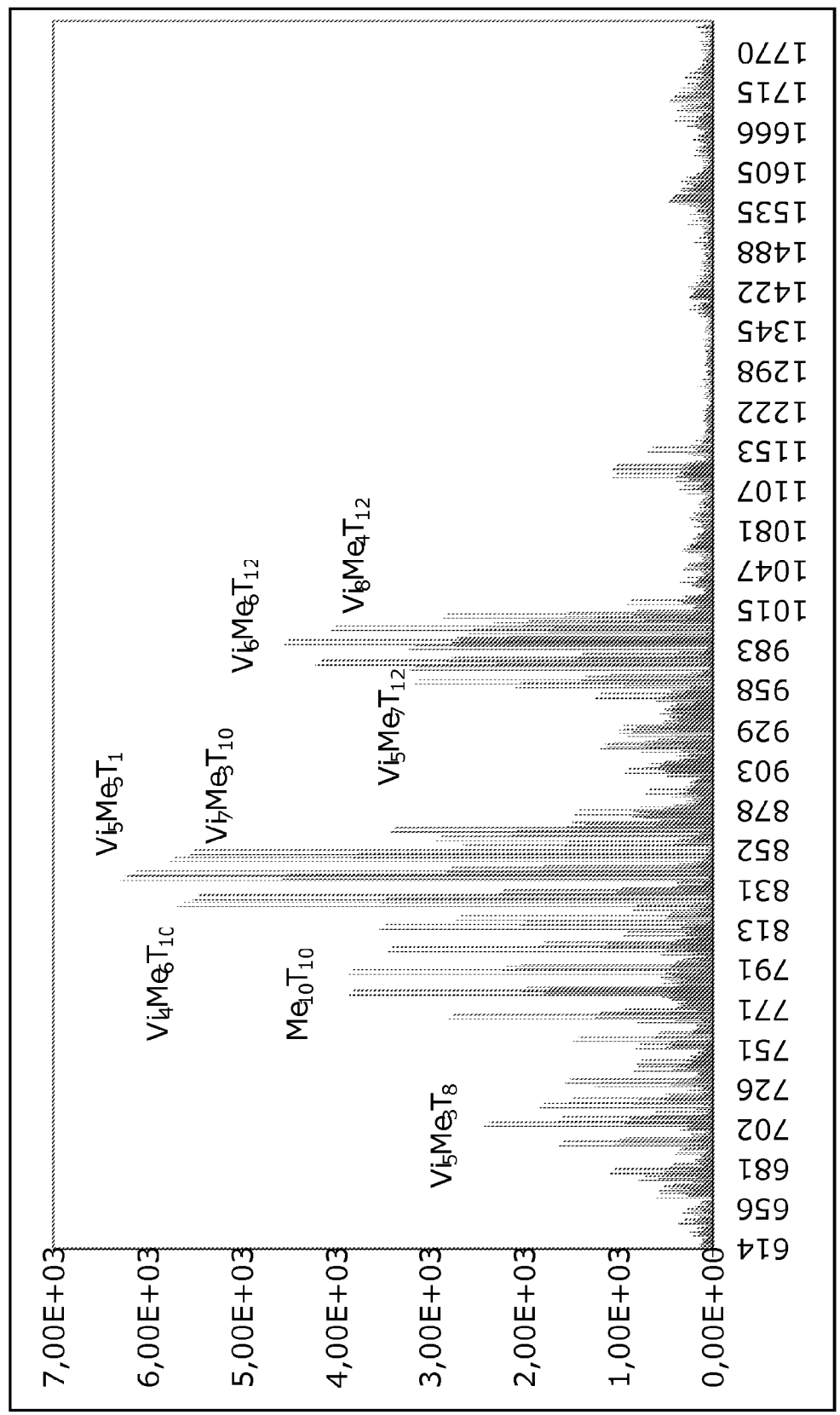

FIG. 30 shows a MALDI-TOF spectrochromatogram of methyl$_x$vinyl$_y$T$_{(x+y)}$ (x+y=8,10,12) synthesized from polymethylsiloxane and Octavinyl-siloxane (OVS) catalyzed with TBAF at room temperature and subsequently treated with and CaCl$_2$.

Figure 31:
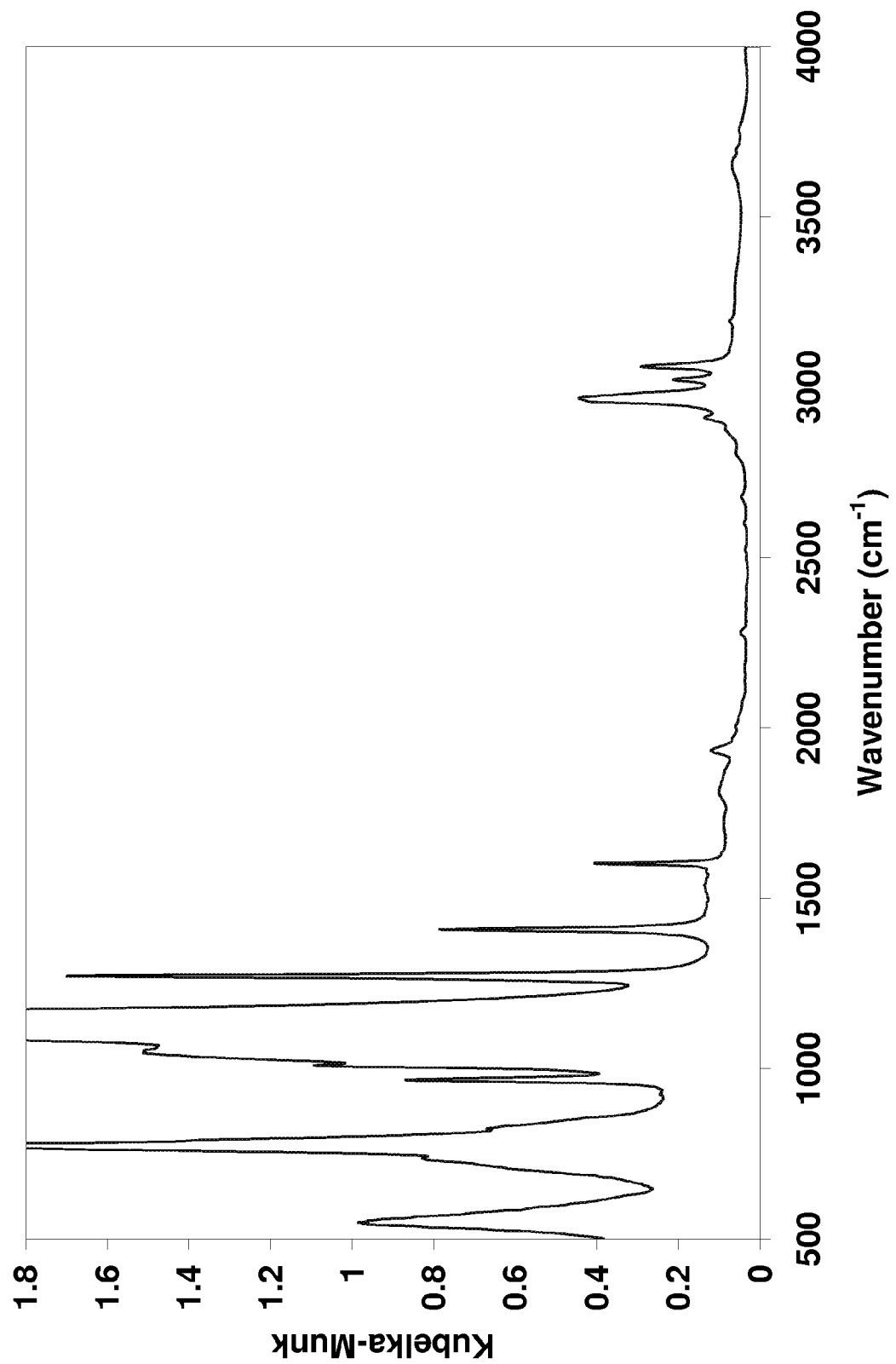

FIG. 31 shows a spectrogram of a Fourier transform-infra red (FT-IR) in KBr analysis of methyl$_x$vinyl$_y$T$_{(x+y)}$ (x+y=8, 10,12) mixtures obtained from FIG. 30.

Figure 32:
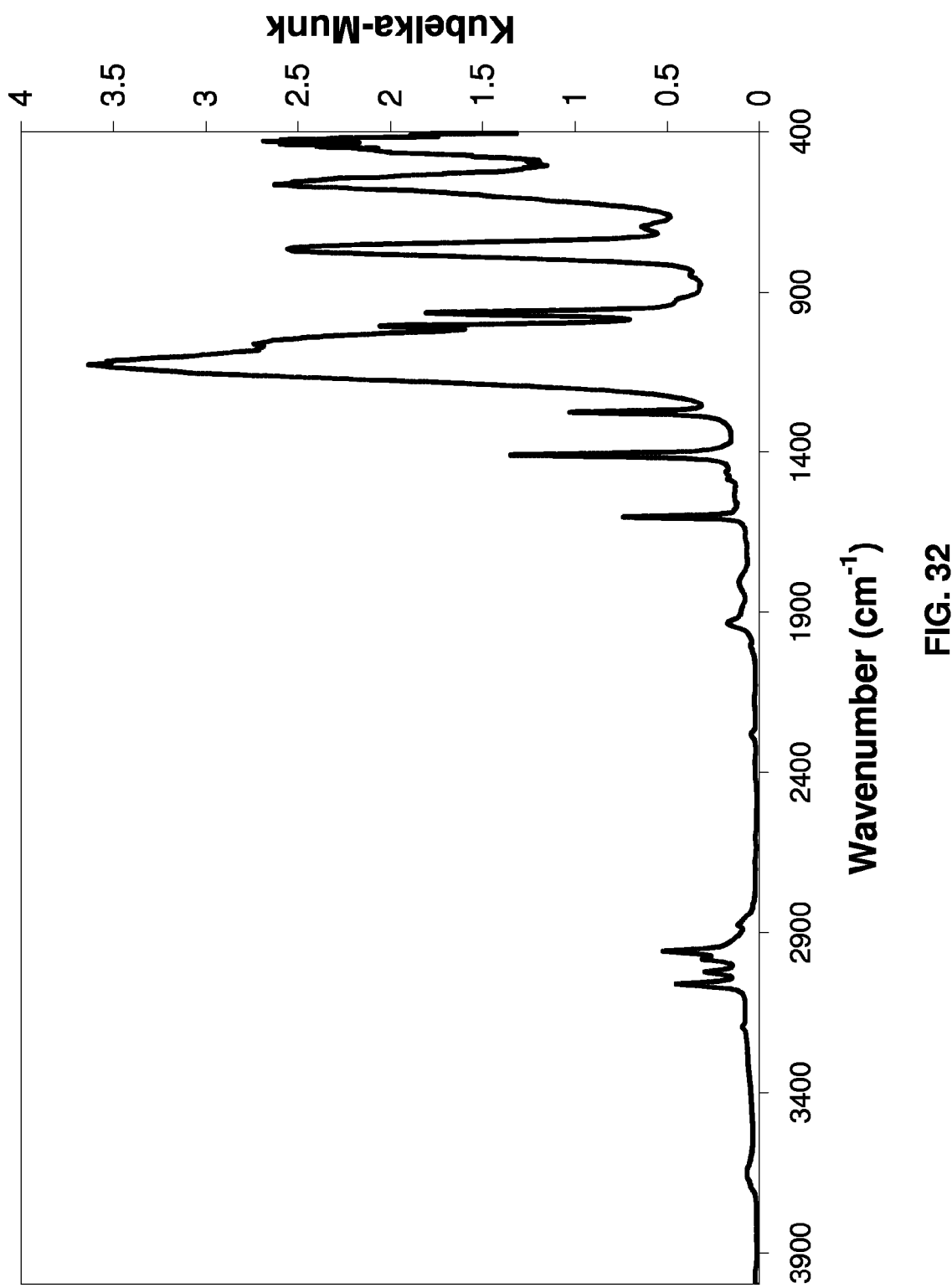

FIG. 32 shows a spectrogram of a fourier transform-infra red in KBr analysis of the rearrangement of polyvinylsiloxane and tetraethylorthosilicate (TEOS) catalyzed by tetrabutylammonium fluoride (TBAF) and subsequently treated with CaCl$_2$.

Figure 33:
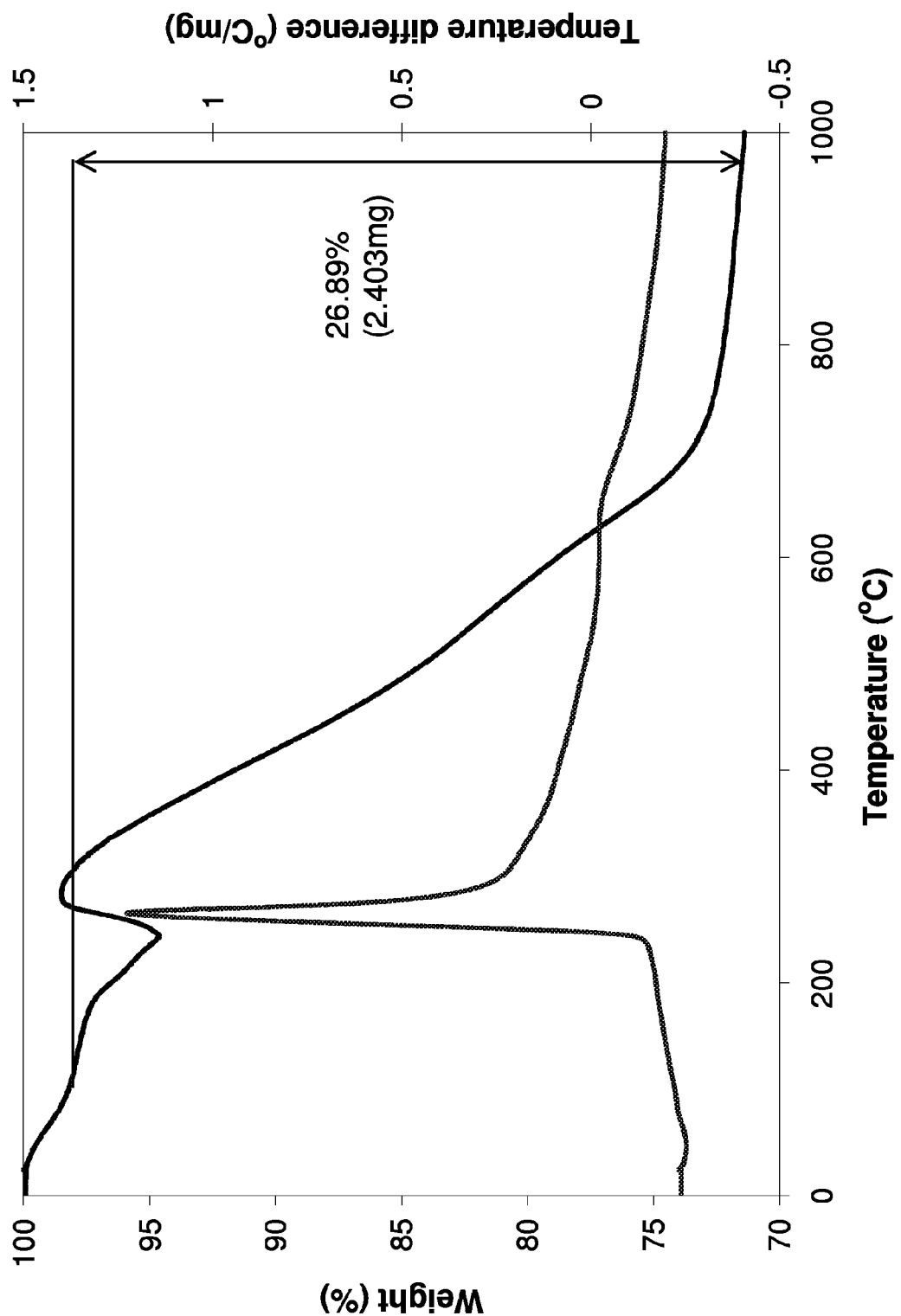

FIG. 33 shows a trace gas analyzer chromatogram performed in air of the reaction products derived by the rearrangement of polyvinylsiloxane and tetraethylorthosilicate (TEOS) catalyzed by tetrabutylammonium fluoride (TBAF) and subsequently treated with CaCl$_2$.

Figure 34:
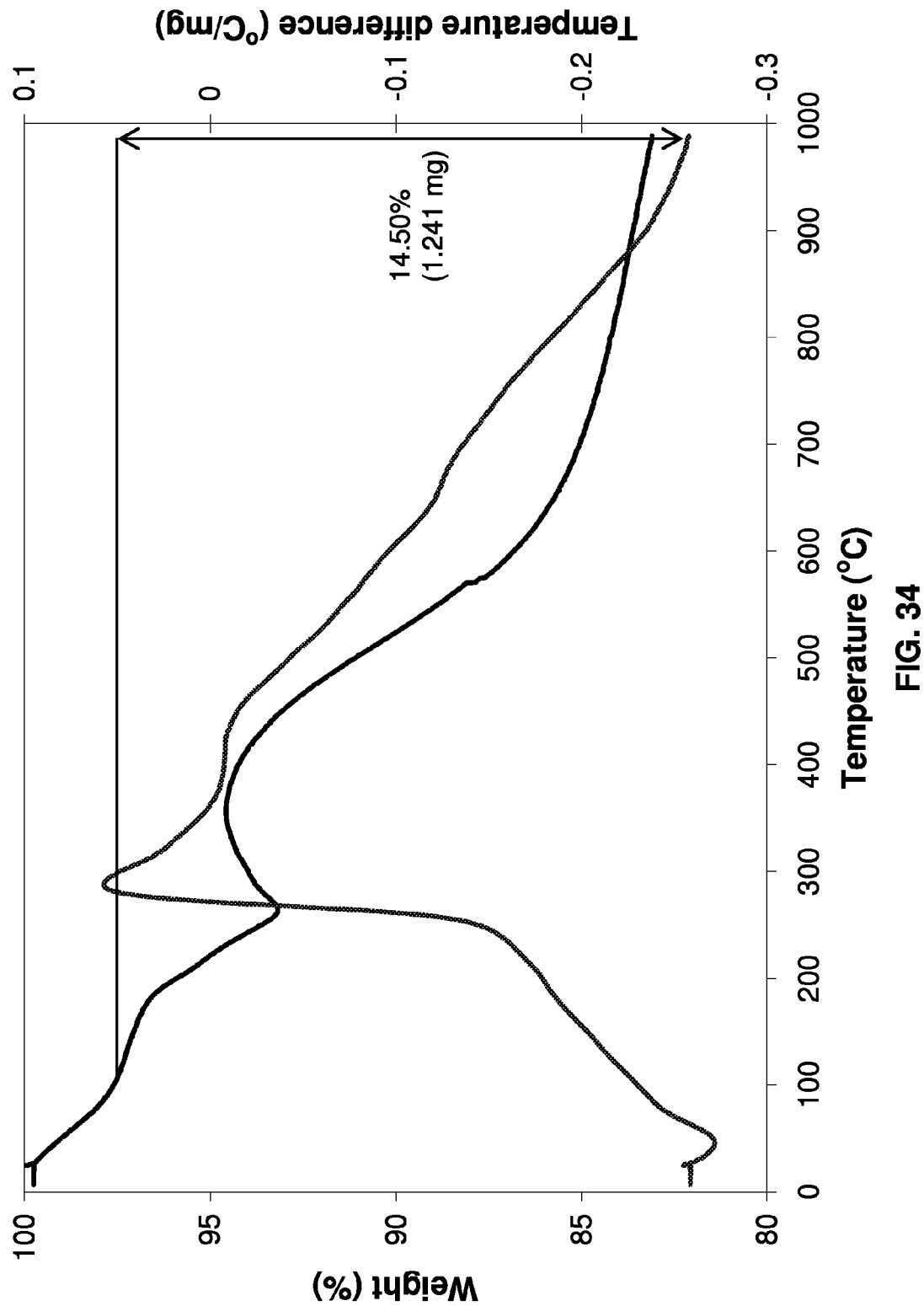

FIG. 34 shows a trace gas analyzer chromatogram performed in nitrogen (N$_2$) of the reaction products derived by the rearrangement of polyvinylsiloxane and tetraethylorthosilicate (TEOS) catalyzed by tetrabutylammonium fluoride (TBAF) and subsequently treated with CaCl$_2$.

Figure 35:
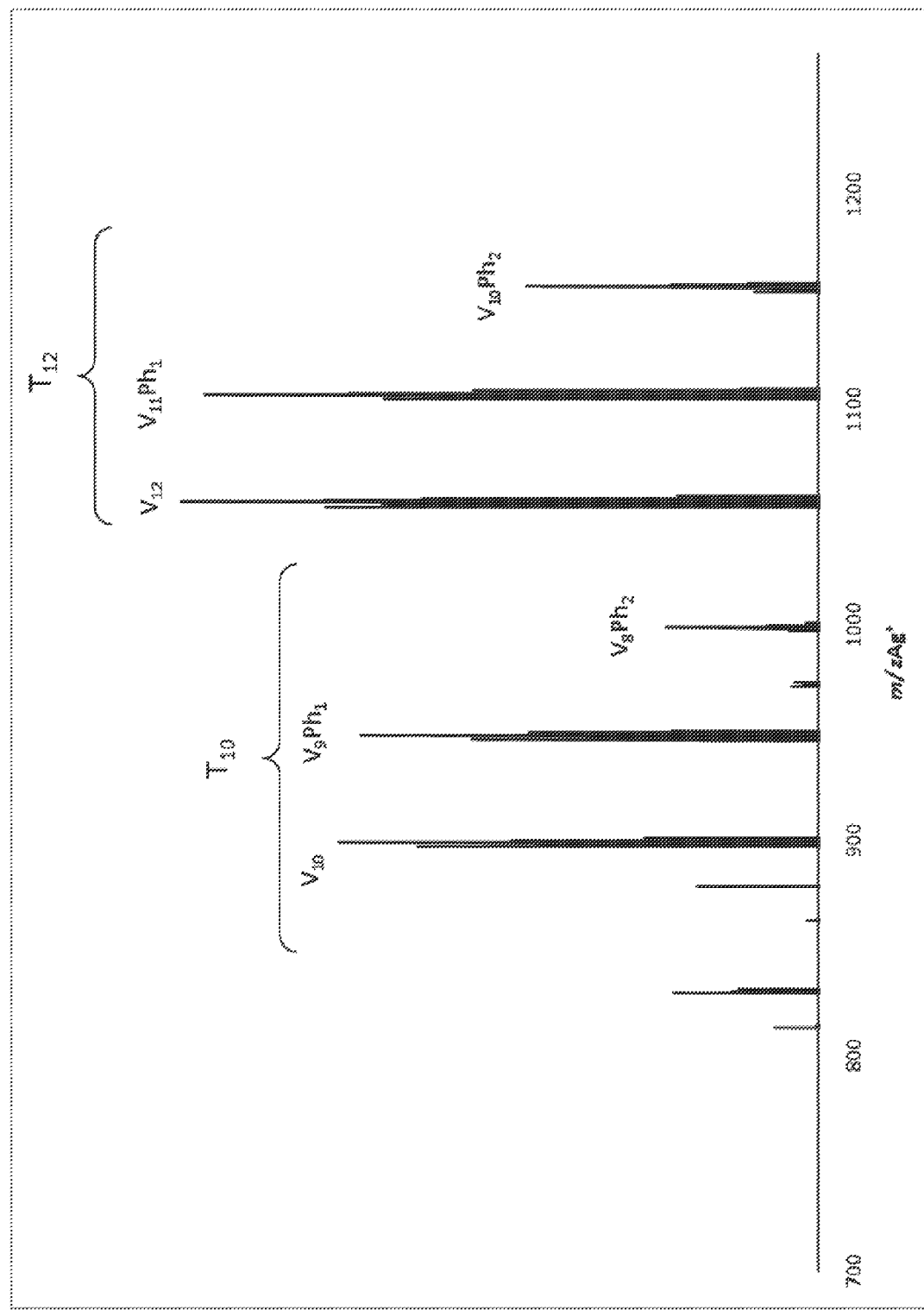

FIG. 35 shows a MALDI-TOF of 10:1 PVS:PPS reaction with TBAF (RT/48 h).

Figure 36:
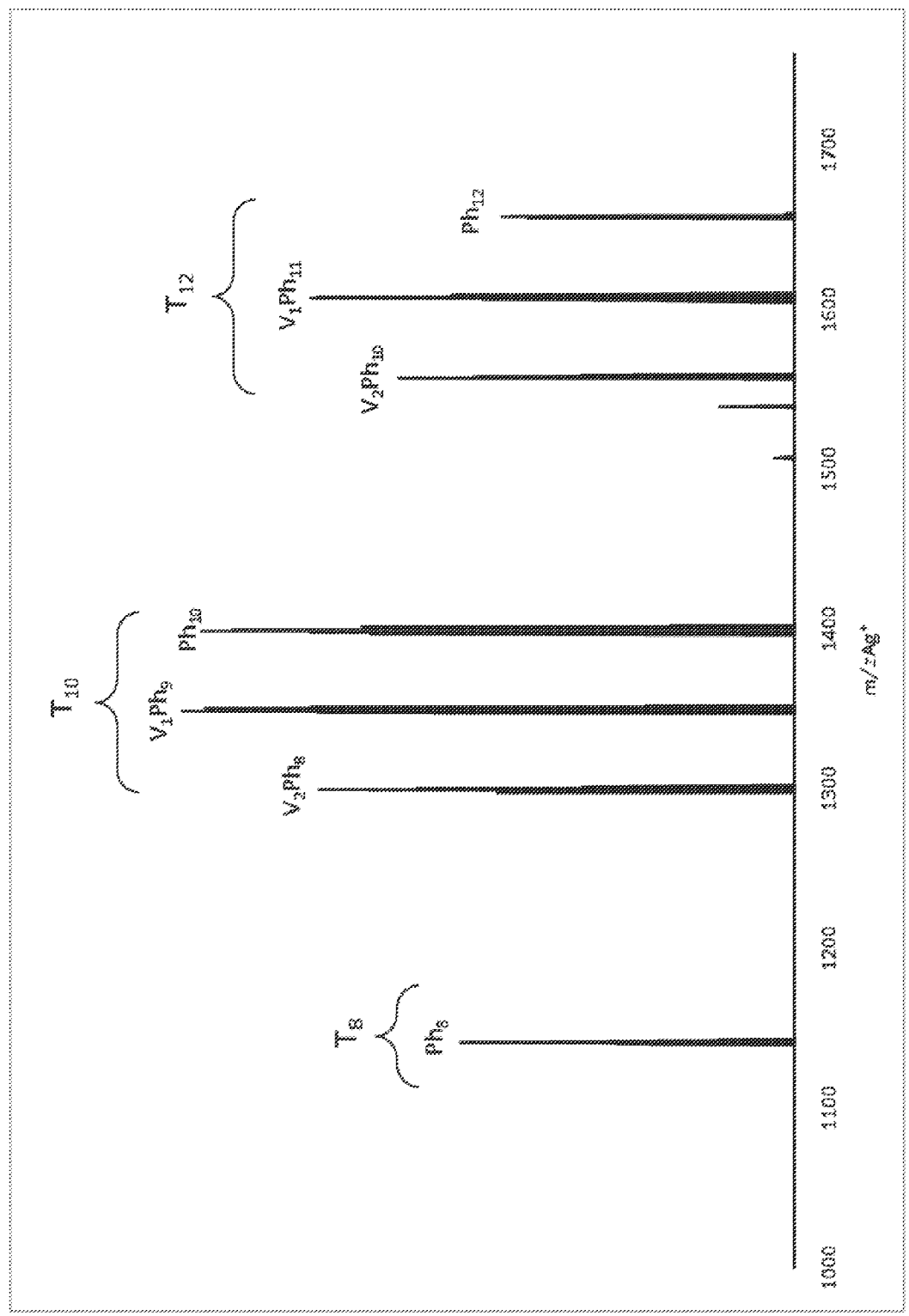

FIG. 36 shows a MALDI-TOF spectrum of 10:1 PPS:PVS reaction with TBAF (RT/48 h).

Figure 37:
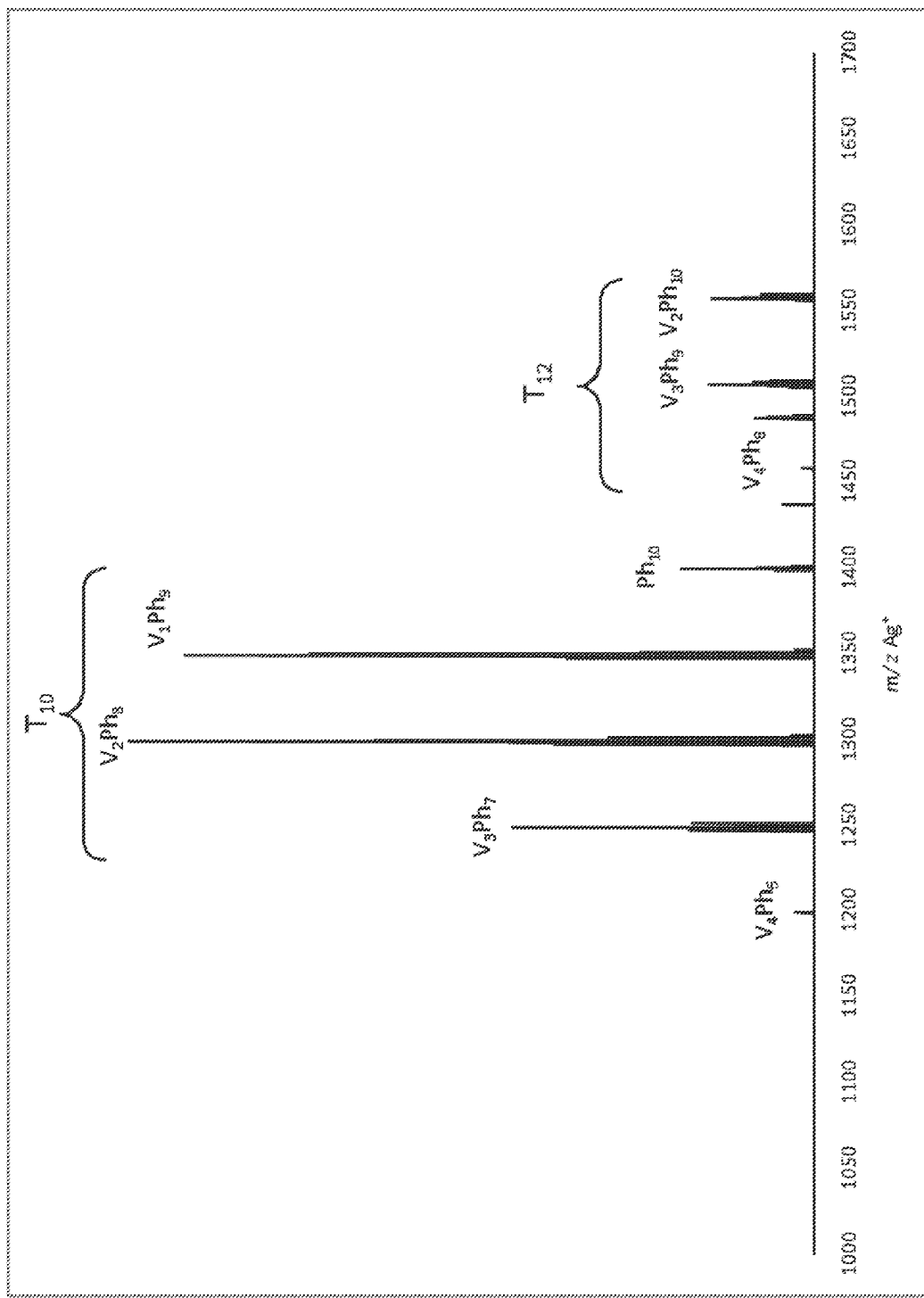

FIG. 37 shows a MALDI-TOF spectrum of 4.4:1 PPS:PVS reaction with TBAF (RT/48 h) after purification by column chromatography.

Figure 38:
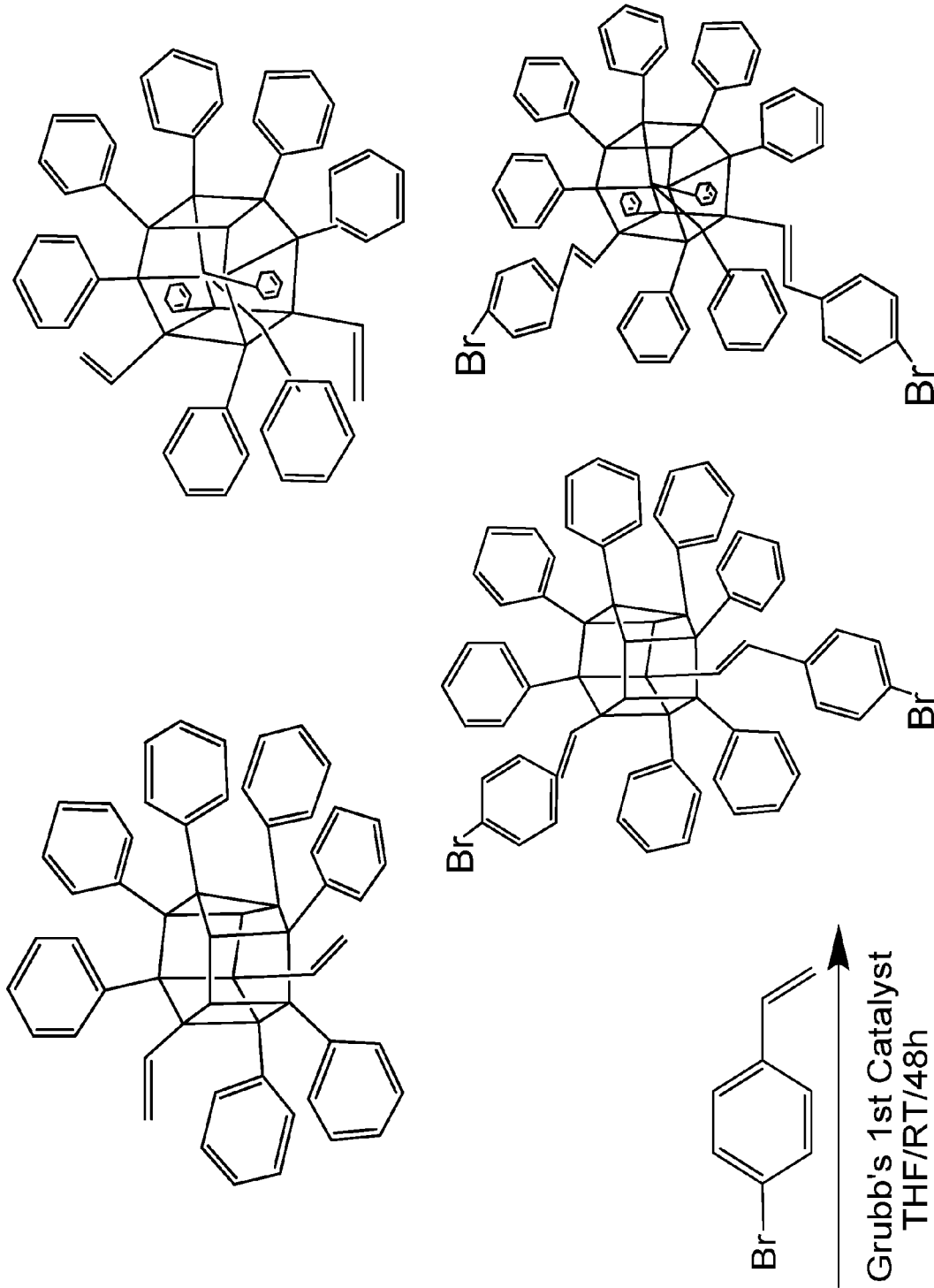

FIG. 38 shows an alkene metathesis of vinyl$_2$Ph$_x$ (x=8, 10) T$_{10}$ and T$_{12}$ SQs with 4-bromostyrene.

Figure 39:
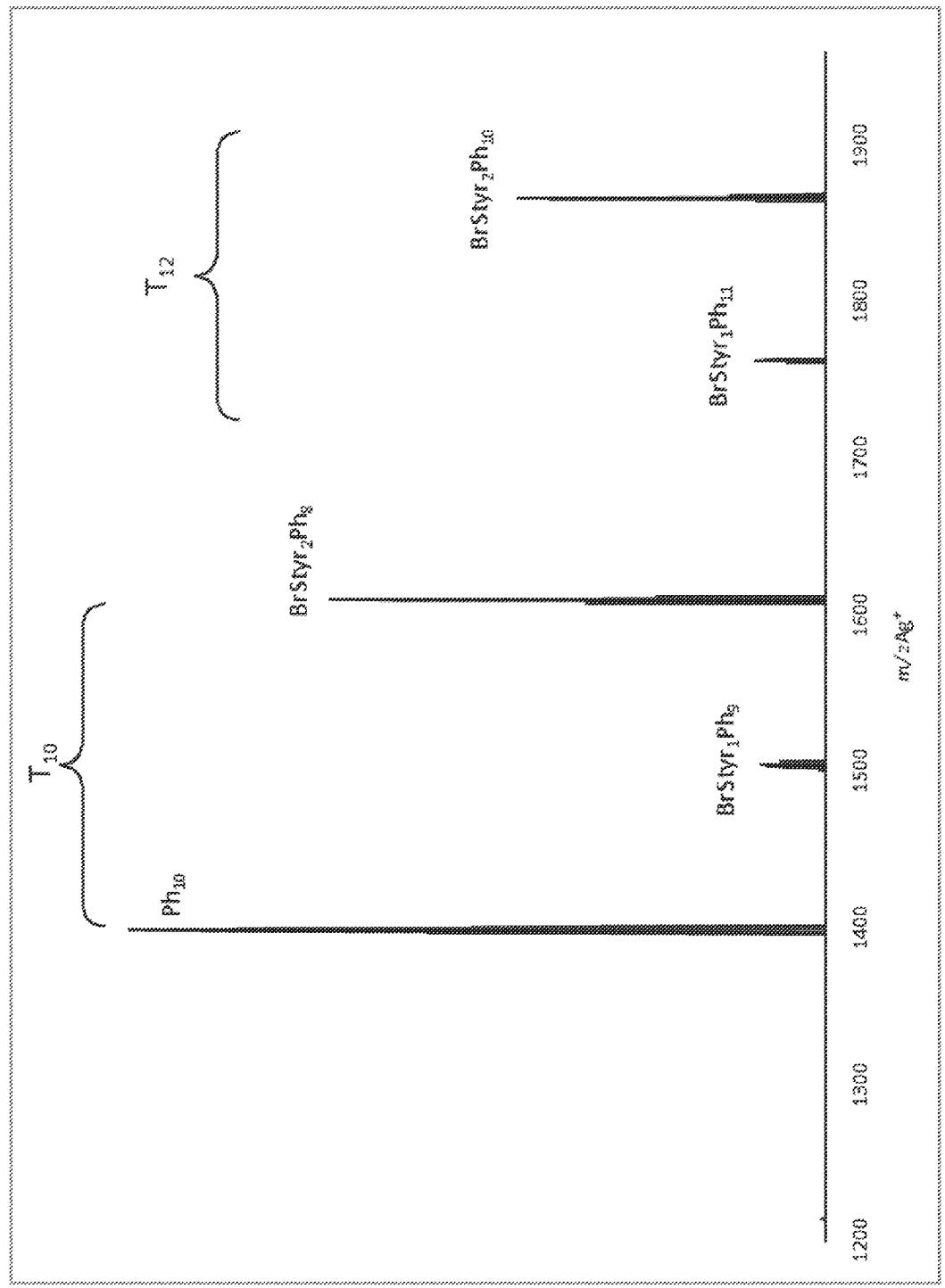

FIG. 39 shows a MALDI-TOF spectrum of metathesis reaction of vinyl$_2$Ph$_x$ (x=8, 10) T$_{10}$ and T$_{12}$ silsesquioxanes and 4-bromostyrene after column chromatography.

Figure 40:
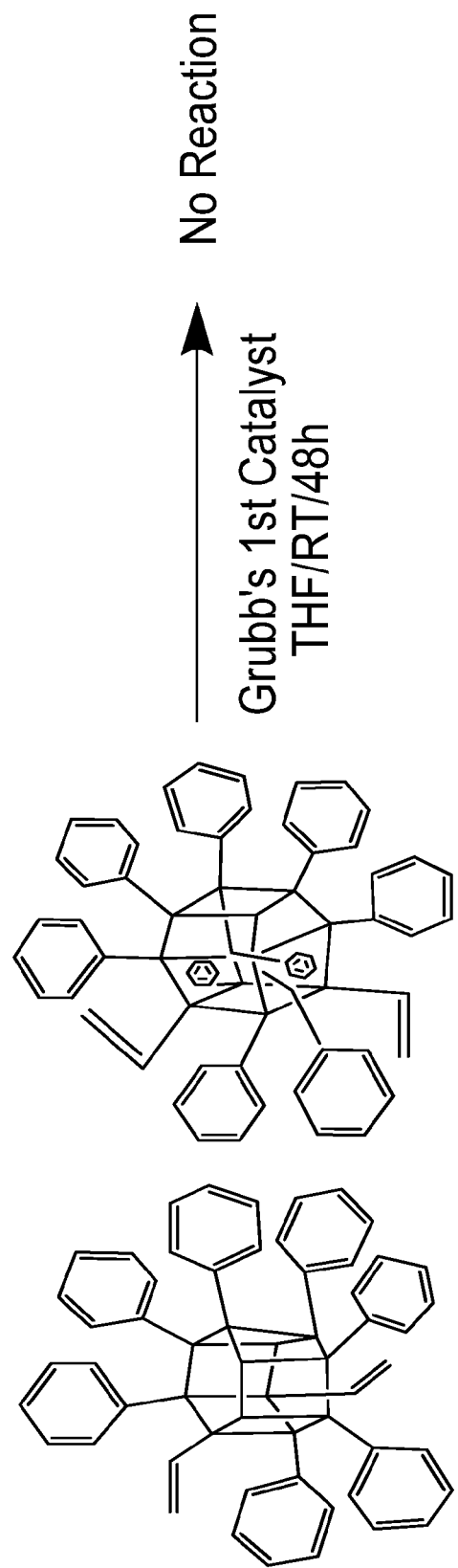

FIG. 40 shows an attempted olefin self-metathesis of vinyl$_2$Ph$_x$ (x=8, 10) T$_{10}$ and T$_{12}$ SQs.

Figure 41:
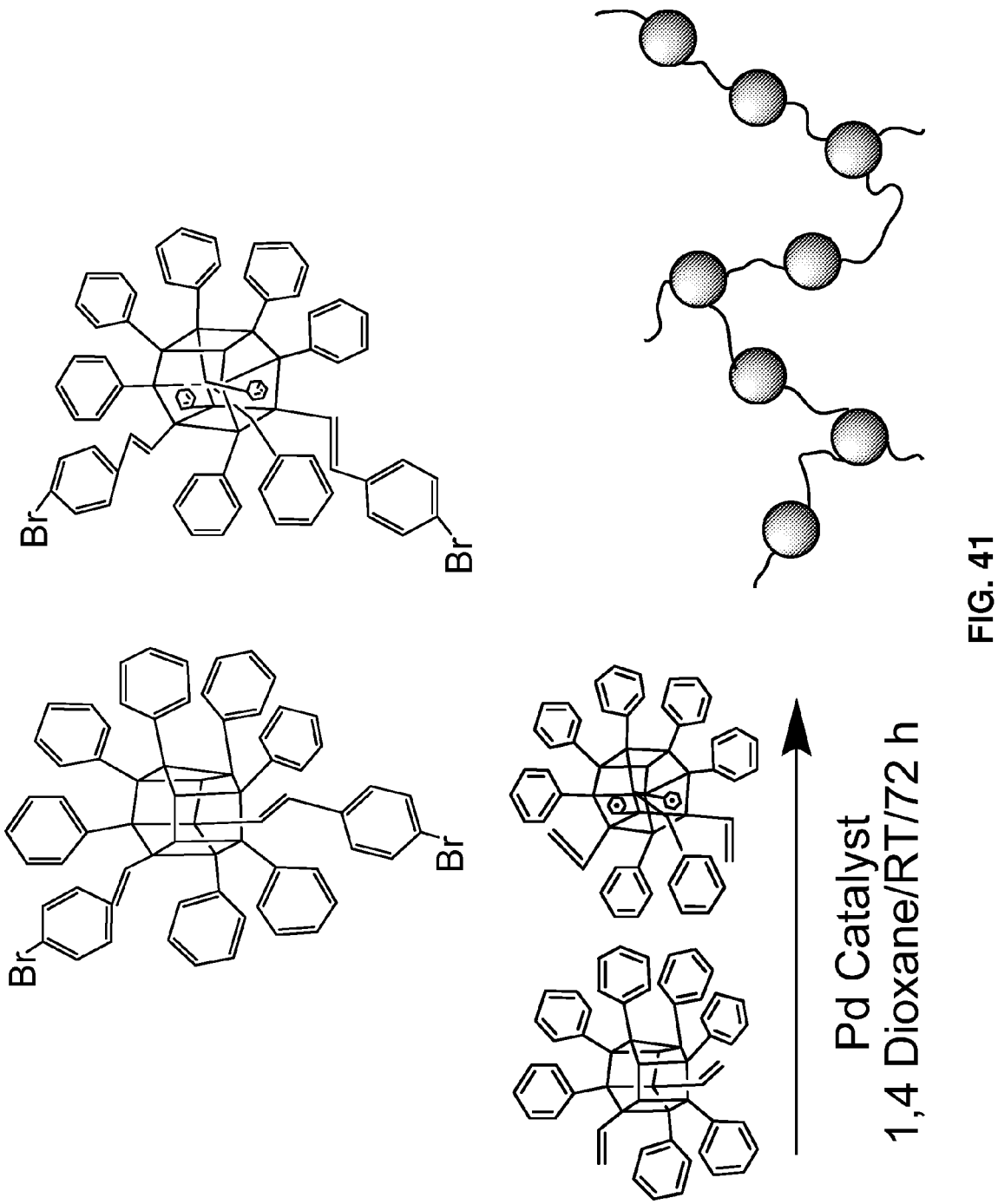

FIG. 41 shows a Heck coupling vinyl$_2$Ph$_x$ T$_{10}$/T$_{12}$ SQs with BrStyr$_2$Ph$_x$ T10/T$_{12}$ SQs (x=8, 10).

Figure 42:
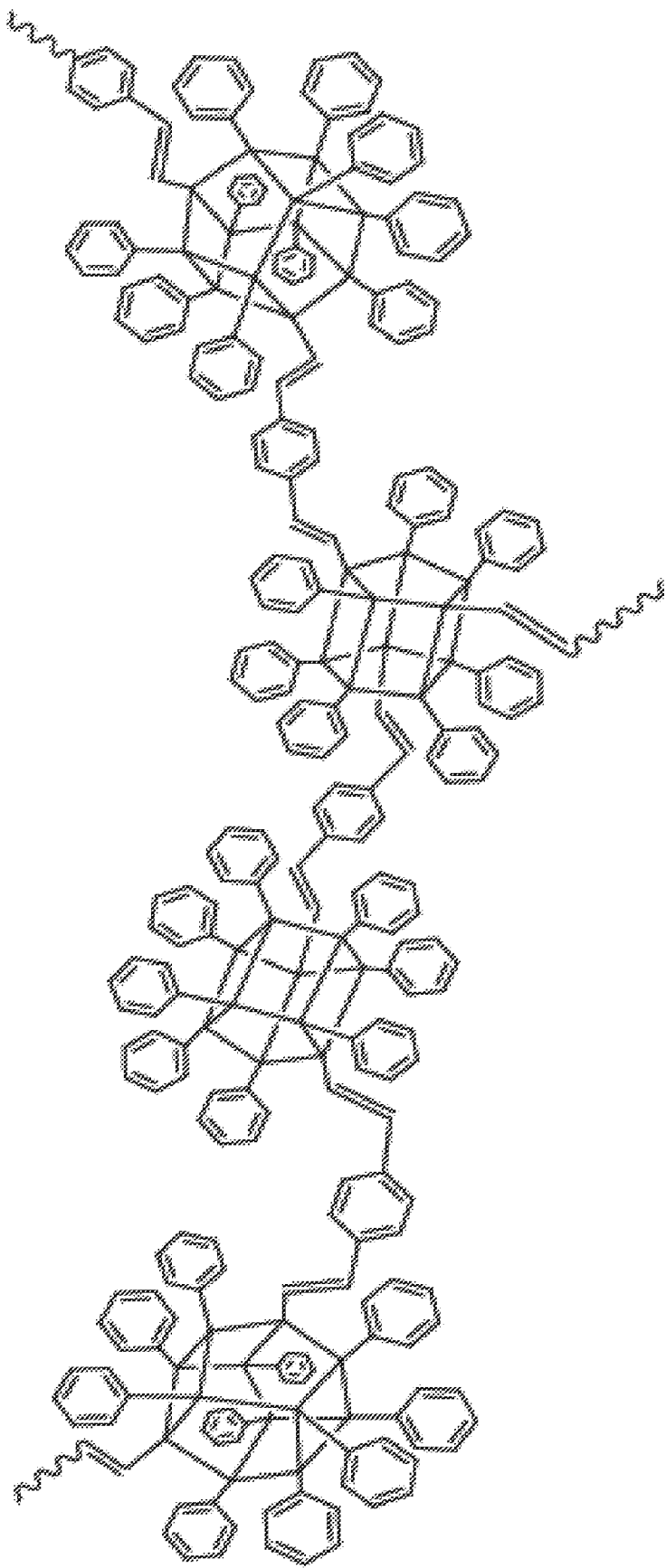

FIG. 42 shows a general concept of BoC structure of Heck coupling product.

Figure 43:
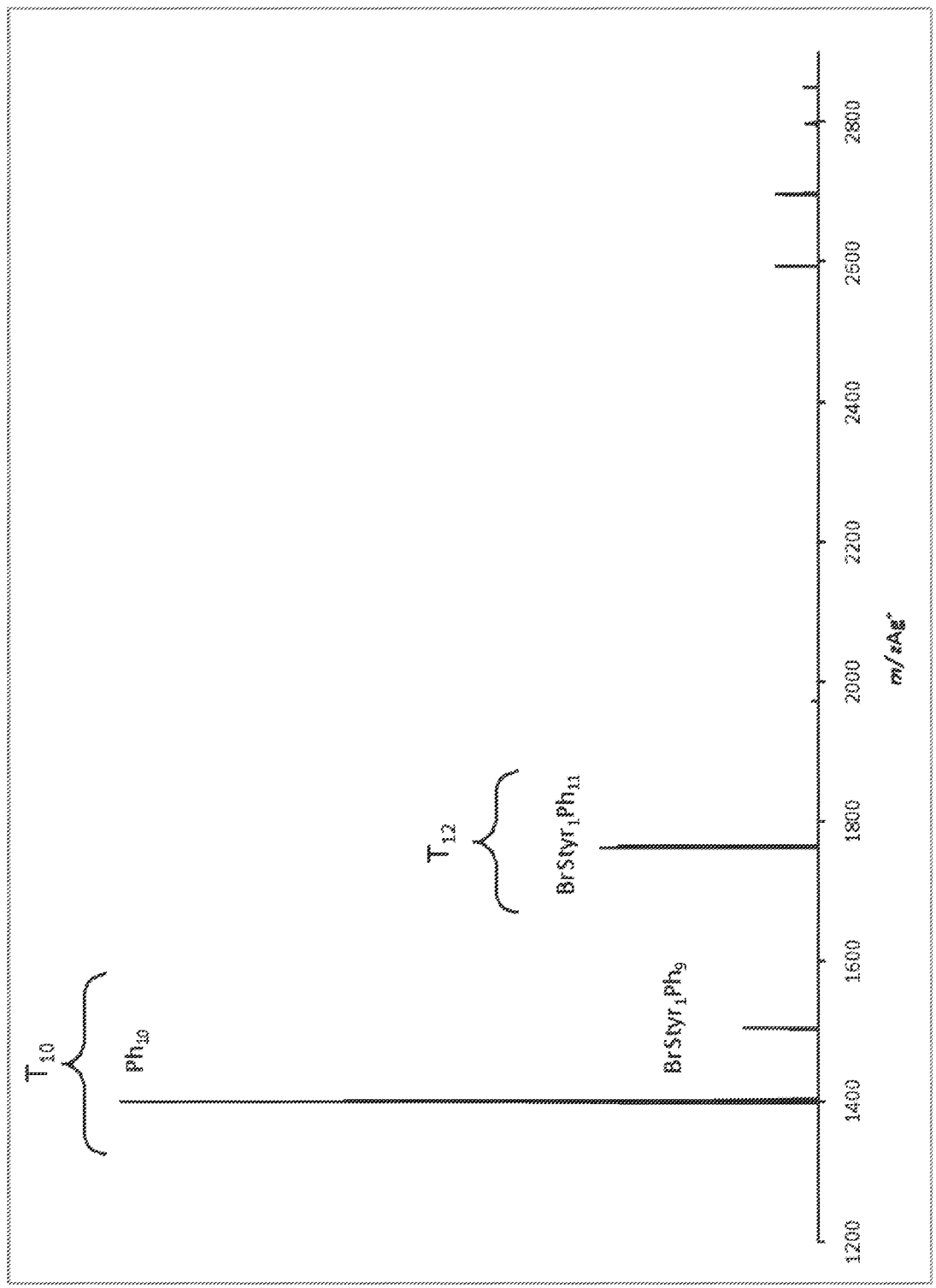

FIG. 43 shows a MALDI-TOF spectrum after Heck reaction of BrStyr$_2$Ph$_x$ (x=8, 10) T$_{10}$ and T$_{12}$ silsesquioxanes and vinyl$_2$Ph$_x$ (x=8, 10) T$_{10}$ and T$_{12}$ silsesquioxanes.

Figure 44:
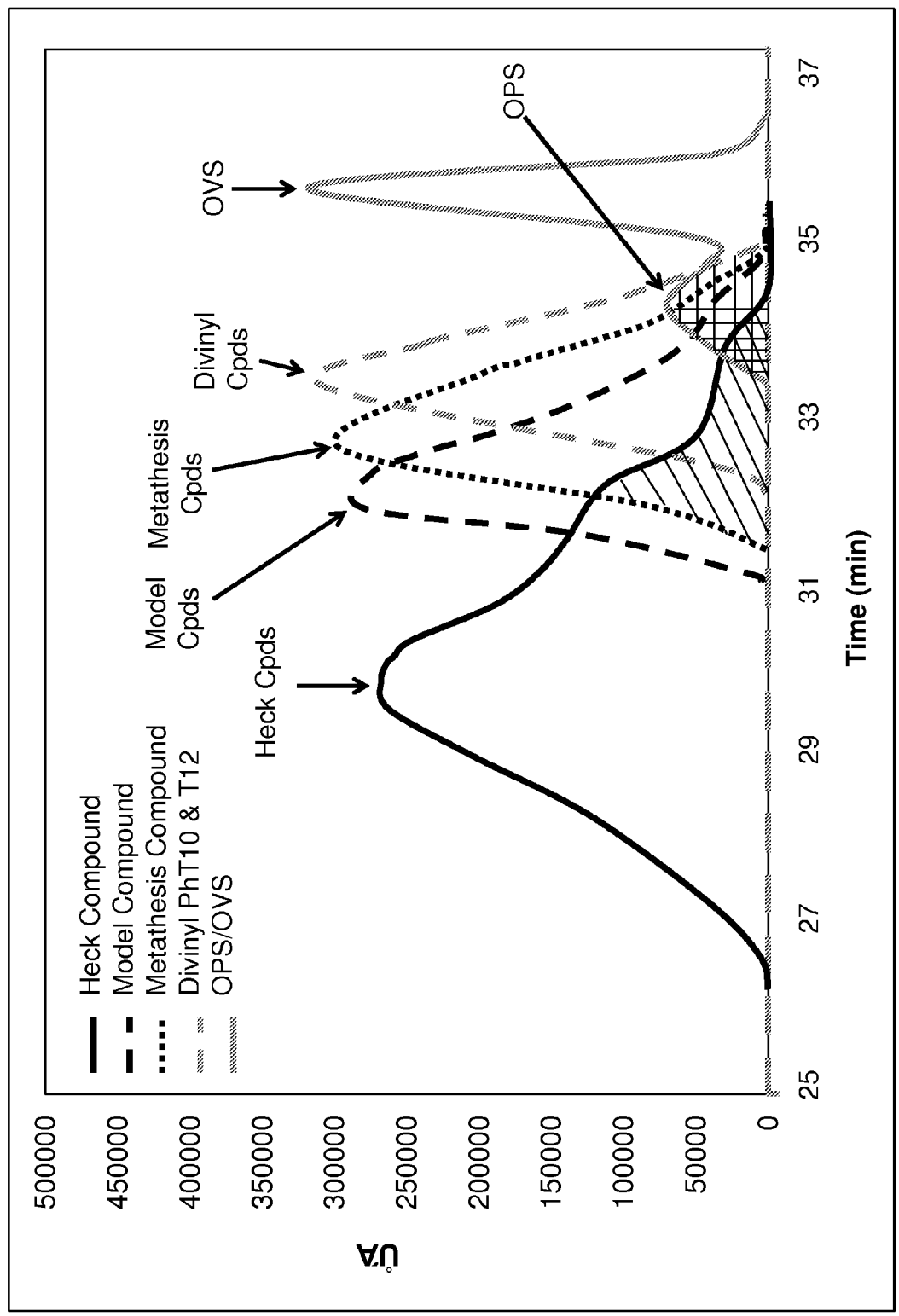

FIG. 44 shows a GPC trace of Heck, model and metathesis compounds, vinyl$_2$Ph$_8$ T$_{10}$ and vinyl$_2$Ph$_{10}$ T$_{12}$, and OPS/OVS (for comparison). Shaded areas represent amounts of unreacted starting materials in divinyl, metathesis and Heck compounds (~5%, ~4%, and ~10%, respectively).

Figure 45:
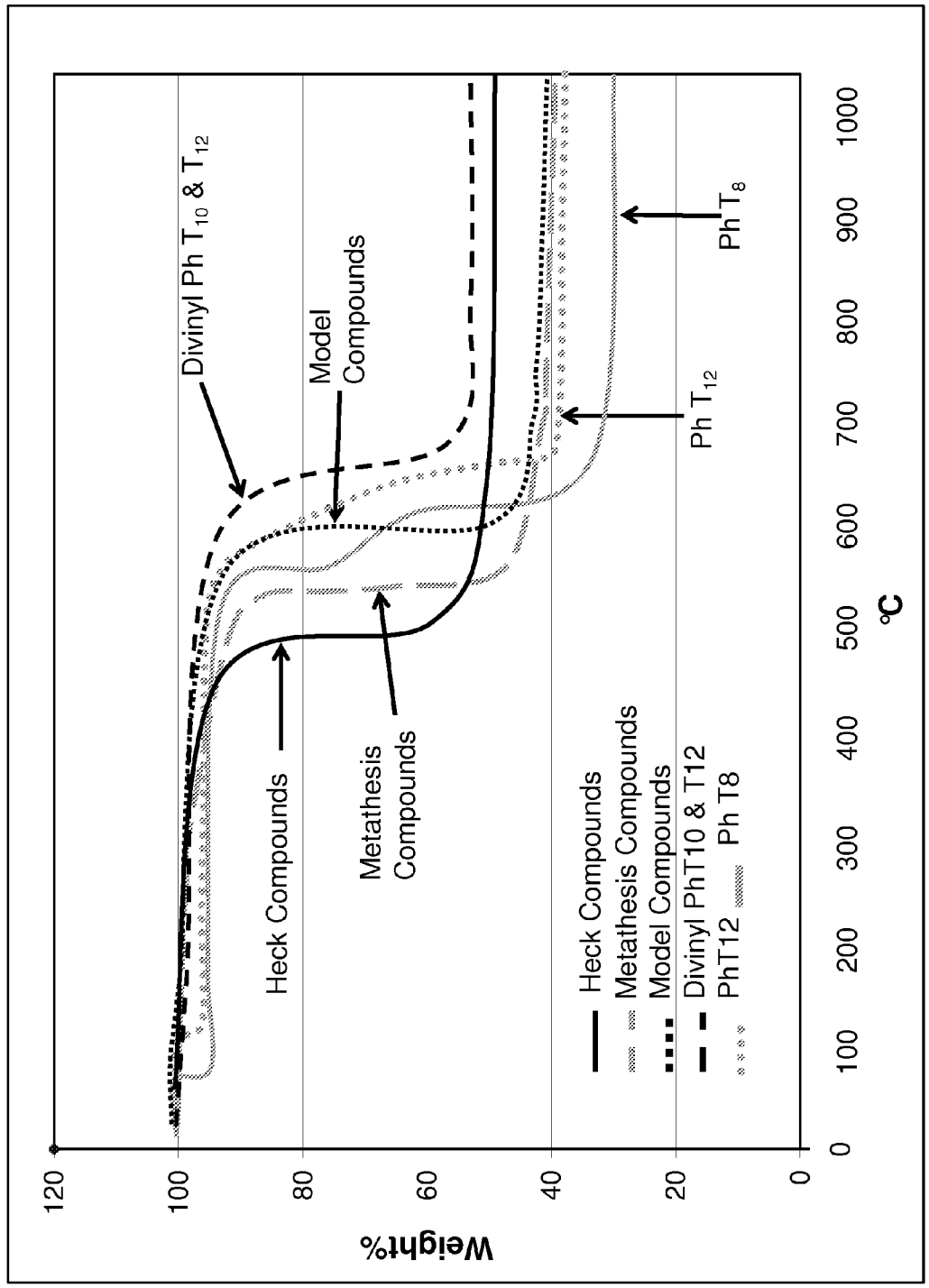

FIG. 45 shows a TGA of Heck, model and metathesis compounds, vinyl$_2$Ph$_8$ T$_{10}$ and vinyl$_2$Ph$_{10}$ T$_{12}$ SQs (air, 10° C./min to 1000° C.). Ph T$_8$ and Ph T$_{12}$ are included for comparison.

Figure 46:
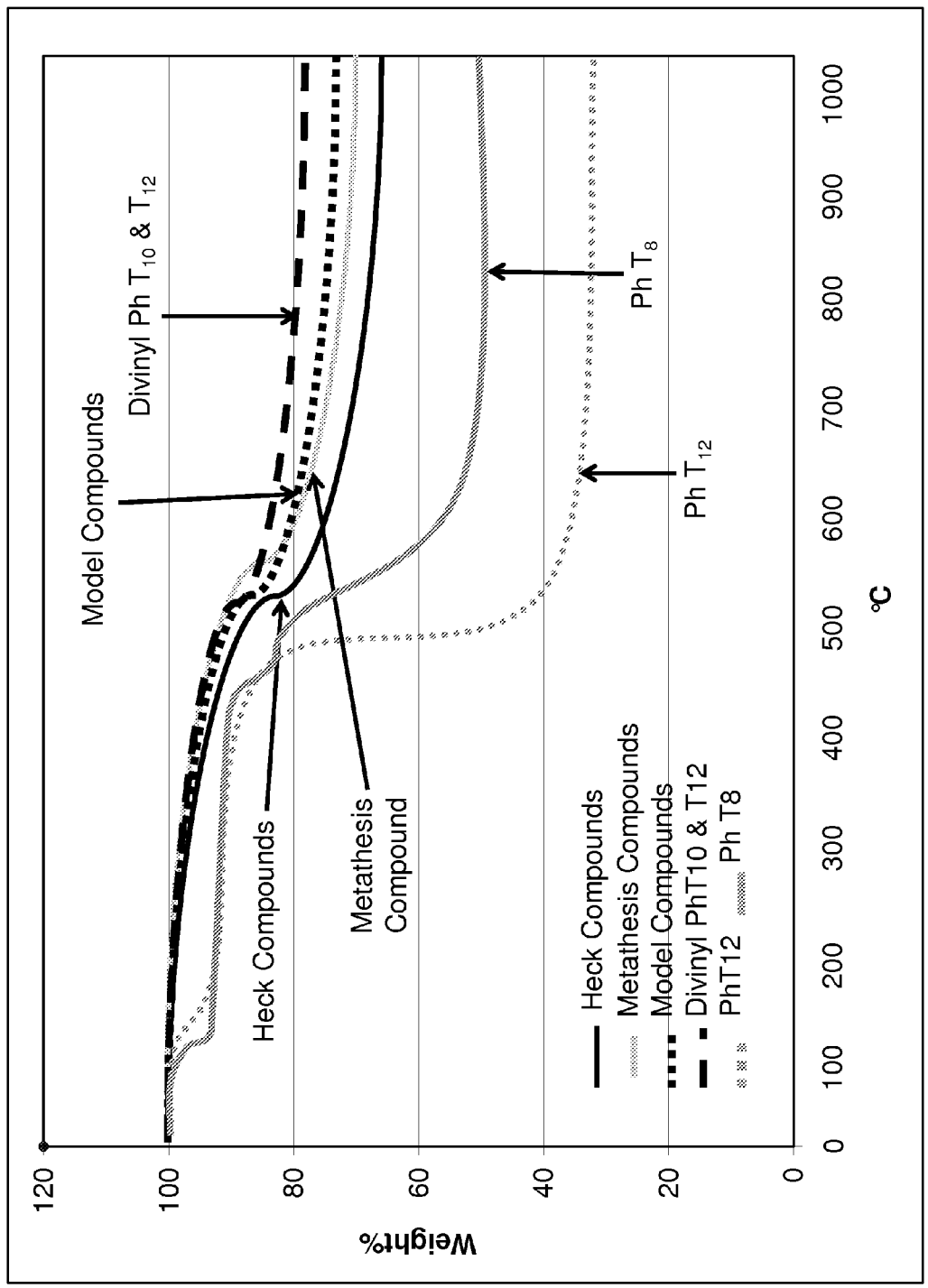

FIG. 46 shows a TGA of Heck, model and metathesis compounds, vinyl$_2$Ph$_8$ T$_{10}$ and vinyl$_2$Ph$_{10}$ T$_{12}$ SQs (N$_2$, 10° C./min to 1000° C.). Ph T$_8$ and Ph T$_{12}$ are included for comparison.

DETAILED DESCRIPTION

Fluoride-mediated rearrangement reactions of silsesquioxanes are described. The reactions allow direct access to a potential new class of multifunctional cage compounds, offering unique and viable possibilities to build ordered, nanometer structures through simple control of the beginning materials ratio. The F- rearrangement of polymeric phenyl- and vinylsilsesquioxanes, in particular, is exciting because the reactants are "useless" polymeric by-products in common silsesquioxane syntheses and lead opportunely to product mixtures of discreet polyhedral silsesquioxane cages. Silsesquioxane cages with ~2 reactive functionalities may be further modified and tailored to synthesize high molecular weight linear polymers with silsesquioxanes directly incorporated along the chain backbone. These polymers could offer unique and tunable properties, such as high thermal stability, improved mechanical properties, liquid crystalline behavior, etc. We illustrate the potential of these compounds here in the synthesis of novel, fluorescent "beads on a chain" oligomers with high solubility and thermal stability (up to 325° C.). The highly red-shifted (≈120 nm) luminescence behavior of these compounds is unique in its own right, as it suggests extensive electron delocalization and may involve conjugation through the silsesquioxane cores. The chemistries explored here are representative of many diverse structures of varying complexity that can be created using these simple cages as molecular scaffolds.

In one aspect, the present technology provides simplified methods for the catalytic polymerization and depolymerization of a wide variety of polysilsesquioxanes [RSiO$_{1.5}$]$_x$ where x=8, 10, 12, 14 or polymer. The present methods are also provided to catalytically and selectively interconvert between the above structures at near ambient temperatures to introduce novel functionality in very specific ways to create families of nanobuilding blocks and related nanocomposite materials that offer highly tailorable properties coupled with exceptional ease of processing. The range of properties potentially accessible includes materials with excellent mechanical properties coupled with high thermal stability to materials with 3-D conducting properties potentially of use for molecular electronics and photonics.

It has now been discovered that catalytic amounts of fluoride ion can catalyze several useful reactions that result in the conversion of various forms of polysilsesquioxanes into one another. In various embodiments, the fluoride ion catalyzes the depolymerization of polymeric silsesquioxanes; catalyzes the polymerization of T$_8$, T$_{10}$, T$_{12}$, and T$_{14}$ cage compounds into the polymeric silsesquioxanes; catalyzes the exchange of R groups among $T_8$, $T_{10}$, $T_{12}$, and $T_{14}$ cage compounds; and so on. Various aspects of the invention are based on the further discovery that unwanted side reactions and products can be avoided by providing a quenching agent for the catalytic fluoride ion at suitable times during the synthetic schemes. Thus, for example, removal of fluoride ion after a depolymerization reaction is carried out allows the isolation of the resulting $T_8$, $T_{10}$, $T_{12}$, and/or $T_{14}$ cage compounds without reversion to the polymeric product as a result of a recovery by solvent concentration. Further aspects of the invention will now be described.

In one embodiment, a method for making a silsesquioxane cage compound by depolymerization of a polysilsesquioxane is provided. The method comprises reacting at least one polysilsesquioxane with a catalytic amount of an organic cationic fluoride at a temperature ranging from about −50° C. to about 120° C. in an organic solvent, thereby forming a liquid reaction mixture. After reaction, the method involves adding a quenching agent to the liquid reaction mixture to remove the fluoride ion from the reaction mixture and then isolating the silsesquioxane cage compound or compounds from the reaction mixture, for example by precipitation or by solvent removal.

In another embodiment, a method is provided for synthesizing a random structure polysilsesquioxane T resin from a single or mixed polymeric silsesquioxane cage compound. In one aspect, this involves the reverse reaction from the depolymerization reaction described above (as an aside, this is the reason fluoride ion catalyst is removed in situations where the polymerization or re-polymerization is undesirable). The method of synthesis involves combining one or more silsesquioxane cage compounds with an organic solvent and a catalytic amount of a source of organic fluoride ion, thereby forming a first mixture. The method further involves mixing the first mixture for a time and at a temperature suitable to make a reaction mixture comprising the T resin, and finally isolating the T resin polymer by removal of the organic solvent. In this and other embodiments, the terms "T resin" and "random structure polysilsesquioxane" are intended to refer to the same polymeric product.

In another embodiment, the invention provides a process for interchanging R groups on a mixture of $T_8$, $T_{10}$, $T_{12}$, or $T_{14}$ silsesquioxane mixed cage compounds. The reaction product (i.e. the silsesquioxane mixed cage compounds) is represented by the structure $[R^2{}_xR^1{}_{n-x}SiO_{1.5}]_n$ wherein n is 8, 10, 12, or 14, x is 1-13, R is a first organic group, and $R^2$ is a second organic group. The process of interchanging or interconversion involves first combining a catalytic amount of organic fluoride ion with a mixture of starting cage structures $[R^2{}_nSiO_{1.5}]_n$ and $[R^1{}_nSiO_{1.5}]_n$ to make a first mixture. The mixture of starting cage compounds is reacted in the presence of fluoride ion to form a reaction mixture comprising the mixed cage compounds. The relative proportion of the groups $R^2$ and $R^1$ in the reaction product is determined by the value of x and n-x. In various embodiments, the process involves providing $[R^2{}_nSiO_{1.5}]_n$ and $[R^1{}_nSiO_{1.5}]_n$ in the first mixture in a molar ratio such that x is predominantly 1, 2, or 3 in the reaction product. In some embodiments, the molar ratios are adjusted such that x is 2 in a reaction product.

In another embodiment, the invention provides a method of making a functionalized colloidal silica particle from a T resin and a silicon containing compound. First, a T resin having at least one functional group is combined with water and in addition with a silicon compound $(SiX)_4$ and a catalytic amount of an organic fluoride ion in an organic solvent to form a first mixture, where X is independently selected from halide, hydroxyl, and alkoxy. The first mixture is then mixed at an exemplary temperature of 10° C.-50° C. to form a reaction mixture. A quenching agent is then added to the reaction mixture to remove fluoride. Finally, the functionalized colloidal silica is then isolated from the reaction mixture. In a preferred embodiment, the silicon containing compound is $Si(OEt)_4$.

In various embodiments, the groups R, $R^1$, and $R^2$ take on the values of "functional" groups or "inert" groups as required for the contemplated application. Examples of reactive functional groups include, without limitation, olefins (including acrylate esters), mercaptans, epoxides, alcohols, amines, carboxylates, and so on. In various embodiments, the groups are selected from hydrocarbon groups including alkyl, alkenyl, alkynyl, aryl, alkenylaryl, alkylaryl, arylalkyl, and arylalkenyl. An exemplary alkenyl group is vinyl, while an exemplary aryl group is phenyl. These and other are further discussed and exemplified below Advantageously, catalytic reaction with fluoride ion as described herein can be carried out at mild temperatures, including ambient temperatures or room temperature. In various embodiments, the temperature of reaction ranges from −50° C. to 120° C. In other embodiments, the temperature of reaction is 0-100° C., 10-50° C., 20-30° C., and so on. In most cases, the reaction proceeds at a satisfactory rate even at room temperature, such as 20° C. or 25° C.

The reaction is completed in a matter of minutes or hours, depending upon other reaction conditions such as temperature, concentration of the reagents, steric factors involved in the reaction, and so on. Normally, reaction has proceeded sufficiently toward completion when mixed for a period of about 60 min to about 48 hours at temperatures ranging from −50° C. to 120° C. Exemplary times and temperatures of reaction are illustrated in the working examples.

The reactions proceed in the presence of fluoride ion, which acts as a catalyst. Advantageously, the fluoride ion can be provided in catalytic amounts, that is to say in an amount less than the stoichiometric equivalent of the silsesquioxane undergoing reaction. The level of catalyst is described herein in terms of mole % fluoride based on moles of silsesquioxane. The moles of fluoride in the reaction are calculated in the standard way by considering the molecular weight of the organic fluoride ion containing compound to determine the number of moles of fluoride. The moles of silsesquioxane in turn are calculated from the equivalent weight of the group [R $SiO_{1.5}$] that is the basic building block of the polysilsesquioxanes described herein, and weighting the calculation as needed when the silsesquioxane in question has a number of different R groups. Given that means for calculating the mole % fluoride, a catalytic amount of fluoride is any amount less than 100 mole %. In particular, a suitable catalytic amount is any amount less than 50 mole %, for example 0.1 to 50% by weight. Advantageously, the reaction can be run with considerably less than 50 mole % fluoride, such as 0.1-10 mole %, 0.1-5 mole %, 0.1-2 mole%, 0.2-5 mole %, 0.2-2 mole %, 0.5-5 mole %, 0.5-2 mole %, and so on. Catalytic fluoride levels of 1 mole % have been found satisfactory. Suitable levels of catalysts are further illustrated in the working examples.

The fluoride ion is preferably added in the form of an organic fluoride ion containing compound. In general, any fluoride containing compound can be used as long as it is soluble in the reaction medium, which normally includes an organic solvent. A preferred catalyst illustrated in the working examples herein is the family of tetraalkylammonium fluoride such as tetrabutylammonium fluoride, tetrapropylammonium fluoride, tetraethylammonium fluoride, and tetramethylammonium fluoride. These and other organic fluorides can be used in the methods described herein as a source of organic fluoride ion.

As described herein, a so-called quenching agent is added to the reaction mixture at certain times. The quenching agent is one that will react in some way with the fluoride ion to render it no longer available for reaction. In this way, the catalytic effect of fluoride ion can be nullified at certain points in the reaction to avoid catalysis or promotion of unwanted side reactions. In various embodiments, fluoride ion is removed from a reaction mixture containing $T_8$, $T_{10}$, $T_{12}$, and/or $T_{14}$ cage compounds to prevent their re-polymerization upon workup and isolation.

In a preferred embodiment, the quenching agent is one that will react with the fluoride ion to precipitate it from solution or tie it up in some way to eliminate its availability for further catalytic reaction. In a preferred embodiment, the catalytic fluoride ion is quenched by adding an inorganic salt that forms in insoluble fluoride species that precipitates as a solid from the reaction mixture. Calcium salts are suitable for this purpose. Calcium chloride is a preferred quenching agent for its availability and low cost. Thus, adding calcium chloride to a reaction mixture to quench the fluoride ion involves precipitation of calcium fluoride. Similarly, chloride reacts with tetrabutylammonium fluoride to form insoluble or unreactive tetrabutylammonium chloride.

Suitable solvents for the reaction include those that dissolve all of the reactants and provide the desired reaction products. As is typical of synthesis in general, it may be necessary in certain situations to vary the solvent system or use other solvents in order to get certain desired reactions to go. Suitable solvent systems are illustrated in the working examples.

PolyphenylSQ (PPS) and polyvinylSQ (PVS) are suitable precursors in fluoride-mediated rearrangement reactions, as they provide access to functionalized SQ cages originating from generally "useless" polymeric starting materials. PPS is a by-product in the synthesis of OPS, which is formed in 5-20% yield from the 60 h reaction of phenyltriethoxysilane, 7.5 wt % KOH, and 10 wt % $H_2O$ in refluxing toluene. It has the general formula $(C_6H_5SiO_{1.5})_n$, and is reported to contain a mixture of linear chain, open-caged, and/or ladder-like structures. In these studies, "n" is about 15 for PPS (determined by GPC analysis).

Similarly, PVS is formed as a by-product in the synthesis of OVS, attained from the hydrolysis of vinyltriethoxysilane in ethanol/H2O solution. PVS is formed as a methanol-soluble byproduct in 60-70% yields. While the structure of PVS has not yet been studied in detail, it has the fully condensed general formula $(C_2H_3SiO_{1.5})_n$. In these studies, "n" is about 16 for PVS (determined by GPC analysis).

In various embodiments, mixed cage silsesquioxanes are produced by fluoride rearrangement reactions carried out on a mixture of polysilsesquioxane precursors. Each precursor is characterized by its R group in the empirical formula $[R SiO_{1.5}]_n$. The R groups of the precursors wind up in the reaction products in a ratio that depends on a variety of reaction conditions. For any particular combination of R groups $R^1$ and $R^2$ in precursors $[R^1SiO_{1.5}]_n$ and $[R^2SiO_{1.5}]_n$, the relative proportion of $R^1$ and $R^2$ in the resulting $T_8$, $T_{10}$, or $T_{12}$ (or $T_{14}$) cages can be arrived at by varying the proportion of the precursors and observing the distribution of groups $R^1$ and $R^2$ in the cage products. The relative proportion in the products can be deduced from mass spec, NMR, molecular weight, or other measurements.

In a preferred embodiment, the R groups of the precursors and the relative reaction ratios of the precursors are selected so as to give reaction products with a high fraction of cage compounds having 2 of an R group that carries a reactive functional group. The two reactive functional groups then provide a divalent monomer that can be incorporated into other polymers by copolymerization. Examples of reactive functional groups include, without limitation, olefins (including acrylate esters), mercaptans, epoxides, alcohols, amines, carboxylates, and so on. In various embodiments, the reactive functional groups of the cage compounds as synthesized can be converted to other useful functional groups as desired by known synthetic methods. This aspect is illustrated by the olefin metathesis, and Heck coupling elaboration of olefin functional groups described herein.

In a specific illustrative embodiment, in efforts to synthesize cages having ~2 phenyl groups (with vinyl groups as the remaining moieties), a 10:1 mole ratio of PVS:PPS is reacted with 1 mol % TBAF in THF at room temperature for about 48 hours. A minimum amount of TBAF is used to reduce the chance of residual F– catalyzing unwanted side products during workup. An 8-10 fold molar excess (relative to TBAF) of $CaCl_2$ is used to trap $F^-$ after completion of the reaction. $Ca^{+2}$ reacts with $F^-$ to form the insoluble $CaF_2$ salt, allowing for easy removal of fluoride ion from the products. Similarly, $Cl^-$ reacts to form insoluble or unreactive tetrabutylammonium chloride. The successful trapping of fluoride ion by $CaCl_2$ workup is confirmed by an absence of peaks in the $^{19}F$ NMR spectrum. The products are non-crystalline as XRD powder patterns exhibited only amorphous scattering.

The MALDI-TOF spectrum of the products of a 10:1 PVS:PPS reaction is shown in FIG. 35 and the most common isotopes are listed in Table 1. Small discrepancies (<1 Da) between "found" and "calculated" values listed in Table 1 may be due to ionization potential differences in the experimental situation or possibly errors in calibration. The FIG. 35 MALDI spectrum shows that the reaction does not give single cube products as anticipated, but rather a mixture of $T_{10}$ and $T_{12}$ cages with the dominant ionizable species being the unsubstituted deca- and dodecavinylsilsesquioxanes and monophenyl compounds. While MALDI indicates the presence of the intended diphenyl $T_{10}$ and $T_{12}$ compounds, no $T_8$ cubes are observed under these reaction conditions, perhaps indicating a preferential, thermodynamically-controlled reaction pathway to $T_{10}$ and $T_{12}$ cages. Unlabeled peaks in FIG. 35 correspond to fragments generated by the MALDI laser, mainly from loss of 1-2 vinyl (—CH=$CH_2$) groups from the $T_{10}$ cages.

The absolute quantities of $T_8$, $T_{10}$, and $T_{12}$ in the product mixture cannot be determined by MALDI alone because the distribution patterns are not perfectly quantitative. It is well-known that the peak heights in MALDI-TOF MS correspond to the ionization efficiencies of the species and are not necessarily representative of the amounts of each in the sample. According to experience, the SQ monomers are readily ionizable and so the MALDI peak heights provide a relative (qualitative) measure of the amounts of each species in the monomeric sample.

TABLE 1

MALDI-TOF data ($Ag^+$ Adduct) for 10:1 PVS:PPS reaction with TBAF

| Most Common Isotope | Found (Da) | Calculated (Da) | Relative Peak Intensity (%) |
|---|---|---|---|
| $(CH_2=CH)_{10}(SiO_{1.5})_{10}$ | 898.8 | 899.2 | 77 |
| $(CH_2=CH)_9(C_6H_5)_1(SiO_{1.5})_{10}$ | 948.8 | 949.2 | 73 |
| $(CH_2=CH)8(C6H5)2(SiO1.5)10$ | 998.8 | 999.3 | 28 |

TABLE 1-continued

MALDI-TOF data (Ag+ Adduct) for
10:1 PVS:PPS reaction with TBAF

| Most Common Isotope | Found (Da) | Calculated (Da) | Relative Peak Intensity (%) |
|---|---|---|---|
| $(CH_2=CH)12(SiO1.5)12$ | 1056.9 | 1057.4 | 100 |
| $(CH_2=CH)_{11}(C_6H_5)_1(SiO_{1.5})_{12}$ | 1106.9 | 1107.5 | 97 |
| $(CH_2=CH)_{10}(C_6H_5)_2(SiO_{1.5})_{12}$ | 1156.9 | 1157.5 | 49 |

Synthesis Vinyl$_2$Ph$_x$ (x=8, 10) T$_{10}$ and T$_{12}$ Silsesquioxanes

In another experiment, a 10:1 mole ratio of PPS:PVS is reacted with 1 mol % TBAF in THF (RT/48 h). The results are analogous to the 10:1 PVS:PPS reaction, with monovinyl compounds being the major products according to MALDI-TOF MS (see FIG. 36 and Table 2). MALDI also detects the presence of T8 cube in addition to the T$_{10}$ and T12 species. The MALDI spectrum of FIG. 36 also shows the presence of OPS, decaphenyl- and dodecaphenylsilsesquioxane (DPS) species as by-products of the synthesis. Divinyl compounds of the T$_{10}$ and T$_{12}$ cages are also observed.

TABLE 2

MALDI-TOF data (Ag+ Adduct) for
10:1 PPS:PVS reaction with TBAF

| Most Common Isotope | Found (Da) | Calculated (Da) | Relative Peak Intensity (%) |
|---|---|---|---|
| $(C_6H5)_8(SiO_{1.5})_8$ | 1141.1 | 1141.4 | 60 |
| $(CH_2=CH)_2(C_6H_5)_8(SiO_{1.5})_{10}$ | 1299.2 | 1299.6 | 80 |
| $(CH_2=CH)_1(C_6H_5)_9(SiO_{1.5})_{10}$ | 1349.2 | 1349.7 | 100 |
| $(C_6H_5)_{10}(SiO_{1.5})_{10}$ | 1399.2 | 1399.8 | 897 |
| $(CH_2=CH)_2(C_6H_5)_{10}(SiO_{1.5})_{12}$ | 1557.2 | 1558.0 | 68 |
| $(CH_2=CH)_1(C6H5)_{11}(SiO_{1.5})_{12}$ | 1607.3 | 1608.1 | 81 |
| $(C_6H_5)_{12}(SiO_{1.5})_{12}$ | 1658.3 | 1658.1 | 55 |

Reaction of a 4.4:1 mole ratio of PPS:PVS with TBAF in THF gives predominantly the T$_{10}$ and T$_{12}$ divinyl compounds as shown by the MALDI spectrum in FIG. 37. Divinyl compounds are particularly important because further reaction of the two vinyl moieties can lead to BoC oligomers/polymers as explained below.

The 4.4:1 PPS:PVS reaction MALDI-TOF spectrum shows reaction products corresponding to Ag$^+$ adducts of T$_{10}$ and T$_{12}$ cages; see Table 3. A small amount of phenyl T$_8$ cube formed as a by-product and is easily removed by column chromatography for reasons discussed below.

MALDI indicates the presence of mono- and divinylphenyl T$_{10}$ and T$_{12}$ as well as small amounts of tri- and tetravinyl T$_{10}$ and T$_{12}$. The structures of the T$_{10}$ and T$_{12}$ products are supported by FTIR, $^1$H NMR, and $^{13}$C NMR data as listed below. XRD powder patterns exhibit only amorphous scattering.

The dominant ionizable species according to the MALDI-TOF spectrum of FIG. 37 is the vinyl$_2$Ph$_8$ T$_{10}$ species as anticipated. Separation (and thus quantification) of the cage species resulting from the reaction of 4.4:1 PPS:PVS by column chromatography is not trivial due to similarities in the chemical structures and properties (e.g. solubility, polarity, etc.) of the products.

TABLE 3

MALDI-TOF data (Ag$_+$ Adduct) for
4.4:1 PPS:PVS reaction with TBAF.

| Most Common Isotope | Found (Da) | Calculated (Da) | Relative Peak Intensity (%) |
|---|---|---|---|
| $(CH_2=CH)_4(C_6H_5)_6(SiO_{1.5})_{10}$ | 1199.1 | 1199.5 | 12 |
| $(CH_2=CH)_3(C_6H_5)_7(SiO_{1.5})_{10}$ | 1249.4 | 1249.6 | 49 |
| $(CH_2=CH)_2(C_6H_5)_8(SiO_{1.5})_{10}$ | 1299.8 | 1299.6 | 100 |
| $(CH_2=CH)_1(C_6H_5)_9(SiO_{1.5})_{10}$ | 1349.3 | 1349.7 | 93 |
| $(C_6H_5)_{10}(SiO_{1.5})_{10}$ | 1399.8 | 1399.8 | 27 |
| $(CH_2=CH)_4(C_6H_5)_8(SiO_{1.5})_{12}$ | 1458.0 | 1457.9 | 17 |
| $(CH_2=CH)_3(C_6H5)_9(SiO_{1.5})_{12}$ | 1507.8 | 1508.0 | 23 |
| $(CH_2=CH)_2(C_6H_5)10(SiO_{1.5})_{12}$ | 1557.9 | 1558.0 | 23 |

Examples of Synthesis of Polysiloxanes

Figure 8:
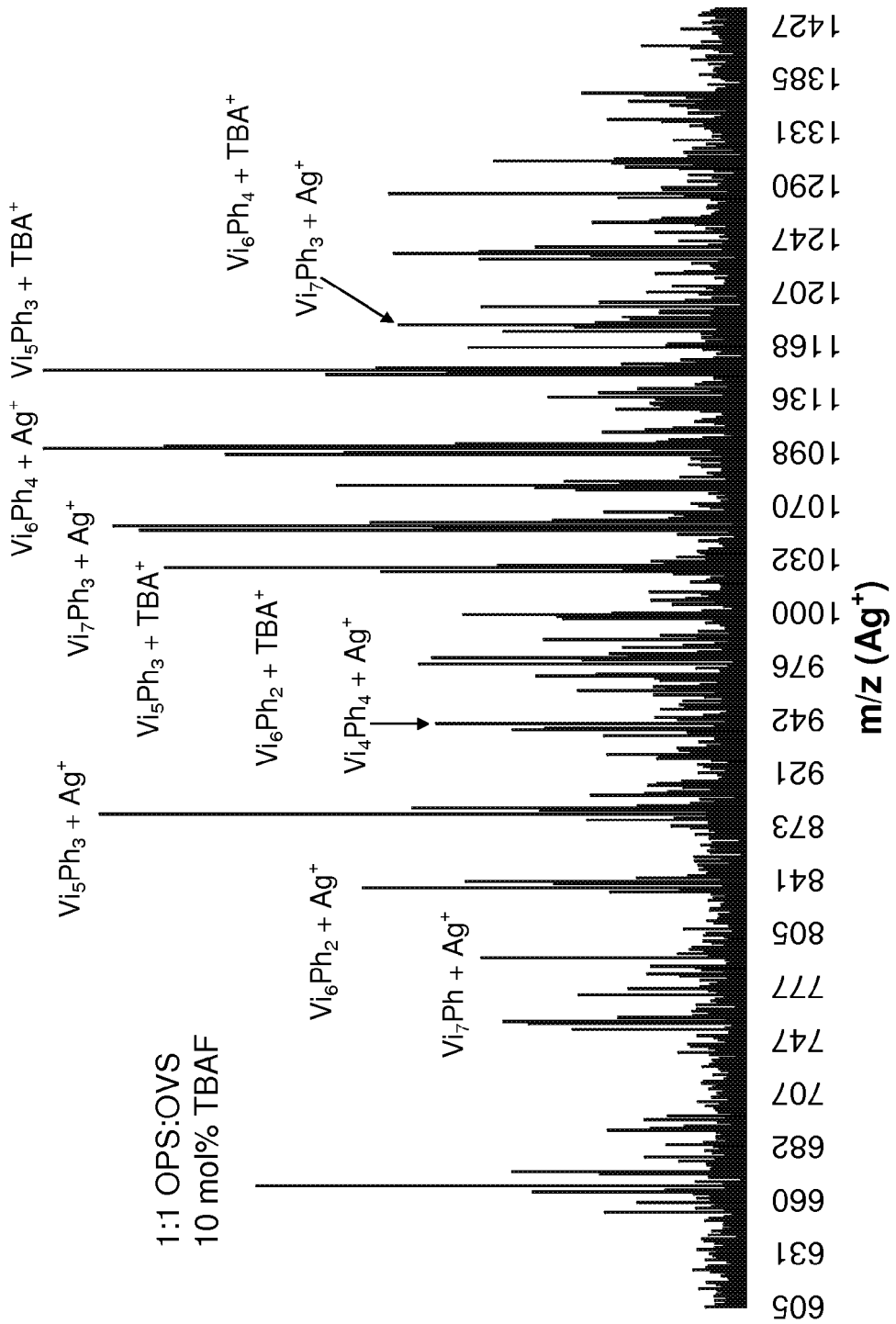
FIG. 8 shows a MALDI-TOF spectrochromatogram of TBAF catalyzed OVS/OPS exchange in the synthesis of octa and deca-cages.

The present methods can include the catalysis and the formation of such materials and even exchanged compounds like those shown in FIG. 7 simply by using TBAF as a catalyst at ambient temperatures. In an illustrative embodiment as shown in FIG. 7, two polysiloxanes (vinyl-phenyl mixtures) can be added to a catalytic amount of tetrabutylammonium fluoride in amounts ranging from about 0.1 mol % to about 10 mol % and stirring the mixture at ambient temperature for a period of about 60 minutes to about 48 hours. FIG. 7 shows the resultant exchange of OVS/OPS produces octa and decacages. Starting initially at 10 mol % TBAF but moving to 2 mol % using THF as solvent and running the reaction at ambient can produce a mixture of species as shown in the MALDI pattern of FIG. 8.

The catalytically produced polymerized polysiloxanes can optionally be further isolated and concentrated. In some embodiments, mixed isomers can be further isolated using organic precipitation. 15A and 15B. The mixed isomers can be concentrated first prior to precipitating them with addition of methanol. Unexpectedly, on concentration, the mixed isomers formed first tractable and then intractable polymers. FIG. 9, reveals their behavior on concentration. A simple mixture of OPS and OVS in THF gives the bottom GPC trace. The elution time for OPS is approximately 33 min while that for OVS is 34.5 min. However, on concentration, the system clearly shifts to the left with a large product peak at about 33 min and other peaks at earlier times. Following precipitation in methanol, the product looks to have a considerable polymeric component. Indeed, on further concentration the product gels to a transparent material.

In some embodiments, it is desirable and often necessary to eliminate the presence of fluoride from the polymerized polysiloxane cages formed in accordance with the present technology. A chlorine salt such as calcium chloride (CaCl$_2$) can be used to quench with the fluoridated mixed cages. This process works quite well as shown in FIG. 10. After quenching, the cage compounds can be recovered, as they no longer are converted to polymer. The actual compositions of the mixtures of cages as determined by MALDI TOF are shown in FIGS. 11 and 13.

Surprisingly, the addition of THF to the polymer gel regenerates the initial starting solution. That is the polymer redissolves and regenerates the intermediate cage compounds. In essence this is a "T resin" system that can be redissolved to monomers. As a proof of this, a polymer byproduct of the OVS synthesis which is insoluble in THF is selected and reacted with it with 2 mol % TBAF. This insoluble material became soluble after stirring overnight at ambient. As seen in FIG. 13, the material derived from (reaction (4) illustrated in FIG. 12, is originally highly crosslinked and insoluble in THF but which becomes soluble after depolymerization in accordance with the present methods and forms a product that looks to be mostly cages with some oligomers. However, on precipitation much higher molecular weight species form. However, quenching with $CaCl_2$ gives mostly the deca and dodeca cage compounds per FIG. 14.

The present technology provides methods for a simplified catalytic polymerization and depolymerization of polyfunctional polysiloxanes such as silsesquioxanes. The various approaches described herein provide for essentially perfect tuning of the polysiloxane properties for mechanical, photonic and electronic applications. Furthermore, the present methods provide for simplistic recycling strategies, thus making their manufacture a green process. The methods provided herein provide for the synthesis of large families of oligomers, polymers and even functionalized particles at room temperature with detailed control of composition properties and with ease of purification.

Applications

In some embodiments, the ability to assemble SQs nm×nm offers the potential to tailor at nanometer length scales. Tailoring at such length scales should permit full optimization of global properties on an application-by-application basis and at low cost (see below). It will also aid in obtaining high reproducibility, predictability and therefore effective materials design. For example, we have developed epoxy resins that offer: 1. CTEs tailored over an order of magnitude, 25-250 ppm/° C., 27; 2. oxygen ($O_2$) barrier properties equal to commercial films but with >100° C. higher stability; 3. low, room temperature viscosities (<1000 MPa-s); 4. potential to be applied with minimal or no solvents to surfaces; 5. good adhesion to glass, metal and carbon surfaces including fibers; 6. superior resistance to moisture uptake and degradation (0.5 wt uptake after 7 d immersion); 7. to hydraulic fluids, jet fuel and other organics; 8. high strength (E=2.4 GPa), fracture toughness (K1C=1.8), hardness 4H) and Tgs≧200° C.; and 9. the Q8 epoxy, tetraethylcyclohexenyl (TCHS) and octa- and tetra-(triethoxysilyl-ethyl) (TTSE) SQs shown below form excellent coatings with controlled CTEs, high compressive moduli, and low water pickup.

Synthesis and Elaboration of Conjugated Octavinylsilsesquioxane

In some embodiments, the present methods provide for the synthesis of sets of silsesquioxanes that offer 3-D conjugation in the excited state. In some embodiments, the synthesis of conjugated octavinylsilsesquioxane is illustratively shown in FIG. 15A. During efforts to elaborate these conjugated octavinylsilsesquioxane (OVS), a set of vinyl stilbenes including the p-$NH_2$— system shown below can be used to examine the photophysical properties of the OVS.

The UV-Vis absorption of the p-$NH_2$ compound is red-shifted 30 nm from the parent vinyl-stilbene but its emission is red-shifted as much as 120 nm from the parent compound and is strongly affected by polar solvents (shown in FIG. 15B). Furthermore, its two photon absorption cross-section is quite high with a GM value of 810 at 780 nm. This behavior is associated with charge transfer behavior in the excited state. Multiple theoretical studies suggest that the lowest unoccupied molecular orbital (LUMO) for these types of molecules lies in the center of the cage and involves all the Si's, O's and whatever is bonded to the Si. Without wishing to be bound by any particular theory, it is believed that the charge transfer (CT) behavior is mediated by the electron transfer to this symmetrical 3-D LUMO which may indicate that all of the p-$NH_2$ vinylstilbene moieties are interacting with this LUMO in the excited state. It is possible that these compounds may be exhibiting delocalization in three dimensions, which may have implications for single molecule transistors or novel organic photovoltaics.

Figure 1:
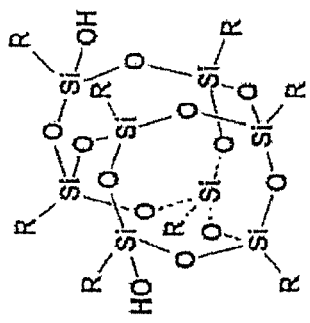
FIG. 1 shows the structures of a family of polysiloxanes called silsesquioxanes, including random, ladder, partial cage, octa, deca and dodeca cage structures.
Figure 1:
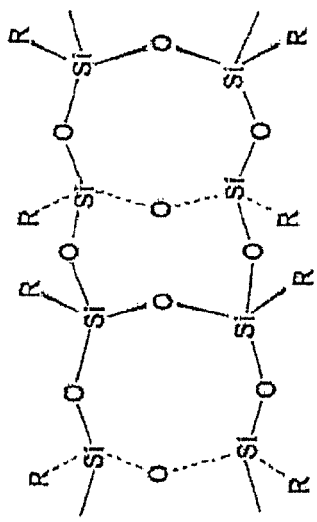
Figure 1:
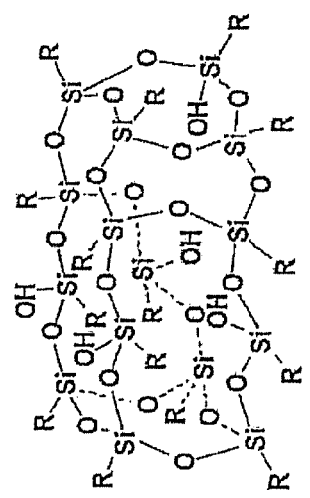
Figure 1:
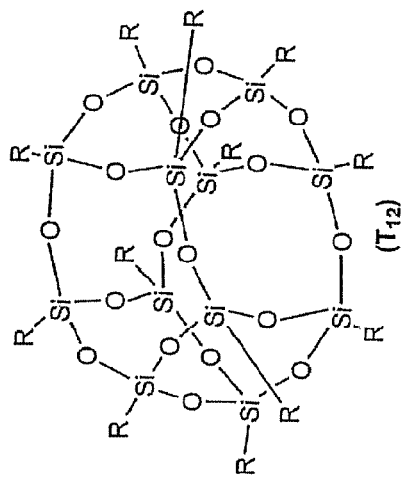
Figure 1:
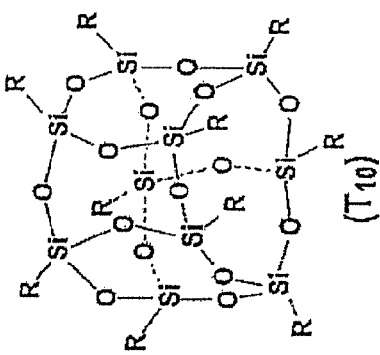
Figure 1:
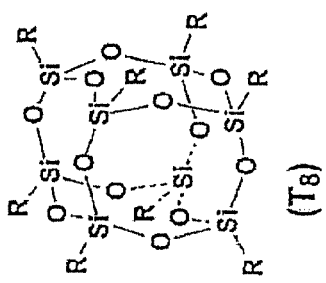
Figure 2:
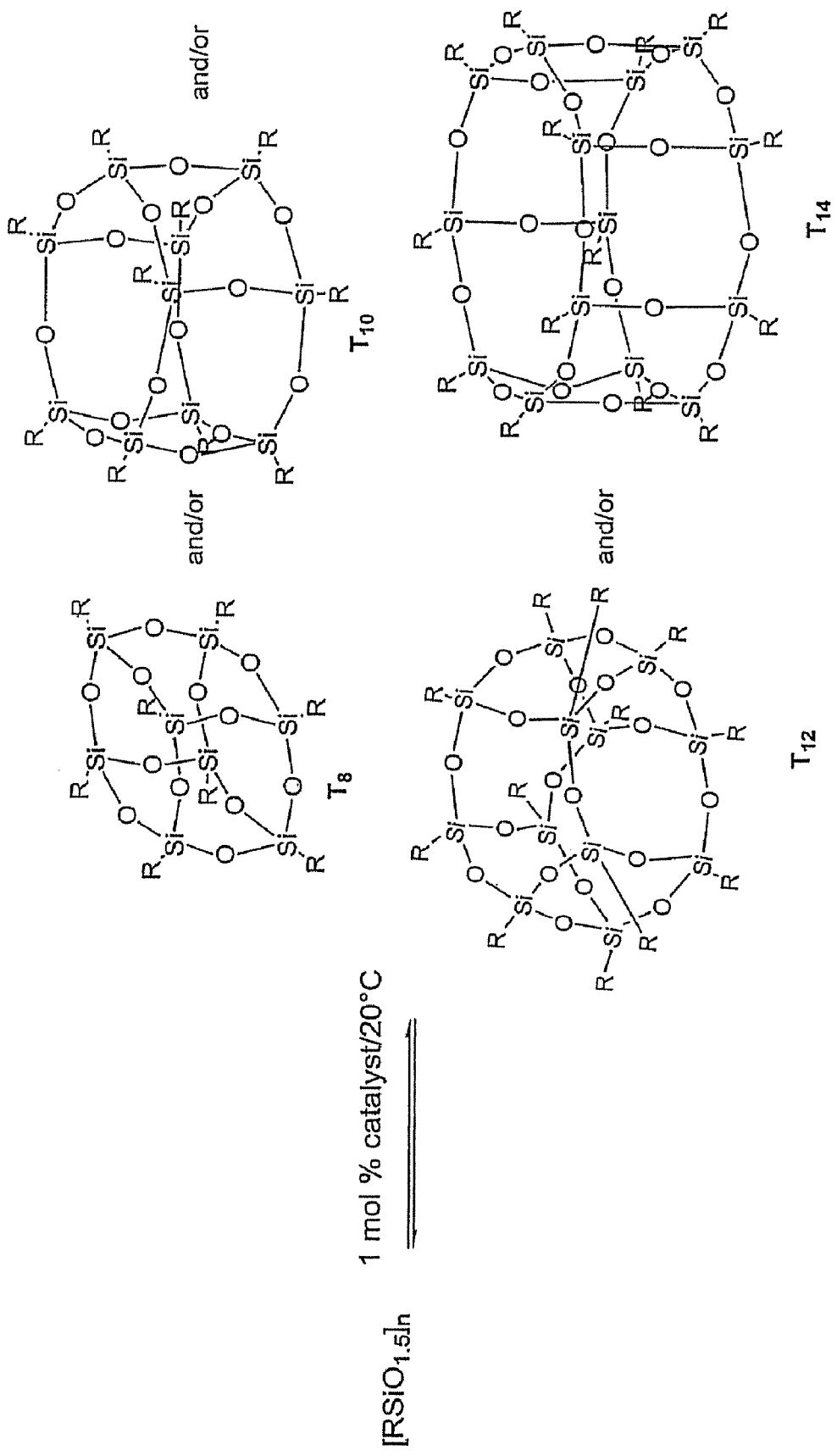
FIG. 2 shows polymeric silsesquioxane or "T resin" conversion into soluble cage compounds in accordance with the present technology.
Figure 3:
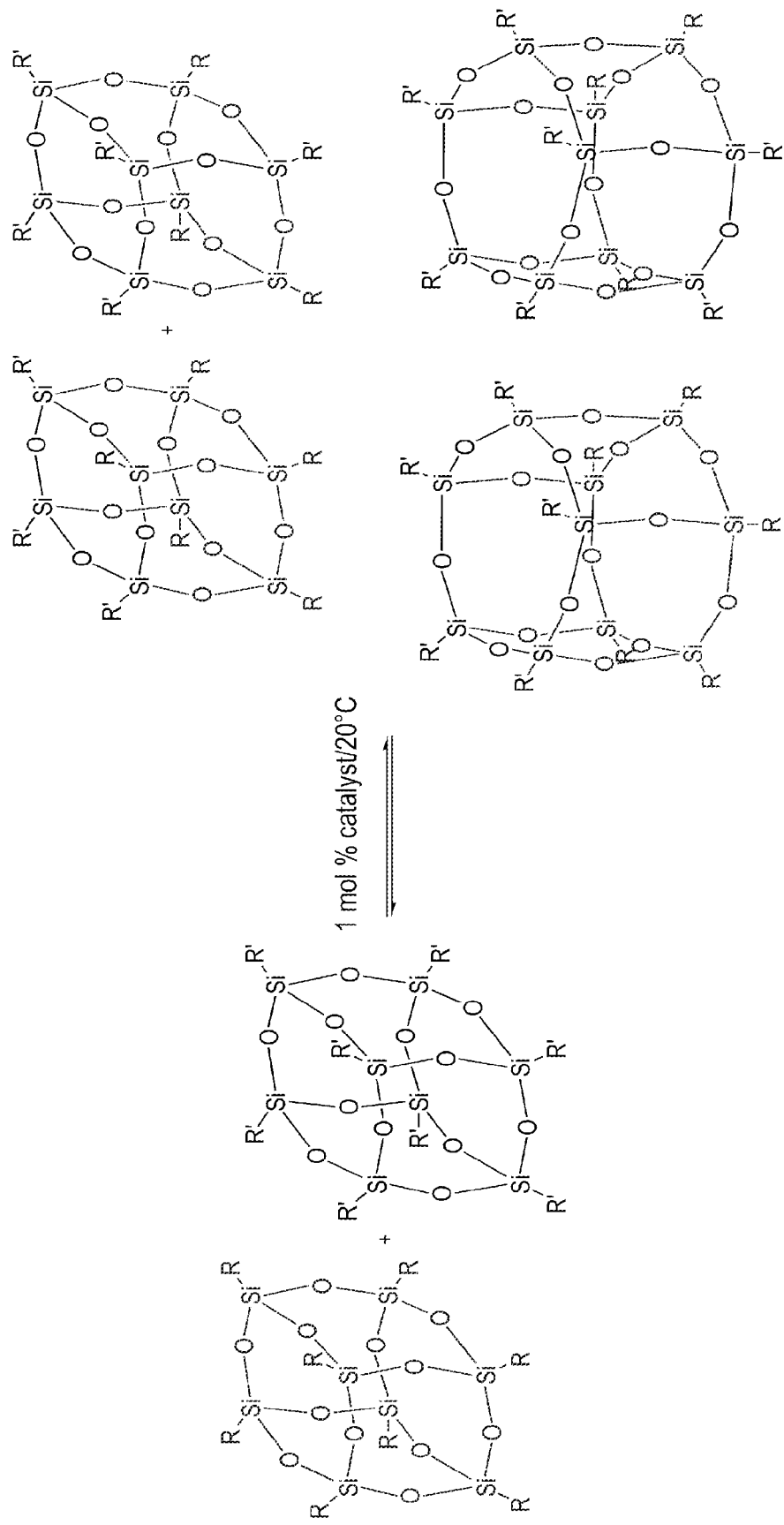
FIG. 3 shows the reaction scheme for the promotion of functional R group exchange between any RT$_x$/R'T$_x$ systems.
Figure 4:
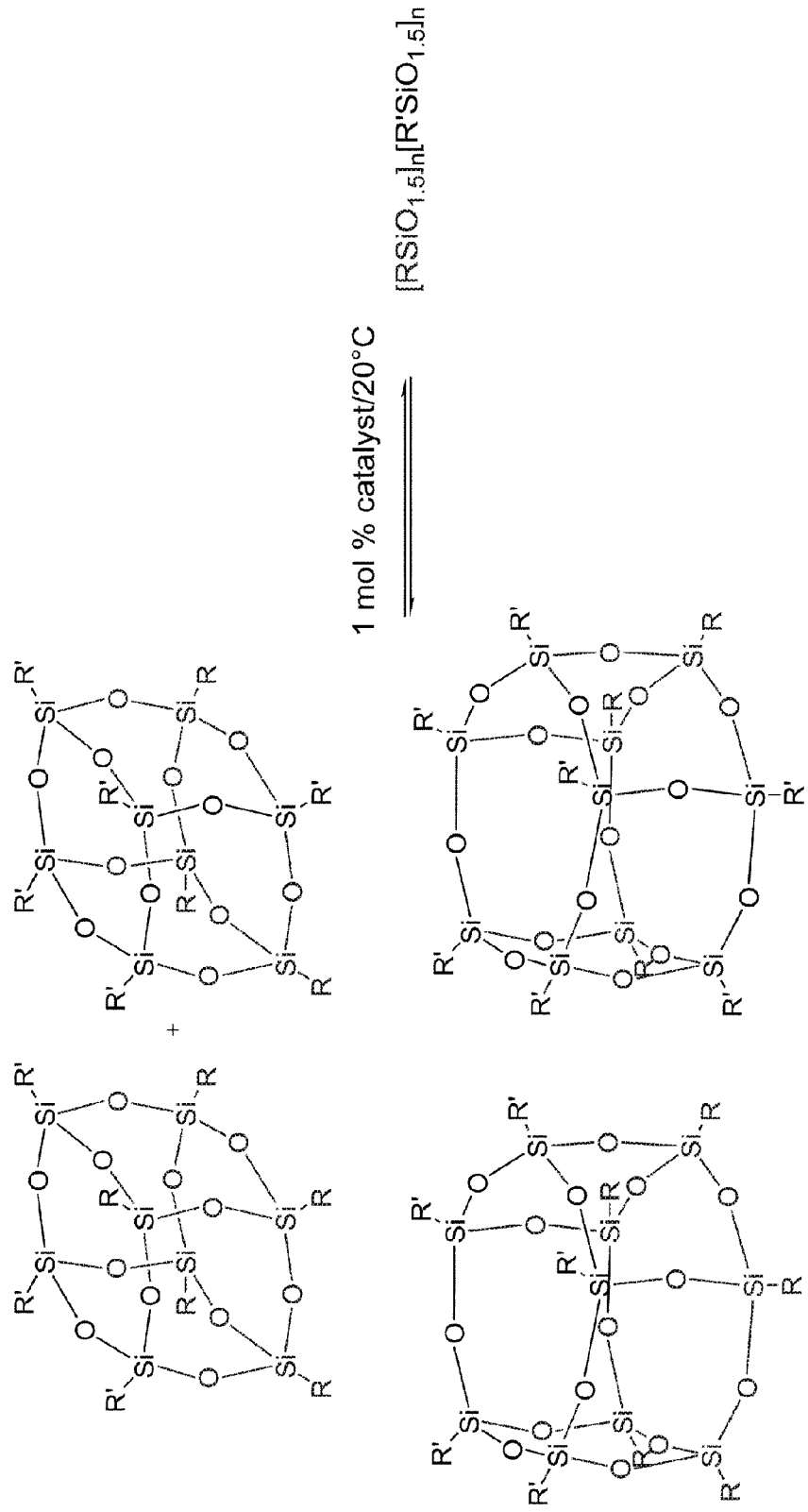
FIG. 4 shows the reaction scheme to convert the cage compounds shown in FIGS. 2 and 3 to their original polymeric structures by reducing the solvent contents.
Figure 5:
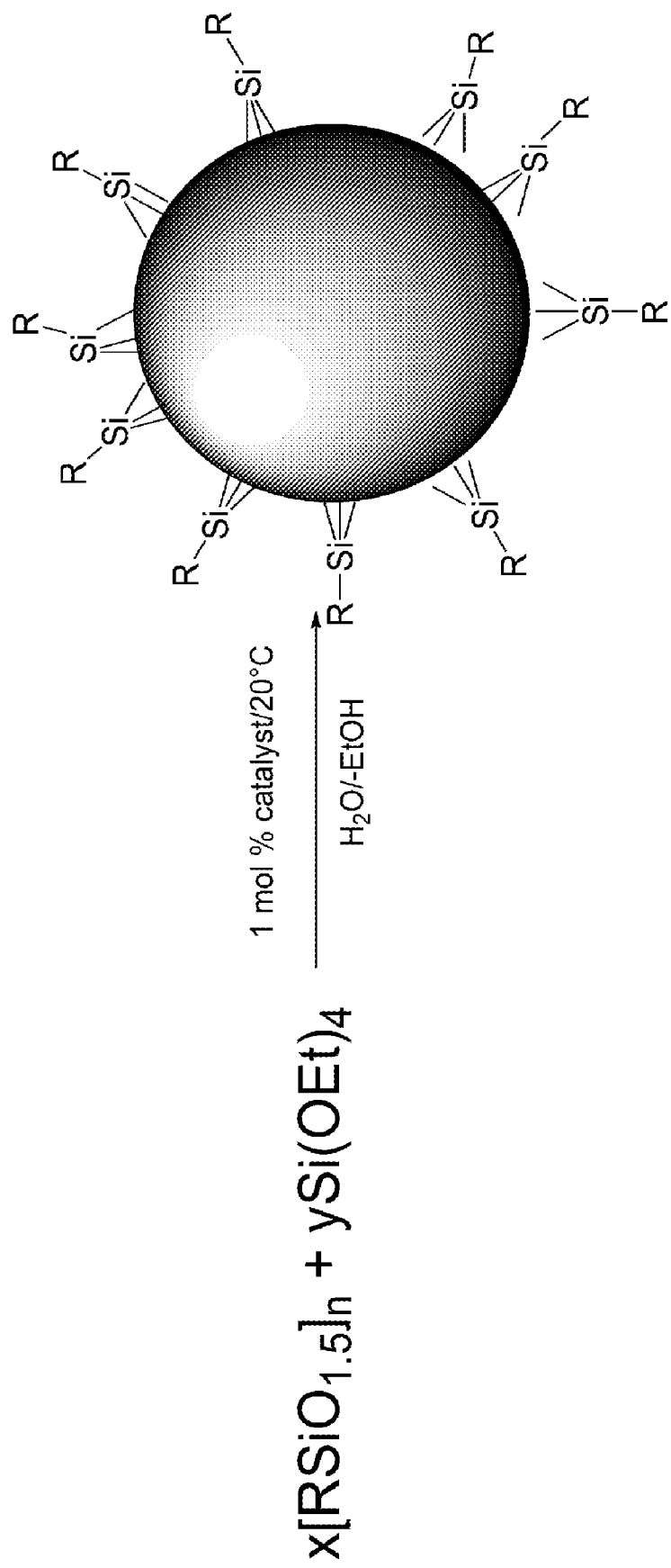
FIG. 5 shows a reaction scheme to synthesize functionalized colloidal silica from [RSiO$_{1.5}$]$_x$ and Si(OEt)$_4$. Particle size is dependent on the x:y ratio.
Figure 6:
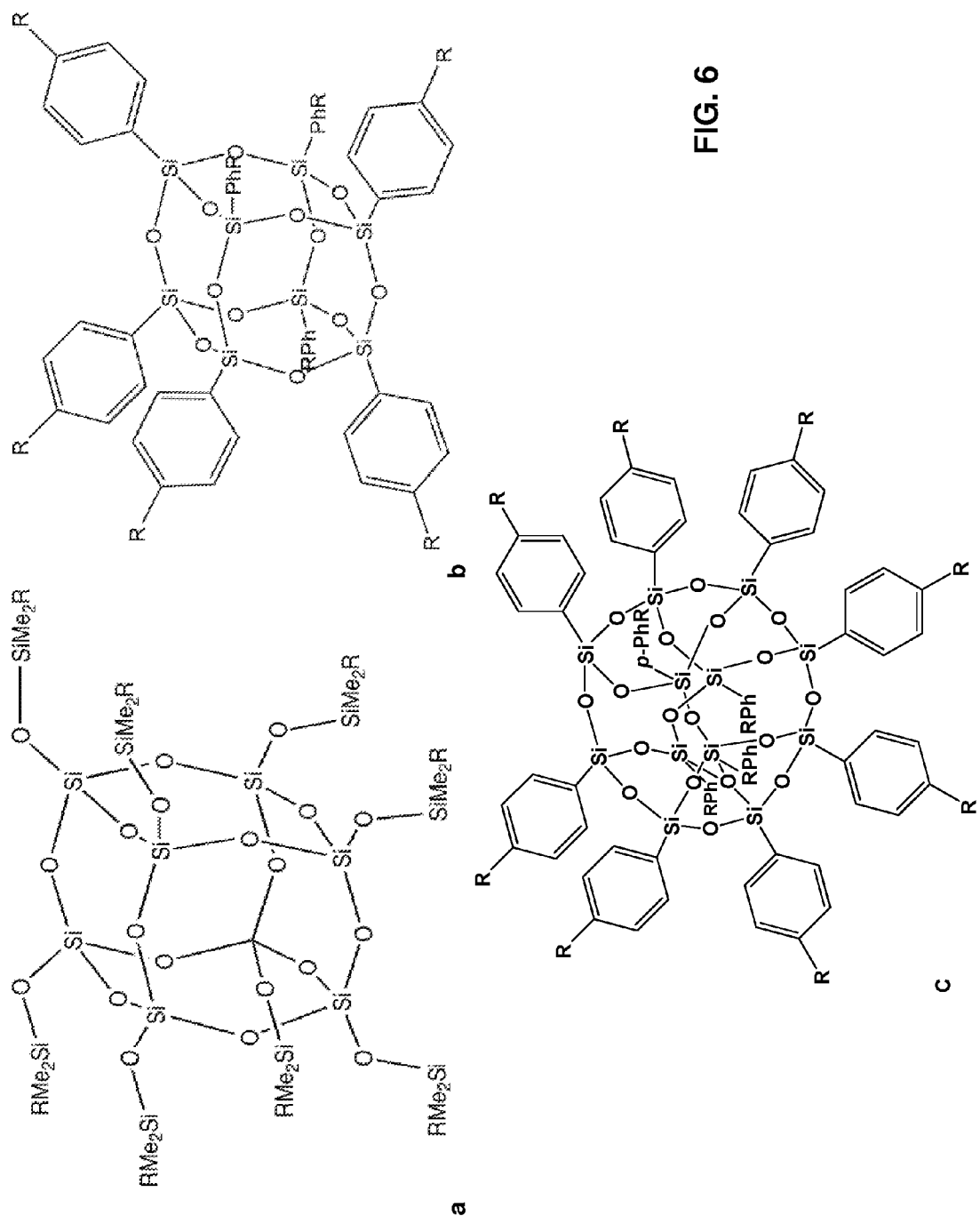
FIG. 6 shows exemplary octafunctional cage structures where R=epoxide, methacrylate, propylamine or functionalized phenyls.

In some embodiments, the design and construction of 3-D molecular scaffolds is currently an area of extreme interest for a variety of reasons including hydrogen storage, gas separation and molecular sieving. As shown in FIG. 6, octahedral silsesquioxanes, $[RSiO_{1.5}]_8$, represent a class of unusually robust, nanometer size molecules with cubic symmetry that places each functional group in a different octant in Cartesian space. This 3-D array of functional groups offers the potential to design nanobuilding blocks to construct multi-functional, nanocomposite materials including molecular scaffolds, novel cores for dendrimers and hyperbranched molecules and related materials.

FIG. 16 illustratively shows a method for bromination of silsesquioxanes, illustratively shown using octahedral silsesquioxanes, $[RSiO_{1.5}]_8$ in accordance with the present technology. The method provides for the synthesis of $Br_8OPS$, $Br_{16}OPS$ and $Br_{23/24}OPS$. Each compound is easily prepared by controlling the $Br_2$ concentrations and the use of catalysts. The final compound can be easily recovered by recrystallization. The Br functionality allows for catalytic coupling to introduce unsaturated functional groups.

FIG. 17 illustratively shows the octaalkynyl compound capable of synthesis in accordance with the present technology.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

Beads on a chain (BoC) structures are prepared especially from cage compounds with two reactive functional groups by elaboration of the functional groups where required before coupling the functional cage compounds with known coupling reactions to make an extended structure. The BoC structure has "beads" made of difunctional $T_8$-$T_{12}$ cage compounds connected by "chains" of organic connecting groups. The concept will now be illustrated in non-limiting fashion with metathesis reactions elaborations on a vinyl reactive group followed by alkylation under Heck coupling conditions.

Metathesis Reaction of $Vinyl_2Phx$ (x=8, 10) $T_{10}$ and $T_{12}$ SQs and 4-Bromostyrene $Vinyl_2Phx$ (x=8, 10) $T_{10}$ and $T_{12}$ (from reaction of 4.4:1 PPS:PVS with TBAF) were reacted with 4-bromostyrene per FIG. 38. MALDI MS of the crude metathesis products initially showed the presence of $BrStyr_3T_{10}$ and $T_{12}$ as well as $BrStyr_4$ $T_{10}$ and $T_{12}$ compounds, indicating reaction of the trivinyl and tetravinyl cages present in the starting material (FIG. 37). However, the bromostyrenyl compounds are more easily purified by column chromatography than their corresponding vinyl precursors, as the $BrStyr_3$ and $BrStyr_4$ derivatives are much more soluble than the $BrStyr_1$ and $BrStyr_2$ derivatives. However, it proved difficult to completely remove phenyl $T_{10}$ even after column chromatography because of its high solubility.

Thus, after column chromatography, MALDI ToF of the purified metathesis products indicated that all of the vinyl groups react to give ~2 aryl bromides per $T_{10}$ and $T_{12}$ as sites for further functionalization, see FIG. 39 and Table 4. Low intensity signals from the mono bromostyrenyl (BrStyr$_1$) T$_{10}$ and T$_{12}$ were also present in the spectrum.

TABLE 4

MALDI-TOF data (Ag$_+$ Adduct) for metathesis reaction of vinyl$_2$Ph$_x$ (x = 8, 10) T$_{10}$ and T$_{12}$ and 4-bromostyrene.

| Most Common Isotope | Found (Da) | Calculated (Da) | Relative Peak Intensity (%) |
|---|---|---|---|
| (C$_6$H$_5$)$_{10}$(SiO$_{1.5}$)$_{10}$ | 1399.1 | 1399.8 | 100 |
| (C$_8$H$_6$Br)$_1$(C$_6$H$_5$)$_9$(SiO$_{1.5}$)$_{10}$ | 1503.5 | 1504.7 | 18 |
| (C$_8$H$_6$Br)$_2$(C$_6$H$_5$)$_8$(SiO$_{1.5}$)$_{10}$ | 1610.0 | 1609.6 | 74 |
| (C$_8$H$_6$Br)$_1$(C$_6$H$_5$)$_{11}$(SiO$_{1.5}$)$_{12}$ | 1763.1 | 1763.1 | 19 |
| (C$_8$H$_6$Br)$_2$(C$_6$H$_5$)$_{10}$(SiO$_{1.5}$)$_{12}$ | 1867.0 | 1868.0 | 50 |

A self-metathesis reaction of the divinyl cages using the same reaction conditions was attempted (FIG. 40) in efforts to directly synthesize cage oligomers/polymers. This resulted only in recovery of the starting materials (as determined by GPC, MALDI TOF, and TGA), likely due to the steric effects of the bulky phenyl groups and/or cages impeding formation of the intermediate four-member ring in the cross metathesis mechanism. This suggests that cages with longer, more flexible vinyl-terminated tethers and/or less bulky non-reactive moieties may be more facile to self-metathesis. Furthermore, a molecular diluent with two reactive vinyl groups could be used to link the bulky cages together, for example.

The $^1$H NMR spectrum was complex and the broad peaks corresponding to the vinyl and phenyl protons from varying amounts of different compounds were not useful for determining the structures of the products. $^{13}$C NMR, however, shows distinct peaks for the vinyl carbons at ~130.8 (—Si—CH=CH—) and ~136.0 (—Si—CH=CH—) ppm. Peaks were assigned by comparison to $^{13}$C NMR spectra of vinyltriethoxysilane and phenyltriethoxysilane. A peak at ~122 ppm is characteristic of bromine bonded to an aryl carbon, associated with the bromostyrenyl moieties of the expected product. The generally weak carbon-bromine bond stretch (~1028-1073 cm$^{-1}$) was not observed in the FTIR possibly due to overlap with the very intense and broad Si—O—Si stretching peak (~1130 cm$^{-1}$) characteristically associated with SQ cages. As above, the TGA and GPC data are discussed below.

Heck Reaction of BrStyr$_2$Ph$_x$ (x=8, 10) T$_{10}$/T$_{12}$ SQs and Vinyl$_2$Ph$_x$ (x=8, 10) T$_{10}$/T$_{12}$ SQs BrStyr$_2$Ph$_x$ (x=8, 10) T$_{10}$ and T$_{12}$ silsesquioxanes were reacted with vinyl$_2$Ph$_x$ (x=8, 10) T$_{10}$ and T$_{12}$ under Heck coupling conditions (FIG. 41) in efforts to form linear oligomers. The isolated products are soluble in typical organic solvents (THF, ethyl acetate, and acetone) with proposed structures shown schematically in FIG. 42.

FIG. 43 shows the MALDI spectrum after Heck coupling (see also Table 5). Unreacted mono-bromostyrenyl species are present in the spectrum, as are unreactive phenyl T$_{10}$, which could not be completely separated from the starting materials by column chromatography. Higher molecular weight species (from dimers, trimers, etc.) are not readily detected by MALDI, because of the difficulties in ionizing SQ oligomers/polymers. ESI MS was also attempted, but gave results similar to MALDI and did not show the presence of high molecular weight species.

TABLE 5

MALDI-TOF data (Ag$_+$ Adduct) for Heck reaction of BrStyr$_2$Ph$_x$ (x = 8, 10) T$_{10}$ and T$_{12}$ and Vinyl$_2$Ph$_x$ (x = 8, 10) T$_{10}$ and T$_{12}$.

| Most Common Isotope | Found (Da) | Calculated | Relative Peak Intensity (%) |
|---|---|---|---|
| (C6H5)10(SiO1.5)10 | 1400.0 | 1399.8 | 100 |
| (C8H6Br)$_1$(C6H5)$_9$(SiO$_{1.5}$)$_{10}$ | 1505.1 | 1504.7 | 20 |
| (C8H6Br)$_1$(C6H5)$_{11}$(SiO$_{1.5}$)$_{12}$ | 1763.2 | 1763.1 | 39 |

FIG. 44 records the GPC traces for [vinylSiO$_{1.5}$]$_8$ (OVS), [PhSiO$_{1.5}$]$_8$ (PPS) as well as the F$^-$ equilibrated products, the metathesis products, the model compounds (see below) and finally the BoC Heck coupling products. The OVS and OPS as standard for comparison of separation and retention times. Table 6 compiles the pertinent information gleaned from the FIG. 44 data. The GPC data provide a wealth of information. For example, the amount of [PhSiO$_{1.5}$]$_{10}$ in the product mixture can be estimated to be <5% by GPC. This is calculated by comparing the area of overlap between the divinyl T$_{10}$ and T$_{12}$ peak and phenyl T$_8$ peak. As previously suggested, GPC cannot adequately resolve phenyl T$_8$, T$_{10}$, or T$_{12}$ due to similarities in their hydrodynamic volumes. Comparing the area of overlap with phenyl T$_8$ gives a rough estimate of the amount of unreacted phenyl T$_{10}$ in the product mixture.

The GPC trace of the metathesis products shows a single, narrow peak (PDI=1.04; see Table 6) confirming the absence of polymeric side products and retention of intact silica cores. There is a small difference in the retention times of the peaks corresponding to the metathesis compounds and vinyl$_2$Ph T$_{10}$ and T$_{12}$, owing to only a slight increase in the hydrodynamic volumes after metathesis with 4-bromostyrene. A slight shoulder in the GPC at tR ca. 31 min. most likely indicates formation of dimer. Unreacted BrStyr$_1$T$_{10}$ and T$_{12}$ also appear as a small peak (tR ca. 32 min). The total amount of unreacted BrStyr$_1$T$_{10}$ and T$_{12}$ and phenyl T$_{10}$ is ca. 10% by GPC.

The GPC peaks of the BoC Heck coupling products appear at 26-31 min. with a PDI of 1.25. The MW of these materials suggests that the degree of polymerization runs from 2-5. However, FIG. 42 portrays an idealized BoC structure. It is likely that these structures are not like linear polymers and likely to be branched or highly branched leading to an underestimation of the true MWs. Thus, to be on the conservative side we suggest that at most these molecules are trimeric or tetrameric in nature.

TABLE 6

GPC mass data for Heck, model and metathesis compounds, vinyl$_2$Ph$_8$ T$_{10}$ and vinyl$_2$Ph$_{10}$ T$_{12}$, and OPS/OVS (for comparison).

| Compound Name | tR (mins) | Mn | Mw | PDI |
|---|---|---|---|---|
| Heck Compounds† | 29.7 | 2973 | 3716 | 1.25 |
| Model Compounds | 32.3 | 1441 | 1527 | 1.06 |
| Metathesis Compounds | 32.6 | 1383 | 1437 | 1.04 |
| Divinyl Ph T10 & T12 | 33.1 | 986 | 1005 | 1.02 |
| OPS | 33.7 | — | — | — |
| OVS | 34.6 | — | — | — |

†Area under curve measured from tR = 26.4-31.9 mins.

The TGAs of the various products in air and N2 are shown in FIGS. 45 and 46, respectively. The TGAs of the vinyl$_2$Phx (x=8, 10) T$_{10}$ and T$_{12}$ compounds indicate that they are very stable in air (Td5%=460° C.), as expected of SQ cages containing rigid, thermally-stable phenyl groups. The mass loss before 500° C. is likely due to sublimation of phenyl $T_{10}$ (~5 wt %) corroborating the GPC estimated amount of this compound.

EXAMPLES

Experimental

Analytical

NMR analyses. $^1$H and $^{13}$C-NMR are performed in CDCl$_3$ or DMSO and recorded on a Varian INOVA 400 spectrometer. $^1$H-NMR spectra are collected at 400 MHz using a 6000 Hz spectral width, a relaxation delay of 3.5s, a pulse width of 38°, 30 k data points, and CDCl$_3$ (7.27 ppm) or DMSO-d$_6$ (2.50 ppm) as an internal reference. $^{13}$C-NMR spectra were collected at 100 MHz using a 25000 Hz spectra width, a relaxation delay of 1.5s, 75k data points, a pulse width of 40°, and CDCl$_3$ (77.23 ppm) or DMSO-d$_6$ (39.5 ppm) as the internal reference.

Thermal Gravimetric Analyses (TGA). Thermal stabilities of materials under $N_2$ or air were examined using a 2960 simultaneous DTA-TGA (TA Instruments, Inc., New Castle, Del.). Samples (5-10 mg) were loaded in alumina pans and ramped to 1000° C. while heating at 10° C./min. The N2 or air flow rate was 60 mL/min.

Differential Scanning Calorimetry (DSC). Calorimetry was performed on materials using a DSC 2910 (TA Instruments, Inc., New Castle, Del.). The N2 flow rate was 60 mL/min. Samples (10-15 mg) were placed in a pan and ramped to 400° C. (5° C./min/N2) without capping.

Melting Points. Melting point determinations were performed on samples using a Mel-Temp 3.0 (Laboratory Devices, Inc. Dubuque, Iowa) with a ramp rate of 5° C./min.

Fourier-Transform Infrared Spectroscopy (FTIR). Diffuse reflectance Fourier transform (DRIFT) spectra were recorded on a Nicolet 6700 Series FTIR spectrometer (Thermo Fisher Scientific, Inc., Madison, Wis.). Optical grade, random cuttings of KBr (International Crystal Laboratories, Garfield, N.J.) were ground, with 1.0 wt % of the sample to be analyzed. For DRIFT analysis, samples were packed firmly and leveled off at the upper edge to provide a smooth surface. The FTIR sample chamber was flushed continuously with N2 prior to data acquisition in the range 4000-400 cm−1.

Gel Permeation Chromatography. GPC analyses were done on a Waters 440 system equipped with Waters Styragel columns (7.8×300, HT 0.5, 2, 3, 4) with RI detection using Opti-lab DSP interferometric refractometer and THF as solvent. The system was calibrated using polystyrene standards and toluene as reference. Analyses were performed using PL Caliber 7.04 software (Polymer Labs, Shropshire UK).

Matrix-Assisted Laser-Desorption/Time-of-Flight Spectrometry. MALDI-TOF was performed on a Micromass Tof-Spec-2E equipped with a 337 nm nitrogen laser in positive ion reflection mode using poly(ethylene glycol) as the calibration standard, 1,8,9-anthracenetriol (dithranol) as the matrix, and AgNO$_3$ as the ion source. Samples were prepared by mixing solutions of five parts dithranol (10 mg/mL in THF), five parts sample (1 mg/mL in THF) and one part AgNO$_3$ (10 mg/mL in water) and blotting the mixture on the target plate.

X-Ray Diffraction Analysis (XRD). XRD was performed on a Rigaku Rotating Anode Goniometer (Rigaku Denki., LTD., Tokyo, Japan). The powder sample was packed on a glass specimen holder. XRD scans were made from 10° to 60° 2θ, using a scan rate of 2° min$^{-1}$ in 0.05° increments and Cu Kα radiation (1.542 Å) operating at 40 kV and 100 mA. The Jade program (Version 3.1 from Materials Data, Inc., Livermore Calif.) was used to determine the presence of any crystallographic phases.

Materials

Polyphenylsilsesquioxane (PPS) and polyvinylsilsesquioxane (PVS) were synthesized using previously described methods.34,39 A first generation Grubbs catalyst [RuCl2 (=CHPh)(PCy3)2], 1.0 M tetrabutylammonium fluoride (TBAF, ~5 wt % H$_2$O) in THF, and vinyltriethoxysilane were purchased from Aldrich and used as received. All other solvents were purchased from Fisher or Aldrich and used as received. All work was performed under N2.

Example 1

Synthesis of Phenyl$_x$vinyl$_{(10-X)}$T$_{10}$ and Phenyl$_x$ vinyl$_{(12-X)}$T$_{12}$ from Phenyl$_8$T$_8$ and Vinyl$_8$T$_8$ To a dry 250 mL round-bottomed flask under $N_2$ was added 5 g (4.8 mmol) Phenyl$_8$T$_8$ and 3 g (4.8 mmol) Vinyl$_8$T$_8$. Dry THF (100 mL) was added via a syringe followed by 0.2mL of 1.0M tetrabutylammonium fluoride (TBAF) solution in tetrahydrofuran (THF) (0.2 mmol, 2 mol %). The reaction mixture was stirred at room temperature overnight. 0.3g (2.25 mmol) CaCl$_2$ was then added and the mixture continued to stir for 3 hr. The solid was filtered out and the solution was concentrated to 25 mL and then precipitated into 500 mL of methanol. The product was then collected by filtration and dried under vacuum. The characterization of the products of this reaction is shown in FIGS. 8-11.

Example 2

Synthesis of Vinyl$_{10}$T$_{10}$ and Vinyl$_{12}$T$_{12}$ from Polyvinylsilsesquioxane (PVS) with Tetrabutylammonium Fluoride To a dry 100 mL round-bottomed flask under $N_2$ was added 5 g (43.1 mmol —Si) PVS. Dry THF (50 mL) was added via a syringe followed by 0.4 mL of 1.0M tetrabutylammonium fluoride solution in THF (0.4 mmol, 1 mol %). The reaction mixture was stirred at room temperature overnight and then 0.1 g (0.75 mmol) CaCl$_2$ was added to the solution. The solid was filtered out and the solution was concentrated to 10 mL and then precipitated into 250 mL of methanol. The product was collected by filtration and dried under vacuum. The characterization data of the products of this reaction are shown in reaction (4), and FIGS. 11 and 13. Here the FIG. 11 shows that TBAF and THF favor the 10 and 12 cages over the T8 cage.

Example 3

Synthesis of Vinyl$_{10}$T$_{10}$ and Vinyl$_{12}$T$_{12}$ from Polyvinylsilsesquioxane (PVS) with Tetramethylammonium Fluoride (TMAF)

To a dry 100 mL round-bottomed flask under $N_2$ was added 5 g (43.1 mmol —Si) of PVS and 5 mg (0.03 mmol, 7 mol %) of tetramethylammonium fluoride tetrahydrate. Dry toluene (50 mL) was added via a syringe. The reaction mixture was stirred at room temperature overnight and then 0.1 g (0.75 mmol) CaCl$_2$ was added to the solution. The solid was filtered out and the solution was concentrated to 10 mL and then precipitated into 250 mL of methanol. The product was collected by filtration and dried under vacuum. The MALDI-ToF data of the products of this reaction are shown in FIG. 18 indicating formation of cage species from the polymer. The use of TMAF in toluene favors the smaller cages of 8 and 10 compared with TBAF.

Example 4

Rearrangement of $Br_{16}OPS$ by Tetrabutylammonium Fluoride

To a dry 100 mL round-bottomed flask under $N_2$ was added 1 g (0.44 mmol) $Br_{16}OPS$. Dry THF (10 mL) was added via a syringe followed by 9 mL of 1.0M tetrabutylammonium fluoride solution in THF (0.009 mmol, 2 mol %). The reaction mixture was stirred at room temperature overnight and then 0.1 g (0.75 mmol) $CaCl_2$ was added to the solution. The solid was filtered out and the solution was concentrated to 5 mL and then precipitated into 100 mL of methanol. The product was collected by filtration and dried under vacuum. The GPC data of the products of this reaction are shown in FIG. 19. Here we observe the formation of both polymer and higher cages based on the changes in retention time as expected from the first examples.

Example 5

Synthesis of (3-Mercaptopropyl)$_X$(Phenyl)$Yt_{(X+Y)}$ (X+Y=8, 10, 12)

To a dry 50 mL round-bottomed flask under $N_2$ was added 0.33 g (0.32 mmol) OPS. Dry THF (10 mL) was added via a syringe followed by 0.475 mL (2.55 mmol) of 3-mercaptopropyltrimethoxysilane, 0.1 mL of 1.0M tetrabutylammonium fluoride solution in THF (0.1 mmol, 2 mol %), and 0.14 mL (7.635 mmol) of deionized water. The reaction mixture was stirred at room temperature overnight and then 0.1 g (0.75 mmol) $CaCl_2$ was added to the solution. The solid was filtered out and the solution was concentrated to 5 mL and then precipitated into 100 mL of methanol. The product was collected by filtration and dried under vacuum. The GPC and MALDI-ToF data of the products of this reaction are shown in FIGS. 20 and 21 respectively.

Example 6

Synthesis of $Vinyl_{10}T_{10}$ and $Vinyl_{12}T_{12}$ from Polyvinylsilsesquioxane (PVS) with Tetrabutylammonium Fluoride in Toluene To a dry 100 mL round-bottomed flask under $N_2$ was added 5 g (43.1 mmol —Si) PVS. Dry toluene (50 mL) was added via a syringe followed by 0.4 mL of 1.0M tetrabutylammonium fluoride solution in THF (0.4 mmol, 1 mol %). The reaction mixture was stirred at room temperature overnight and then 0.1g (0.75 mmol) $CaCl_2$ was added to the solution. The solid was filtered out and the solution was concentrated to 10 mL and then precipitated into 250 mL of methanol. The product was collected by filtration and dried under vacuum. The GPC and MALDI-ToF data of the products of this reaction are shown in FIGS. 22 and 23 respectively.

Example 7

Solution Casting of $Vinyl_{10}T_{10}$ and $Vinyl_{12}T_{12}$ from Polyvinylsilsesquioxane (PVS) Treated with Tetrabutylammonium Fluoride A solution of $Vinyl_{10}T_{10}$ and $Vinyl_{12}T_{12}$ mixture in THF (see Example 2) was placed in a circular Teflon mold having the following dimensions: 49 mm diameter, 8 mm height. The mold was then placed in an oven at 40° C. overnight to remove the solvent and obtain a brittle, glassy disk.

Example 8

Synthesis of $Phenyl_x styrenyl_{(10-X)}T_{10}$ and $Phenyl_x styrenyl_{(12-X)}T_{12}$ From $Phenyl_x vinyl_{(10-X)}T_{10}$ and $Phenyl_x vinyl_{(12-X)}T_{12}$ To a dry 50 mL round-bottomed flask under $N_2$ was added 1 g (4.4 mmol —$SiCH=CH_2$, assumed 5.5 —$SiCH=CH_2$ groups on average) of the mixture of $Phenyl_x Vinyl_{(10-x)}T_{10}$ and $Phenyl_x Vinyl_{(12-x)}T_{12}$ (see Example 1.) and 18 mg (2.2× $10^{-2}$ mmol) of Grubbs' 1 catalyst. Dry $CH_2Cl_2$ (10 mL) was added via a syringe followed by 0.76 mL (6.6 mmol) styrene. The reaction mixture was stirred at room temperature for 48 h and then quenched by precipitation into 100 mL of methanol. The product was collected by filtration and dried under vacuum. The GPC and MALDI-ToF data of the products of this reaction are shown in FIGS. 24 and 25 respectively.

Example 9

Synthesis of $Methyl_x vinyl_y t_{(X+Y)}$ (X+Y=8,10,12) from Polymethylsiloxane and Polyvinyl-Siloxane at Room Temperature To a stirring 15 ml THF solution of polymethylsiloxane (1 g, 9.6 mmol) and polyvinylsiloxane (1,27 g, 9.6 mmol) a 1.0 M tetrabuthylammonium fluoride solution in THF (0.03 ml, 0.09 mmol) was added. The solution was stirred for 1 day and treated with 500 mg of $CaCl_2$, the solid was filtered off and the solvent was removed in vacuum to give a whitish solid characterized by MALDI-ToF and FT-IR shown in FIGS. 26 and 27 respectively.

Example 10

Synthesis of $Methyl_x vinyl_y t_{(X+Y)}$ (X+Y=8,10,12) From Polymethylsiloxane And Polyvinyl-Siloxane Under Reflux To a stirring 15 ml THF solution of polymethylsiloxane (1 g, 9.6 mmol) and polyvinylsiloxane (1,27 g, 9.6 mmol) a 1.0 M tetrabuthylammonium fluoride solution in THF (0.03 ml, 0.09 mmol) was added. The solution was refluxed for 6 h and treated with 500 mg of $CaCl_2$, the solid was filtered off and the solvent was removed in vacuum to give a whitish solid characterized by MALDI-ToF and FT-IR shown in FIGS. 28 and 29 respectively.

Example 11

Synthesis of $Methyl_x vinyl_y t_{(X+Y)}$ (X+Y=8,10,12) from Polymethylsiloxane and Octavinyl-Siloxane (OVS) at Room Temperature To a stirring 15 ml THF solution of polymethylsiloxane (1 g, 9.6 mmol) and OVS (0.76 g, 1.2 mmol) a 1.0 M tetrabuthylammonium fluoride solution in THF (0.03 ml, 0.09 mmol) was added. The solution was stirred for 1 day and treated with 500 mg of $CaCl_2$, the solid was filtered off and the solvent was removed in vacuum to give a whitish solid characterized by MALDI-TOF and FT-IR shown in FIGS. 30 and 31 respectively.

Example 12

Rearrangement of Polyvinylsiloxane and Tetraethylorthosilicate (TEOS) by Tetrabutylammonium Fluoride To a stirring suspension of polyvinylsiloxane (1 g, 7.5 mmol) in THF (15 ml) a 1.0 M tetrabuthylammonium fluoride solution in THF (0.02 ml, 0.07 mmol) was added. After 10 minutes 0.75ml of tetraethyl orthosilicate and 3 drops of water were added and stirred for 3 days. The solution was treated with 500 mg of $CaCl_2$, the solid was filtered off and the solvent was removed in vacuum, a white powder was collected and characterized by FT-IR and TGA under air and $N_2$ shown in FIGS. 32, 33 and 34 respectively.

Example 13

Fluoride Catalyzed Rearrangements of Polysilsesquioxanes, Mixed Me, Vinyl $T_8$, $T_{10}$, and $T_{12}$ Cages Insoluble mixtures of polyvinylsilsesquioxane -(vinyl-$SiO_{1.5}$)$_n$- ("PVS") and polymethylsilsesquioxanes -(Me-$SiO_{1.5}$)$_n$- ("PMS") in THF at ambient when treated with catalytic amounts (1-5 mole %) of fluoride ion introduced as $tBu_4NF$ will depolymerize and dissolve. The resulting soluble species consist of [vinyl$_x$Me$_{8-x}$(SiO$_{1.5}$)]$_8$, [vinyl$_x$Me$_{8-x}$(SiO$_{1.5}$)]$_{10}$, and [vinyl$_x$Me$_{8-x}$(SiO$_{1.5}$)]$_{12}$. 1:1 ratios of PVS:PMS greatly favor formation of vinyl rich cages. Only at ratios of 1:5 is the proportion of vinyl:Me in the cages approximately equal. Of the $T_8$, $T_{10}$ and $T_{12}$ species produced, all conditions tried including changing the solvent to EtOH or toluene or at reflux (THF) favor the formation of the larger cages sometimes completely excluding formation of the $T_8$ materials.

Efforts to isolate the cage compounds by removal of solvent regenerate polymeric silsesquioxanes albeit those containing mixtures of Me and vinyl groups. Introduction of $CaCl_2$ sufficient to form $CaF_2$ prior to workup prevents the formation of the cage materials allowing recovery of the mixed cage systems. The approach developed here provides a novel way to form mixed functional group silsesquioxane cages. The fact that $T_{10}$ and $T_{12}$ cage formation is favored appears to suggest that these cages are more stable than the traditional produced $T_8$ cages.

Materials

Polyvinylsilsesquioxane (PVS) was prepared using literature methods, 12 tetrahydrofuran, toluene, methanol and ethanol were purchased from Fisher Scientific and used as received. Tetrabutylammonium fluoride and diethylether were purchased from Sigma-Aldrich and used as received. Yields are calculated based on the polyvinylsilsesquioxane used.

Analytical Methods

FTIR Spectra. Diffuse reflectance Fourier transform (DRIFT) spectra were recorded on a Mattson Galaxy Series FTIR 3000 spectrometer (Mattson Instruments, Inc., Madison, Wis.). Optical grade, random cuttings of KBr (International Crystal Laboratories, Garfield, N.J.) were ground, with 1.0 wt % of the sample to be analyzed. For DRIFT analysis, samples were packed firmly and leveled off at the upper edge to provide a smooth surface. The FTIR sample chamber was flushed continuously with $N_2$ prior (10 min) to data acquisition in the range 4000-400 $cm^{-1}$.

Gel Permeation Chromatography (GPC) analyses were run on a Waters 440 system equipped with Waters Styragel columns (7.8×300, HT 0.5, 2, 3, 4) with RI detection using Waters refractometer and THF as solvent. The system was calibrated using polystyrene standards and toluene as reference.

Matrix-Assisted Laser Desorption/Time-of-Flight Spectrometry (MALDI-ToF) was run on a Micromass TofSpec-2E equipped with a 337 nm nitrogen laser in positive-ion reflectron mode using poly(ethylene glycol) as calibration standard, dithranol as matrix, and $AgNO_3$ as ion source. Samples were prepared by mixing solutions of 5 parts matrix (10 mg/mL in THF), 5 parts sample (1 mg/mL in THF), and 1 part $AgNO_3$ (2.5 mg/mL in water) and blotting the mixture on target plate.

Synthetic Studies

Synthesis of Polymethylsilsesquioxane (PMS). In a 100 ml 1 necked round bottom flask 10 ml of HCl 37% were added to a solution of Methyltrimethoxysilane (20 ml, 0.14 mol) in 40 ml of ethanol. The solution was stirred for 3 days forming a white solid which was filtered off and washed with Ether (3×10 ml) to gave 8.6 g of PMS, a 90% yield. IR (KBr): $v_{C-H}$ (2971, 1408 $cm^{-1}$), $v_{Si-C}$ (1271 cm-1), $v_{Si-O-Si}$ (1121, 1035 $cm^{-1}$).

General Synthesis of $T_8$, $T_{10}$ and $T_{12}$ cages from Polyvinylsilsesquioxane and Polymethylsilsesquioxane. To a mixture of PVS and solvent, tetrabutylammonium fluoride was added. After the complete dissolution, polymethylsilsesquioxane was added and the suspension was stirred for 2 d at room temperature or refluxed for 6 h. Unreacted material was filtered off from the solution and $CaCl_2$ (0.3 g) was added to quench the $F^-$ catalyst. The solution was stirred for 3-4 h, the solid was removed by filtration and the product was obtained by removing the solvent in vacuo or/and by precipitation into methanol.

Experiment 13-1. [ViSiO$_{1.5}$]$_n$ (1 g, 12.6 mmol), [MeSiO$_{1.5}$]n (0.87 g, 12.6 mmol) and $tBu_4NF$ (0.4 ml, 0.38 mmol) in THF (20 ml). Yield (80%). IR (KBr): Me: $v_{C-H}$ (2959, 1408 $cm^{-1}$), Vi: $v_{C-H}$ (3061, 1487 $cm^{-1}$), $v_{C=C}$ (1602 $cm^{-1}$), $v_{Si-C}$ (1273 $cm^{-1}$), $v_{Si-O-Si}$ (1120 $cm^{-1}$). GPC (THF): Mn: 779, Mw: 789, PDI: 1,013. MALDI-ToF: m/z ($Ag^+$ adduct)=691 [$Si_8O_{12}(CH_3)4(CH=CH_2)_4$], 703 [$Si_8O_{12}(CH_3)_3(CH=CH_2)_5$], 715 [$Si_8O_{12}(CH_3)_2(CH=CH_2)_6$], 852 [$Si_{10}O_{15}(CH_3)_4(CH=CH_2)_6$], 864 [$Si_{10}O_{15}(CH_3)_3(CH=CH_2)_7$], 876 [$Si_{10}O_{15}(CH_3)_2(CH=CH_2)_8$], 998 [$Si_{12}O_{18}(CH_3)_5(CH=CH_2)_7$], 1010 [$Si_{12}O_{18}(CH_3)_4(CH=CH_2)_8$], 1022 [$Si_{12}O_{18}(CH_3)_3(CH=CH_2)_9$], 1024 [$Si_{12}O_{18}(CH_3)_2(CH=CH_2)_{10}$].

Experiment 13-2. [ViSi$_{1.5}$]$_n$ (1 g, 12.6 mmol), [MeSiO$_{1.5}$]$_n$ (1.74 g, 25 mmol) and $tBu_4NF$ (0.4 ml, 0.38 mmol) in THF (20 ml). Yield (75%). IR (KBr): Me: $v_{C-H}$ (2959, 1409 $cm^{-1}$), Vi: $v_{C-H}$ (3061, 3023 $cm^{-1}$), $v_{C=C}$ (1602 $cm^{-1}$), $v_{Si-C}$ (1273 $cm^{-1}$), vSi—O—Si (1122, 1044 $cm^{-1}$). GPC (THF): Mn: 721, Mw: 739, PDI: 1.025. MALDI-ToF: m/z ($Ag^+$ adduct)=729 [$Si_8O_{12}(CH_3)(CH=CH_2)_7$], 739 [$Si_8O_{12}(CH=CH_2)_8$], 793 [$Si_{10}O_{15}(CH_3)_9(CH=CH_2)$], 861 [$Si_{10}O_{15}(CH_3)_3(CH=CH_2)_7$], 899 [$Si_{10}O_{15}(CH=CH_2)_{10}$], 997 [$Si_{12}O_{18}(CH_3)_5(CH=CH_2)_7$], 1009 [$Si_{12}O_{18}(CH_3)_4(CH=CH_2)_8$], 1021 [$Si_{12}O_{18}(CH_3)_3(CH=CH_2)_9$], 1057 [$Si_{12}O_{18}(CH=CH2)12$].

Experiment 13-3. [ViSiO$_{1.5}$]$_n$ (1 g, 12.6 mmol), [MeSiO$_{1.5}$]$_n$ (4.36 g, 63 mmol) and $tBu_4NF$ (0.4 ml, 0.38 mmol) in THF (30 ml). Yield (87%). IR (KBr): Me: $v_{C-H}$ (2969, 1408 $cm^{-1}$), Vi: $v_{C-H}$ (3061 $cm^{-1}$), $v_{C=C}$ (1602 $cm^{-1}$), $v_{Si-C}$ (1272 $cm^{-1}$), $v_{Si-O-Si}$ (1118 $cm^{-1}$). GPC (THF): Mn: 760, Mw: 770, PDI: 1,013. MALDI-ToF: m/z ($Ag^+$ adduct)= 679 [$Si_8O_{12}(CH_3)_5(CH=CH_2)_3$], 691 [$Si_8O_{12}(CH_3)_4(CH=CH_2)_4$], 703 [$Si_8O_{12}(CH_3)_3(CH=CH_2)_5$], 715 [$Si_8O_{12}(CH_3)_2(CH=CH_2)_6$], 827 [$Si_{10}O_{15}(CH_3)_6$ (CH=CH$_2$)$_4$], 837 [Si$_{10}$O$_{15}$(CH$_3$)$_5$(CH=CH$_2$)$_5$], 848 [Si$_{10}$O$_{15}$(CH$_3$)$_4$(CH=CH$_2$)$_6$], 972 [Si$_{12}$O$_{18}$(CH$_3$)$_7$(CH=CH$_2$)$_5$], 984 [Si$_{12}$O$_{18}$(CH$_3$)$_6$(CH=CH$_2$)$_6$], 997 [Si$_{12}$O$_{18}$(CH$_3$)$_5$(CH=CH$_2$)$_7$].

Experiment 13-4. [ViSiO$_{1.5}$]$_n$ (1 g, 12.6 mmol), [MeSiO$_{1.5}$]$_n$ (1.74 g, 25 mmol) and tBu$_4$NF (0.4 ml, 0.38 mmol) in Toluene (15 ml). Yield (39%). IR (KBr): Me: $\nu_{C-H}$ (2958, 1409 cm$^{-1}$), Vi: $\nu_{C-H}$ (3061 cm$^{-1}$), $\nu_{C=C}$ (1602 cm$^{-1}$), $\nu_{Si-C}$ (1274 cm$^{-1}$), $\nu_{Si-O-Si}$ (1120, 1049 cm$^{-1}$). GPC (THF): Mn: 739, Mw: 753, PDI: 1,019. MALDI-ToF: m/z (Ag$^+$ adduct)=741 [Si$_8$O$_{12}$(CH=CH$_2$)$_8$], 899 [Si$_{10}$O$_{15}$(CH=CH$_2$)$_{10}$], 1057 [Si$_{12}$O$_{18}$(CH=CH$_2$)$_{12}$], 1689 [Si$_{20}$O$_{30}$(CH=CH$_2$)$_{20}$], 1848 [Si$_{22}$O$_{22}$(CH=CH$_2$)$_{22}$].

Experiment 13-5. [ViSiO$_{1.5}$]$_n$ (1 g, 12.6 mmol), [MeSiO$_{1.5}$]$_n$ (4.36 g, 63 mmol) and tBu$_4$NF (0.4 ml, 0.38 mmol) in Toluene (30 ml). Yield (30%). IR (KBr): Me: $\nu_{C-H}$ (2958, 1409 cm-1), Vi: $\nu_{C-H}$ (3061, 3023 cm$^{-1}$), $\nu_{C=C}$ (1602 cm-1), $\nu_{Si-C}$ (1274 cm-1), vSi—O—Si (1126, 1047 cm-1). GPC (THF): Mn: 762, Mw: 773, PDI: 1,014. MALDI-ToF: m/z (Ag+ adduct)=741 [Si$_8$O$_{12}$(CH=CH$_2$)$_8$], 899 [Si$_{10}$O$_{15}$(CH=CH$_2$)$_{10}$], 1057 [Si$_{12}$O$_{18}$(CH=CH$_2$)$_{12}$], 1690 [Si$_{20}$O$_{30}$(CH=CH$_2$)$_{20}$].

Experiment 13-6. [ViSiO$_{1.5}$]$_n$ (1 g, 12.6 mmol), [MeSiO$_{1.5}$]$_n$ (1.74 g, 25 mmol) and tBu$_4$NF (0.4 ml, 0.38 mmol) in THF (20 ml) and Ethanol (20 ml). Yield (50%). IR (KBr): GPC (THF): Mn: 835, Mw: 847, PDI: 1,015. MALDI-ToF: m/z (Ag$^+$adduct)=739 [Si$_8$O$_{12}$(CH=CH$_2$)$_8$], 899 [Si$_{10}$O$_{15}$(CH=CH$_2$)$_1$0], 1057 [Si$_{12}$O$_{18}$(CH=CH$_2$)$_{12}$], 1690 [S$_{i20}$O$_{30}$(CH=CH$_2$)$_{20}$].

Experiment 13-7. [ViSiO$_{1.5}$]$_n$ (1 g, 12.6 mmol), [MeSiO$_{1.5}$]$_n$ (1.74 g, 25 mmol) and tBu$_4$NF (0.4 ml, 0.38 mmol) in THF (25 ml) and Ethanol (6.3 ml). Yield (52%). IR (KBr): Me: $\nu_{C-H}$ (2972, 1409 cm$^{-1}$), Vi: $\nu_{C-H}$ (3061 cm$^{-1}$), $\nu_{C=C}$ (1602 cm$^{-1}$), $\nu_{Si-C}$ (1272 cm$^{-1}$), $\nu_{Si-O-Si}$ (1133, 1036 cm$^{-1}$). MALDI-ToF: m/z (Ag$^+$ adduct)=828 [Si$_{10}$O$_{15}$(CH$_3$)$_6$(CH=CH$_2$)$_4$], 850 [Si$_{10}$O$_{15}$(CH$_3$)$_4$(CH=CH$_2$)$_6$], 862 [Si$_{10}$O$_{15}$(CH$_3$)$_3$(CH=CH$_2$)$_7$], 874 [Si$_{10}$O$_{15}$(CH$_3$)$_2$(CH=CH$_2$)$_8$], 996 [Si$_{12}$O$_{18}$(CH$_3$)$_5$(CH=CH$_2$)$_7$], 1009 [Si$_{10}$O$_{15}$(CH$_3$)$_4$(CH=CH$_2$)$_8$], 1020 [Si$_{12}$O$_{18}$(CH$_3$)$_3$(CH=CH$_2$)$_9$].

Experiment 13-8. [ViSiO$_{1.5}$]$_n$ (1 g, 12.6 mmol), [MeSiO$_{1.5}$]$_n$ (1.74 g, 25 mmol) and tBu$_4$NF 0.4 ml, 0.38 mmol) in THF (6.25 ml) and Ethanol (25 ml). Yield (33%). MALDI-ToF: m/z (Ag$^+$ adduct)=793 [Si$_8$O$_{12}$(CH$_3$)$_9$(CH=CH$_2$)], 899 [Si$_{10}$O$_{15}$(CH=CH$_2$)$_{10}$], 973 [Si$_{12}$O$_{18}$(CH$_3$)$_7$(CH=CH$_2$)$_5$], 1057 [Si$_{12}$O$_{18}$(CH=CH$_2$)$_{12}$].

Experiment 13-9. [MeSiO$_{1.5}$]$_n$ (1 g, 14.4 mmol) and tBu$_4$NF (0.4 ml, 0.43 mmol) in THF (20 ml). Yield (25%).

Experiment 13-10. [ViSiO$_{1.5}$]$_n$ (1 g, 12.6 mmol), [MeSiO$_{1.5}$]$_n$ (0.87 g, 12.6 mmol) and tBu$_4$NF (0.4 ml, 0.38 mmol) in THF (20 ml). Yield (62%). IR (KBr): Me: $\nu_{C-H}$ (2959, 1409 cm$^{-1}$), Vi: $\nu_{C-H}$ (3061 cm$^{-1}$), $\nu_{C=C}$ (1602 cm$^{-1}$), $\nu_{Si-C}$ (1274 cm$^{-1}$), $\nu_{Si-O-Si}$ (1121 cm$^{-1}$). GPC (THF): Mn: 776, Mw: 791, PDI: 1,020. MALDI-ToF: m/z (Ag$^+$ adduct)=679 [Si$_8$O$_{12}$(CH$_3$)$_3$(CH=CH$_2$)$_5$], 692 [Si$_8$O$_{12}$(CH$_3$)$_4$(CH=CH$_2$)$_4$], 817 [Si$_{10}$O$_{15}$(CH$_3$)7CH=CH$_2$)$_3$], 861 [Si$_{10}$O$_{15}$(CH$_3$)$_3$(CH=CH$_2$)$_7$], 875 [Si$_{10}$O$_{15}$(CH$_3$)$_2$(CH=CH$_2$)$_8$], 887 [Si$_{10}$O$_{15}$(CH$_3$)(CH=CH$_2$)$_9$], 963 [Si$_{12}$O$_{18}$(CH$_3$)$_8$(CH=CH$_2$)$_4$], 1021 [Si$_{12}$O$_{18}$(CH$_3$)$_3$(CH=CH$_2$)$_9$], 1033 [Si$_{12}$O$_{18}$(CH$_3$)$_2$(CH=CH$_2$)$_{10}$], 1045 [Si$_{12}$O$_{18}$(CH$_3$)(CH=CH$_2$)$_{11}$].

Experiment 13-11. [ViSiO$_{1.5}$]$_n$ (1 g, 12.6 mmol), [MeSiO$_{1.5}$]$_n$ (1.74 g, 25 mmol) and tBu$_4$NF (0.4 ml, 0.38 mmol) in THF (20 ml). Yield (65%). IR (KBr): Me: $\nu_{C-H}$ (2958, 1409 cm$^{-1}$), Vi: $\nu_{C-H}$ (3062 cm$^{-1}$), $\nu_{C=C}$ (1602 cm$^{-1}$), $\nu_{Si-C}$ (1274 cm$^{-1}$), $\nu_{Si-O-Si}$ (1121 cm$^{-1}$). GPC (THF): Mn: 780, Mw: 794, PDI: 1,018. MALDI-ToF: m/z (Ag$^+$ adduct)=715 [Si$_8$O$_{12}$(CH$_3$)$_2$(CH=CH$_2$)$_6$], 727 [Si$_8$O$_{12}$(CH$_3$)(CH=CH$_2$)$_7$], 740 [Si$_8$O$_{12}$(CH=CH$_2$)$_8$], 817 [Si$_{10}$O$_{15}$(CH$_3$)$_7$(CH=CH$_2$)$_3$], 851 [Si$_{10}$O$_{15}$(CH$_3$)$_4$(CH=CH$_2$)$_6$], 861 [Si$_{10}$O$_{15}$(CH$_3$)$_3$(CH=CH$_2$)$_7$], 875 [Si$_{10}$O$_{15}$(CH$_3$)$_2$(CH=CH$_2$)$_8$], 887 [Si$_{10}$O$_{15}$(CH$_3$)(CH=CH$_2$)$_9$], 899 [Si$_{10}$O$_{15}$(CH=CH$_2$)$_{10}$], 963 [Si$_{12}$O$_{18}$(CH$_3$)$_8$(CH=CH$_2$)$_4$], 1009 [Si$_{12}$O$_{18}$(CH$_3$)$_4$(CH=CH$_2$)$_8$], 1021 [Si$_{12}$O$_{18}$(CH$_3$)$_3$(CH=CH$_2$)$_9$], 1033 [Si$_{12}$O$_{18}$(CH$_3$)$_2$(CH=CH$_2$)$_{10}$], 1045 [Si$_{12}$O$_{18}$(CH$_3$)(CH=CH$_2$)$_{11}$].

Experiment 13-12. [ViSiO$_{1.5}$]$_n$ (1 g, 12.6 mmol), [MeSi$_{1.5}$]$_n$ (4.36 g, 63 mmol) and tBu$_4$NF (0.4 ml, 0.38 mmol) in THF (25 ml). Yield (70%). IR (KBr): Me: $\nu_{C-H}$ (2959, 1408 cm$^{-1}$), Vi: $\nu_{C-H}$ (3061, 3023 cm$^{-1}$), $\nu_{C=C}$ (1602 cm$^{-1}$), $\nu_{Si-C}$ (1273 cm$^{-1}$), $\nu_{Si-O-Si}$ (1119 cm$^{-1}$). GPC (THF): Mn: 764, Mw: 778, PDI: 1,018. MALDI-ToF: m/z (Ag$^+$ adduct)=679 [Si$_8$O1$_2$(CH$_3$)$_5$(CH=CH$_2$)$_3$], 691 [Si$_8$O$_{12}$(CH$_3$)$_4$(CH=CH$_2$)$_4$], 837 [Si$_{10}$O$_{15}$(CH$_3$)$_5$(CH=CH$_2$)$_5$], 849 [Si$_{10}$O$_{15}$(CH$_3$)$_4$(CH=CH$_2$)$_6$], 861 [Si$_{10}$O$_{15}$(CH$_3$)$_3$(CH=CH$_2$)$_7$], 875 [Si$_{10}$O$_{15}$(CH$_3$)$_2$(CH=CH$_2$)$_8$], 984 [Si$_{12}$O$_{18}$(CH$_3$)$_6$(CH=CH$_2$)$_6$], 996 [Si$_{12}$O$_{18}$(CH$_3$)$_5$(CH=CH$_2$)$_7$], 1009 [Si$_{12}$O$_{18}$(CH$_3$)$_4$(CH=CH$_2$)$_8$], 1021 [Si$_{12}$O$_{18}$(CH$_3$)$_3$(CH=CH$_2$)$_9$].

Synthesis of Mixed Vinyl Phenyl Silsesquioxanes

Example 14

Synthesis of Vinyl$_x$Ph1 (x=9, 11) T$_{10}$ and T$_{12}$ Silsesquioxanes PPS (1.00 g, 7.7 mmol) and PVS (7.0 g, 88.5 mmol) were placed in a dry 250 mL round bottom flask equipped with magnetic stirrer and condenser. The flask was evacuated and flushed three times with N2. THF (100 mL) and 0.96 mL (1.0 M in THF, 0.96 mmol) of 95% TBAF were added via syringe. The reaction mixture was stirred at room temperature for 48 h. CaCl2 (0.8 g, 7.2 mmol) was added to the reaction mixture and stirred an additional 2 h. The insolubles (~1 g) were then gravity filtered and the filtrate was removed under reduced pressure. The solid residue was dissolved in ~15 mL of THF and precipitated into 300 mL MeOH. The precipitated products were collected and dried in vacuo to give a white powder (7.05 g, 88% with respect to total initial mass of reactants). Characterization data: $^1$H NMR (400 MHz, CD$_3$Cl): 5.6-6.2 (br, —CH=CH$_2$), 6.9 (br, Ar—H); 7.4 (br, Ar—H); 7.6 (br, Ar—H). $^{13}$C NMR: 126.9 (Ar—C), 130.2 (—Si—CH=CH$_2$), 130.7 (Ar—C), 139.8 (Ar—C), 136.0 (CH=CH$_2$) ppm. MALDI-TOF: m/z (Ag$^+$ adduct)=899 [AgSi$_{10}$O$_{15}$(C$_2$H$_3$)$_{10}$], 949 [AgSi$_{10}$O$_{15}$—(C$_2$H$_3$)$_9$(C$_6$H$_5$)$_1$], 999 [AgSi$_{10}$O$_{15}$(C$_2$H$_3$)$_8$(C$_6$H$_5$)$_2$] 1057 [AgSi$_{12}$O$_{18}$(C$_2$H$_3$)$_{12}$], 1107 [AgSi12O18(C2H3)11(C6H5)1], 1157 [AgSi12O18-(C2H3)10(C6H5)2] amu. GPC (found): Mn 1026; Mw 1077; PDI 1.05 (see also Table 6).

Example 15

Synthesis of Vinyl$_1$Ph$_x$ (x=9, 11) T$_{10}$ and T$_{12}$ Silsesquioxanes PPS (15.0 g, 116 mmol) and PVS (1.0 g, 12.6 mmol) were placed in a dry 250 mL round bottom flask equipped with magnetic stirrer and condenser. The flask was evacuated and flushed three times with N$_2$. THF (100 mL) and 1.29 mL (1.0 M in THF, 1.29 mmol) of 95% TBAF were added via syringe. The reaction mixture was stirred at room temperature for 48 h. CaCl$_2$ (0.8 g, 7.2 mmol) was added to the reaction mixture and stirred an additional 2 h. The insolubles (~5 g) were then gravity filtered and the filtrate was removed under reduced pressure. The solid residue was dissolved in ~15 mL of THF and precipitated into 300 mL MeOH. The precipitated products were collected and dried in vacuo to give a white powder (11.52 g, 72% with respect to total initial mass of reactants). Characterization data: 1H NMR (400 MHz, CD3Cl): 5.8-6.1 (br, —CH=CH2), 7.1-7.8 (br, Ar—H). $^{13}$C NMR: 127.0 (Ar—C), 130.0 (—Si—CH=CH$_2$), 130.6 (Ar—C), 134.0 (Ar—C), 136.1 (—CH=CH$_2$) ppm. MALDI-TOF: m/z (Ag$^+$ adduct)=1141 [AgSi$_8$O$_{12}$(C$_6$H$_5$)$_8$], 1299 [AgSi$_{10}$O$_{15}$—(C$_2$H$_3$)$_2$(C$_6$H$_5$)$_8$], 1349 [AgSi$_{10}$O$_{15}$(C$_2$H$_3$)$_1$(C$_6$H$_5$)$_9$], 1399 [AgSi$_{10}$O$_{15}$(C$_6$H$_5$)10], 1557 [AgSi$_{12}$O$_{18}$(C$_2$H$_3$)$_2$(C$_6$H$_5$)$_{10}$], 1607 [AgSi$_{12}$O$_{18}$(C$_2$H$_3$)$_1$(C$_6$H$_5$)$_{11}$], 1658 [AgSi$_{12}$O$_{18}$—(C$_6$H$_5$)$_{12}$] amu. GPC (found): Mn 725; Mw 754; PDI 1.04 (see also Table 6).

Example 16

Synthesis of Vinyl$_2$Ph$_x$ (x=8, 10) T$_{10}$ and T$_{12}$ Silsesquioxanes. PPS (7.24 g, 56.0 mmol) and PVS (1.0 g, 12.6 mmol) were placed in a dry 250 mL r/b flask equipped with magnetic stirrer and condenser. The flask was evacuated and flushed three times with N$_2$. THF (100 mL) and 0.69 mL (1.0 M in THF, 0.69 mmol) of 95% TBAF were added via syringe. The reaction mixture was stirred at room temperature for 48 h. CaCl$_2$ (0.8 g, 7.2 mmol) was added to the reaction mixture and stirred an additional 2 h. Insolubles (~3 g) were gravity filtered and the filtrate removed under reduced pressure. The solid residue was dissolved in ~15 mL of THF and precipitated into 300 mL MeOH. The precipitated products were collected and dried in vacuo to give a white powder (6.67 g, 81% with respect to total initial mass of reactants). The products were further purified by column chromatography (silica, 1:10 THF:hexane) and followed by TLC. Characterization data: $^1$H NMR (400 MHz, CD$_3$Cl): 5.2-6.3 (br, —CH=CH$_2$), 6.6-8.1 (br, Ar—H). 13C NMR: 127.0 (Ar—C), 130.0 (—Si—CH=CH$_2$), 130.7 (Ar—C), 133.8 (Ar—C), 136.3 (—CH=CH$_2$) ppm. IR: vC=H (3066-2917), vC=C (Ar ring, 1591), vC=C (Ar ring, 1429), vSi—O (1132), vSi—C (729) cm-1. MALDI-TOF: m/z (Ag$^+$ adduct)=1199 [AgSi$_{10}$O$_{15}$(C$_2$H$_3$)$_4$(C$_6$H$_5$)$_6$], 1249 10 [AgSi$_{10}$O$_{15}$(C$_2$H$_3$)$_3$(C$_6$H$_5$)$_7$], 1299 [AgSi$_{10}$O$_{15}$—(C$_2$H$_3$)$_2$(C$_6$H$_5$)$_8$], 1349 [AgSi$_{13}$O$_{15}$—(C$_2$H$_3$)$_1$(C$_6$H$_5$)$_9$], 1399 [AgSi$_{10}$O$_{15}$(C$_6$H$_5$)$_{13}$], 1458 [AgSi$_{12}$O$_{18}$(C$_2$H$_3$)$_4$(C$_6$H$_5$)$_8$], 1507 [AgSi$_{12}$O$_{18}$(C$_2$H$_3$)$_3$(C$_6$H$_5$)$_9$], 1557 [AgSi$_{12}$O$_{18}$—(C$_2$H$_3$)$_2$(C$_6$H$_5$)$_{10}$] amu. GPC (found): Mn 986; Mw 1005; PDI 1.02 (see also Table 6). TGA (air, 1000° C.): found 49.4%; Td5%=459° C. (see also Table 7).

Example 17

Metathesis Reaction of Vinyl$_2$Ph$_x$ (x=8, 10) T$_{10}$ and T$_{12}$ Silsesquioxanes and 4-Bromostyrene. Vinyl$_2$Ph$_x$ (x=8, 10) T$_{10}$ and T$_{12}$ SQs (1.00 g) and 52 mg of first generation Grubb's catalyst (0.13 mmol) were added to a dry 50 mL Schlenk flask under N$_2$. Dry CH$_2$Cl$_2$ (20 mL) was added by syringe followed by 4-bromostyrene (2.48 mL, 19.0 mmol). The mixture was stirred at ambient for 72 h and then quenched by precipitation into 300 mL MeOH. The solution was filtered and the products (0.98 g) were purified by column chromatography (silica, 1.5:8.5 THF:hexane), followed by TLC. Characterization data: $^1$H NMR (400 MHz, CD$_3$Cl): 5.2-6.1 (br, —CH=CH), 6.5-8.0 (br, Ar—H). $^{13}$C NMR: 121.9 (—C—Br), 126.5 (Ar—C), 127.0 (Ar—C), 130.8 (—Si—CH=CH—), 131.9 (Ar—C), 132.0 (Ar—C), 134.0 (Ar—C), 136.0 (—Si—CH=CH—) ppm. IR: vC=H (3079-2958), vC=C (Ar ring, 1593), vC=C (Ar ring, 1429), vSi—O (1132), vSi—C (731) cm$^{-1}$. MALDI-TOF: m/z (Ag$^+$ adduct)=1399 [AgSi$_{10}$O$_{15}$(C$_6$H$_5$)$_{10}$], 1505 [AgSi$_{10}$O$_{15}$(C$_8$H$_6$Br)$_1$(C$_6$H$_5$)$_9$], 1610 [AgSi$_{10}$O$_{15}$(C$_8$H$_6$Br$_2$—(C$_6$H$_5$)$_8$], 1763 [AgSi$_{12}$O$_{18}$—(C$_8$H$_6$Br)$_1$(C$_6$H$_5$)$_{11}$], 1867 [AgSi$_{12}$O$_{18}$(C$_8$H$_6$Br)$_2$(C$_6$H$_5$)$_{10}$] amu. GPC (found): Mn 1383; Mw 1437; PDI 1.04 (see Table 6). TGA (air, 1000° C.): found 40.1%; Td5%=303° C. (see also Table 7).

Example 18

Self-Metathesis Reaction of Vinyl$_2$Ph$_x$ (x=8, 10) T$_{10}$ and T$_{12}$ SQs. Vinyl$_2$Ph$_x$ (x=8, 10) T$_{10}$ and T$_{12}$ silsesquioxanes (1.00 g) and 52 mg of first generation Grubb's catalyst (0.13 mmol) were added to a dry 50 mL Schlenk flask under N$_2$. Dry CH$_2$Cl$_2$ (20 mL) was added by syringe. The mixture was stirred at room temperature for 72 h and then quenched by precipitation into 300 mL of MeOH. The solution was filtered and the recovered solid was analyzed by GPC, TGA, and MALDI, which confirmed only the presence of unreacted starting materials [vinyl$_2$Ph$_x$ (x=8, 10) T$_w$ and T$_{12}$ SQs].

Example 19

Heck Reaction of BrStyr$_2$Ph$_x$ (x=8, 10) T$_{10}$ and T$_{12}$ SQs and Vinyl$_2$Ph$_x$ (x=8, 10) T$_{10}$ and T$_{12}$ Silsesquioxanes. To a dry 50 mL Schlenk flask under N$_2$ was added 0.50 g of BrStyr$_2$Ph$_x$ (x=8, 10) T$_{10}$ and T$_{12}$, 19 mg (0.04 mmol) of Pd[P(t-Bu$_3$)]$_2$, and 18 mg (0.02 mmol) of Pd$_2$(dba)$_3$. 1,4-dioxane (10 mL) was then added by syringe, followed by NCy$_2$Me (2.11 mmol, 0.45 mL) and 0.40 g of vinyl$_2$Ph$_x$ (x=8, 10) T$_{10}$ and T$_{12}$. The mixture was stirred at room temperature for 72 h and then filtered through 1 cm celite, which was washed with 5 mL of THF. The solution 11 was then quenched by precipitation into 300 mL of methanol and filtered and the solid redissolved in 10 mL of THF. This solution was then filtered again through a 1 cm celite column to remove any remaining Pd particles and reprecipitated into 200 mL of methanol. The products were further purified by column chromatography (silica, 1:10 THF:hexane) and followed by TLC, collected, and dried in vacuo to give a white powder (0.72 g). Characterization data: $^1$H NMR (400 MHz, CD3Cl): 5.1-6.3 (br, —CH=CH), 6.5-7.9 (br, Ar—H). $^{13}$C NMR: 127.3 (Ar—C), 129.0-132.0 (Ar—C), 134.0 (Ar—C) ppm. IR: $\nu_{C=H}$ (3077-2979), $\nu_{C=C}$ (Ar ring, 1591), $\nu_{C=C}$ (Ar ring, 1429), $\nu_{Si—O}$ (1132), $\nu_{Si—C}$ (731) cm$^{-1}$. MALDI-TOF: m/z (Ag$^+$ adduct)= 1399 [AgSi$_{10}$O$_{15}$(C$_6$H$_5$)10], 1505 [AgSi$_{10}$O$_{15}$(C$_8$H$_6$Br)$_1$(C$_6$H$_5$)$_9$], 1763 [AgSi$_{12}$O$_{18}$C$_8$H$_6$Br$_2$—(C$_6$H$_5$)$_{10}$], 2593, 2697, 2797, 2849, 3003 amu. GPC (found): M$_n$ 2973; M$_w$ 3716; PDI 1.25 (see also Table 6). TGA (air, 1000° C.): found 45.0%; Td5%=325° C. (see also Table 7).

Example 20

Heck Reaction of BrStyr$_2$Ph$_x$ (x=8, 10) T$_{10}$ and T$_{12}$ SQs and Vinyltriethoxysilane. To a dry 50 mL Schlenk flask under N$_2$ was added 0.50 g of BrStyr$_2$Ph$_x$ (x=8, 10) T$_{10}$ and T$_{12}$, 19 mg (0.04 mmol) of Pd[P(t-Bu$_3$)]$_2$, and 18 mg (0.02 mmol) of Pd$_2$(dba)$_3$. 1,4-dioxane (10 mL) was then added by syringe, followed by NCy$_2$Me (2.11 mmol, 0.45 mL) and 0.38 mL (2 mmol) of vinyltriethoxysilane. The mixture was stirred at room temperature for 72 h and then filtered through 1 cm celite, which was washed with 5 mL of THF. The solution was then quenched by precipitation into 300 mL of methanol and filtered and the solid redissolved in 10 mL of THF. This solution was then filtered again through a 1 cm celite column to remove any remaining Pd particles and reprecipitated into 200 mL of methanol. The products were further purified by column chromatography (silica, 1:10 THF:hexane) and followed by TLC, collected, and dried in vacuo to give a white powder (0.58 g). Characterization data: $^1$H NMR (400 MHz, CD3Cl): 1.2 (s, 3.6 H, —CH3), 1.3 (s, 5.4 H, —CH3), 3.8 (s, 2.4 H, —OCH$_2$CH$_3$), 3.9 (s, 3.6 H, —OCH$_2$CH$_3$), 5.1-6.3 (br, 4 H, —CH=CH), 6.4-7.9 (br, 68 H, Ar—H). 13C NMR: 18.0 (—CH$_3$), 58.8 (—OCH$_2$CH$_3$), 127.3 (Ar—C), 129.0-132.0 (Ar—C), 134.1 (Ar—C), 136.1 (—CH=CH) ppm. IR: $\nu$C=H (3087-2985), $\nu_{C-H}$ (2981-2811), $\nu_{C=C}$ (Ar ring, 1591), $\nu_{C=C}$ (Ar ring, 1431), $\nu$Si—O (1132), $\nu_{Si-C}$ (737) cm$^{-1}$. MALDI-TOF: m/z (Ag$^+$ adduct)=1399 [AgSi$_{10}$O$_{15}$(C$_6$H$_5$)$_{10}$], 1614 [AgSi$_{10}$O$_{15}$(C$_6$H$_5$)$_9$(C$_{16}$H$_{23}$O$_3$Si)$_1$], 1828 [AgSi$_{10}$S$_{15}$—(C$_6$H$_5$)$_8$(C$_{16}$H$_{23}$O$_3$Si$_2$], 1872 [AgSi$_{10}$O$_{15}$(C$_6$H$_5$)$_{11}$(C$_{16}$H$_{23}$O$_3$Si)$_1$], 2086 [AgSi$_{10}$O$_{15}$—(C$_6$H$_5$)$_{10}$(C$_{16}$H$_{23}$O$_3$Si$_2$] amu. GPC (found): M$_n$ 1441; M$_w$ 1527; PDI 1.06 (see also Table 6). TGA (air, 1000° C.): found 40.5%; Td5%=351° C. (see also Table 7).

What is claimed is:

1. A method for making a silsesquioxane cage compound by depolymerization of a polysilsesquioxane comprising:
   a) reacting at least one polysilsesquioxane with a catalytic amount of an organic cationic fluoride at a temperature ranging from about −50° C. to about 120° C. in an organic solvent thereby forming a liquid reaction mixture, wherein the organic cationic fluoride is present in a catalytic amount of 50 mole % or less, based on the polysilsesquioxane;
   b) adding a quenching agent to the liquid reaction mixture to remove fluoride from the reaction mixture; and
   c) isolating a silsesquioxane cage compound from the reaction mixture by precipitation or by solvent removal.

2. A method according to claim 1, wherein the fluoride is provided in the liquid reaction mixture at a level of 0.1-10 mole %, based on moles of silsesquioxane.

3. A method according to claim 2, wherein the amount of fluoride is 0.5-10 mole %.

4. A method according to claim 2, wherein the level of fluoride is 0.5-5 mole %.

5. A method according to claim 1, comprising reacting at a temperature of 0-100° C.

6. A method according to claim 1, comprising reacting at a temperature of 10-50° C.

7. A method according to claim 1, wherein the quenching agent comprises a calcium salt.

8. A method according to claim 7, wherein the quenching agent comprises calcium chloride.

9. A method according to claim 1, comprising mixing at a temperature of 10-50° C.

10. A method for synthesizing a random structure polysilsesquioxane T resin from a single or mixed polymeric silsesquioxane cage compound, the method comprising:
   a) combining one or more silsesquioxane cage compounds with an organic solvent and a catalytic amount of a source of organic fluoride ion, thereby forming a first mixture, wherein the organic fluoride ion is present in an amount of 50 mole % or less, based on the silsesquioxane cage compounds;
   b) mixing the first mixture for a time and at a temperature to make a reaction mixture comprising the T resin; and
   c) isolating the T resin polymer by removal of said organic solvent.

11. A method according to claim 10, wherein the catalytic amount of a source of organic fluoride ion comprises 0.1-10 mole % of fluoride, based on total moles of silsesquioxane.

12. A method according to claim 11, wherein the catalytic amount is 0.5-10 mole %.

13. A method according to claim 11, wherein the catalytic amount is 0.5-5 mole %.

14. A method according to claim 10, comprising mixing at a temperature of 20-30° C.

15. A method according to claim 10, wherein the one or more cage compound is selected from the group consisting of T$_8$, T$_{10}$, or T$_{12}$ structures characterized by formula [RSiO$_{1.5}$]$_n$, where n=8, 10, or 12 and wherein the R groups are independently selected from the group consisting of alkyl, alkenyl, alkynyl, aryl, alkenylaryl, alkylaryl, arylalkyl, and arylalkenyl.

16. A process for making a T$_8$, T$_{10}$, T$_{12}$, or T$_{14}$ silsesquioxane mixed cage compound with a structure represented by [R$^2_x$R$^1_{n-x}$SiO$_{1.5}$]$_n$ wherein n is 8, 10, 12, or 14 and x is 1-13, R$^1$ is a first organic group, and R$^2$ is a second organic group, the process comprising,
   a. adding a catalytic amount of organic fluoride ion to a mixture of starting cage structures [R$^2_n$SiO$_{1.5}$]$_n$ and [R$^1_n$SiO$_{1.5}$]$_n$ to make a first mixture, wherein the catalytic amount of organic fluoride ion is 50 mole % or less, based on the starting cage structures; and
   b. reacting the starting cage structures in the presence of fluoride ion to form a reaction mixture comprising the mixed cage compounds.

17. A method of process according to claim 16, comprising providing [R$^2_n$SiO$_{1.5}$]$_n$ and [R$^1_n$SiO$_{1.5}$]$_n$ in the first mixture in a molar ratio such that x is predominantly 1, 2, or 3 in the reaction product [R$^2_x$R$^1_{n-x}$SiO$_{1.5}$]$_n$.

18. A process according to claim 17, wherein one of R$^1$ and R$^2$ is vinyl.

19. A process according to claim 16, comprising reacting at a temperature of 10-50° C.

20. A process according to claim 16, comprising reacting at a temperature of 20-30° C.

21. A process according to claim 16, comprising reacting in the presence of 0.1-10 mole % fluoride ion, based on moles of silsesquioxane.

22. A process according to claim 21, comprising reacting in the presence of 0.5-5 mole % fluoride ion.

23. A process according to claim 21, comprising reacting in the presence of 0.1-2 mole % fluoride ion in the form of tetraalkylammonium fluoride.

24. A process according to claim 16, further comprising quenching the reaction mixture to remove fluoride, then isolating the T$_8$, T$_{10}$, or T$_{12}$ and/or T$_{14}$ cage compounds by precipitation or solvent removal.

25. A process according to claim 24, comprising quenching with a molar excess of quenching agent that preferentially reacts with fluoride ion.

26. A process according to claim 25, wherein the quenching agent is a calcium salt.

27. A process according to claim 25, wherein the quenching agent is calcium chloride.

* * * * *

UNITED STATES PATENT AND TRADEMARK OFFICE
CERTIFICATE OF CORRECTION

| | | |
|---|---|---|
| PATENT NO. | : 8,053,514 B2 | |
| APPLICATION NO. | : 12/609708 | |
| DATED | : November 8, 2011 | |
| INVENTOR(S) | : Richard M. Laine and Santy Sulaiman | |

It is certified that error appears in the above-identified patent and that said Letters Patent is hereby corrected as shown below:

Column 4, line 43, "and $_{Br23/24}$OPS." should be --and $Br_{23/24}$OPS.--.

Column 5, line 25, After "with" delete "and".

Column 5, line 32, After "with" delete "and".

Column 5, line 37, "fourier" should be --Fourier--.

Column 5, line 67, "T10/T$_{12}$" should be --$T_{10}/T_{12}$--.

Column 7, line 51, "R$^1$n" should be --$R^1_n$--.

Column 7, line 57, "R$^1$n" should be --$R^1_n$--.

Column 8, line 18, After "below" insert --.--.

Column 11, line 23, "T8" should be --$T_8$--.

Column 11, line 23, "T12" should be --$T_{12}$--.

Column 12, line 65, Delete "(" before "reaction".

Column 13, line 34, After "wt" insert --%--.

Column 13, line 36, "hardness 4H)" should be --hardness ($\geq$ 4H)--.

Column 14, line 64, "ToF" should be --TOF--.

Column 18, lines 1-2, After "Livermore" insert --,--.

Column 18, line 27, "hr." should be --hrs.--.

Column 22, line 20, After "(3×10 ml)" delete "to".

Column 23, line 17, "3023 cm$^{-1}$)" should be --3023 cm-1)--.

Column 23, line 18, "vSi-O-Si" should be --$v_{Si-O-Si}$--.

Column 23, line 56, "7CH" should be --7(CH--.

Column 24, line 11, "[MeSi$_{1.5}$]$_n$" should be --[MeSiO$_{1.5}$]$_n$--.

Column 24, line 31, "N2" should be --$N_2$--.

Column 25, line 38, "[AgSi$_{13}$" should be --[AgSi$_{10}$--.

<div style="text-align: right;">

Signed and Sealed this  
Sixth Day of March, 2012

David J. Kappos  
*Director of the United States Patent and Trademark Office*

</div>

CERTIFICATE OF CORRECTION (continued)
U.S. Pat. No. 8,053,514 B2

Column 25, line 38, "$(C_6H_5)_{13}$]" should be --$(C_6H_5)_{10}$]--.

Column 26, line 15, "$T_w$" should be --$T_{10}$--.